US012604017B2

(12) United States Patent
Di et al.

(10) Patent No.: US 12,604,017 B2
(45) Date of Patent: Apr. 14, 2026

(54) ENCODING METHOD, ENCAPSULATION METHOD, DISPLAY METHOD, APPARATUS, AND ELECTRONIC DEVICE

(71) Applicant: HUAWEI TECHNOLOGIES CO., LTD., Shenzhen (CN)

(72) Inventors: Peiyun Di, Shenzhen (CN); Xin Liu, Shenzhen (CN); Yi Song, Shenzhen (CN); Xiaoyu Yang, Shenzhen (CN); Xuejian Gong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 143 days.

(21) Appl. No.: 18/589,756

(22) Filed: Feb. 28, 2024

(65) Prior Publication Data

US 2024/0205432 A1 Jun. 20, 2024

Related U.S. Application Data

(63) Continuation of application No. PCT/CN2022/113966, filed on Aug. 22, 2022.

(30) Foreign Application Priority Data

Aug. 30, 2021 (CN) .......................... 202111003288.4

(51) Int. Cl.
*H04N 19/30* (2014.01)
*H04N 19/105* (2014.01)
(Continued)

(52) U.S. Cl.
CPC ........... *H04N 19/30* (2014.11); *H04N 19/105* (2014.11); *H04N 19/164* (2014.11); *H04N 19/172* (2014.11); *H04N 19/192* (2014.11)

(58) Field of Classification Search
None
See application file for complete search history.

(56) References Cited

U.S. PATENT DOCUMENTS

| | | | |
|---|---|---|---|
| 5,623,308 | A | 4/1997 | Civanlar et al. |
| 6,169,821 | B1 | 1/2001 | Fukunaga et al. |

(Continued)

FOREIGN PATENT DOCUMENTS

| | | |
|---|---|---|
| CN | 1926874 A | 3/2007 |
| CN | 102111644 A | 6/2011 |

(Continued)

OTHER PUBLICATIONS

H. Schwarz, D. Marpe and T. Wiegand, "Overview of the Scalable Video Coding Extension of the H.264/AVC Standard," in IEEE Transactions on Circuits and Systems for Video Technology, vol. 17, No. 9, pp. 1103-1120, Sep. 2007, doi: 10.1109/TCSVT.2007. 905532.

(Continued)

*Primary Examiner* — Neil R Mikeska

(57) ABSTRACT

The technology of this application relates to an encoding method, an encapsulation method, a display method, an apparatus, and an electronic device. The encoding method includes obtaining a to-be-encoded image, determining N encoding scales (N is an integer greater than 1) for the image, determining an encoding parameter corresponding to each of the N encoding scales, to obtain N groups of encoding parameters, and encoding the image N times by using a preset single-scale encoder based on the N groups of encoding parameters to obtain N groups of bitstream data. In this way, the image is encoded to obtain the bitstream data with a small data amount (namely, the bitstream data with a low encoding scale), so that when a network fluctuates, the bitstream data corresponding to the image can arrive at a (Continued)

decoder side with a higher probability, thereby ensuring smoothness of video playing.

18 Claims, 21 Drawing Sheets

(51) Int. Cl.
| | |
|---|---|
| *H04N 19/164* | (2014.01) |
| *H04N 19/172* | (2014.01) |
| *H04N 19/192* | (2014.01) |

(56) References Cited

U.S. PATENT DOCUMENTS

| | | | | |
|---|---|---|---|---|
| 2014/0365231 A1* | 12/2014 | Hoerich | ............... | G10L 19/265 704/500 |
| 2015/0042878 A1* | 2/2015 | Jeon | ..................... | H04N 7/0117 348/441 |
| 2016/0073116 A1* | 3/2016 | Matsunobu | .......... | H04N 19/146 375/240.01 |
| 2017/0111649 A1* | 4/2017 | Wang | ................... | H04N 19/188 |
| 2017/0220283 A1* | 8/2017 | Zhang | ................. | H04N 19/423 |
| 2019/0238860 A1* | 8/2019 | Lim | ................... | H04N 21/4728 |
| 2019/0387237 A1* | 12/2019 | Phillips | .............. | H04N 21/8456 |
| 2022/0201288 A1* | 6/2022 | Shima | ................. | H04N 19/126 |

FOREIGN PATENT DOCUMENTS

| | | |
|---|---|---|
| CN | 107959814 A | 4/2018 |
| CN | 108781291 A | 11/2018 |
| CN | 111541899 A | 8/2020 |

OTHER PUBLICATIONS

International Search Report and Written Opinion issued in PCT/CN2022/113966, dated Nov. 23, 2022, 10 pages.

Osama A. Lotfallah et al, "Adaptive bitstream switching of scalable video", Signal Processing Image Communication (2007), XP022328281, total 24 pages.

Minh Nguyen et al., "Scalable High Efficiency Video Coding based HTTP Adaptive Streaming over QUIC", Conference on Applications, Technologies, Architectures, and Protocols for Computer Communication (SIGCOMM) (2020), XP058472904, total 7 pages.

Extended European Search Report issued in EP22863209.7, dated Oct. 22, 2024, 9 pages.

* cited by examiner

Before F5 is encoded, a transmission success result of bitstream data corresponding to a highest quality encoding scale corresponding to F1 is received Before F6 is encoded, a transmission success result of bitstream data of F2 is received Before F7 is encoded, a transmission failure result of bitstream data of F3 is received

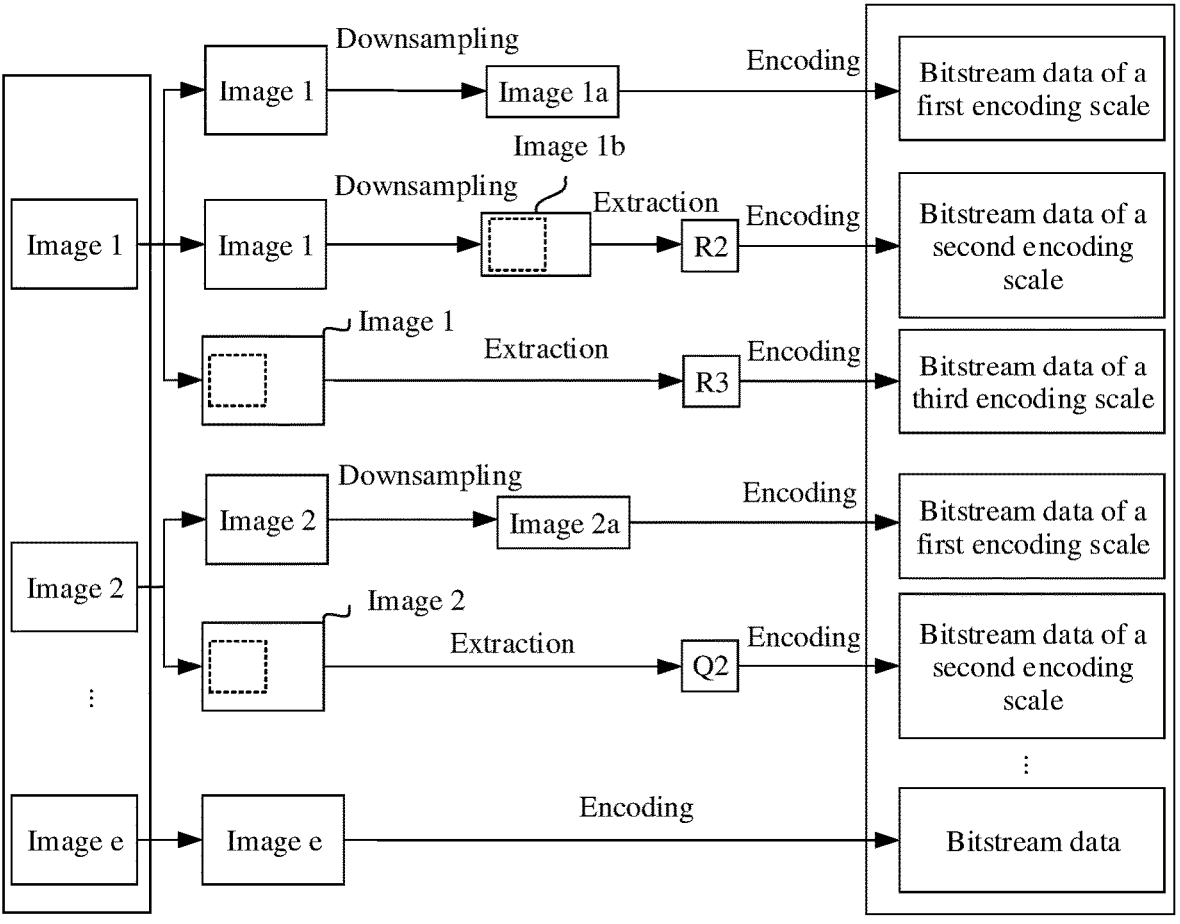
FIG. 6b (1)

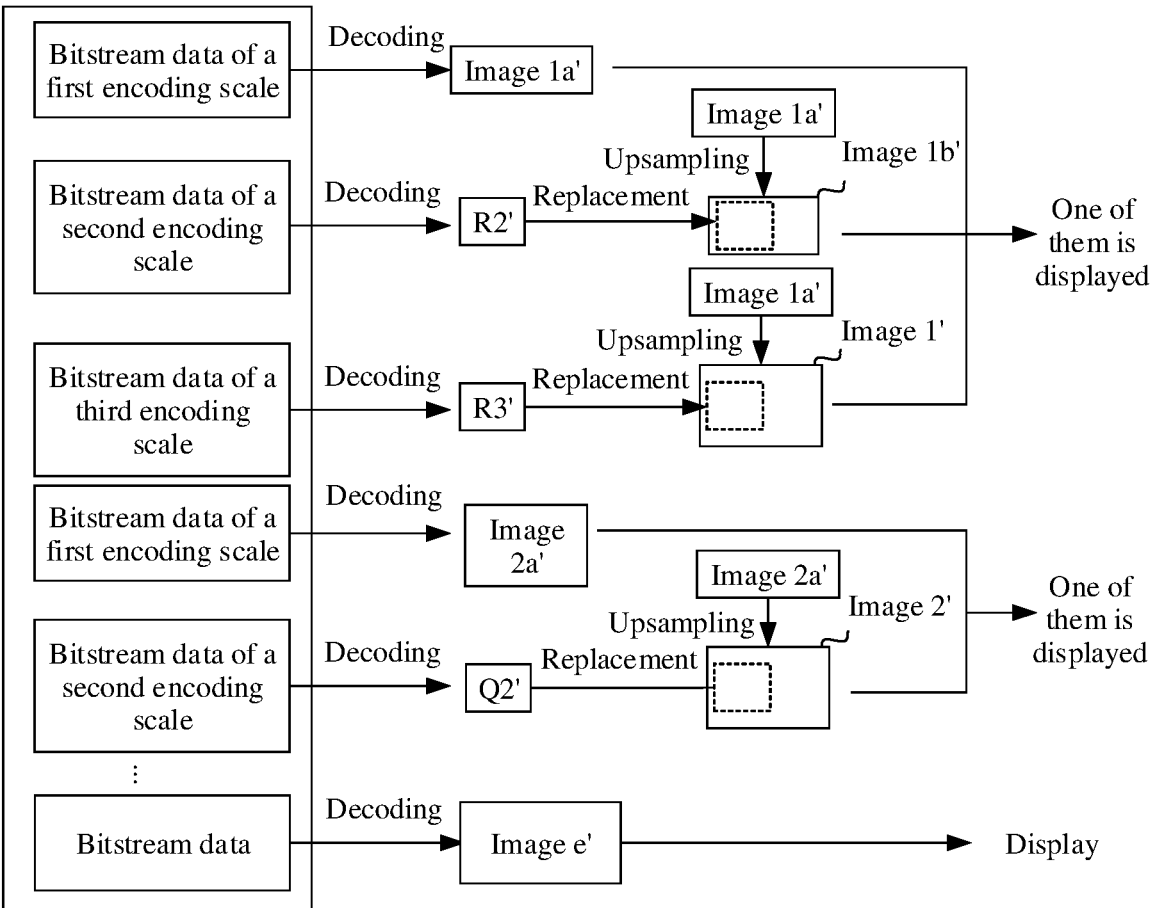
FIG. 6b (2)

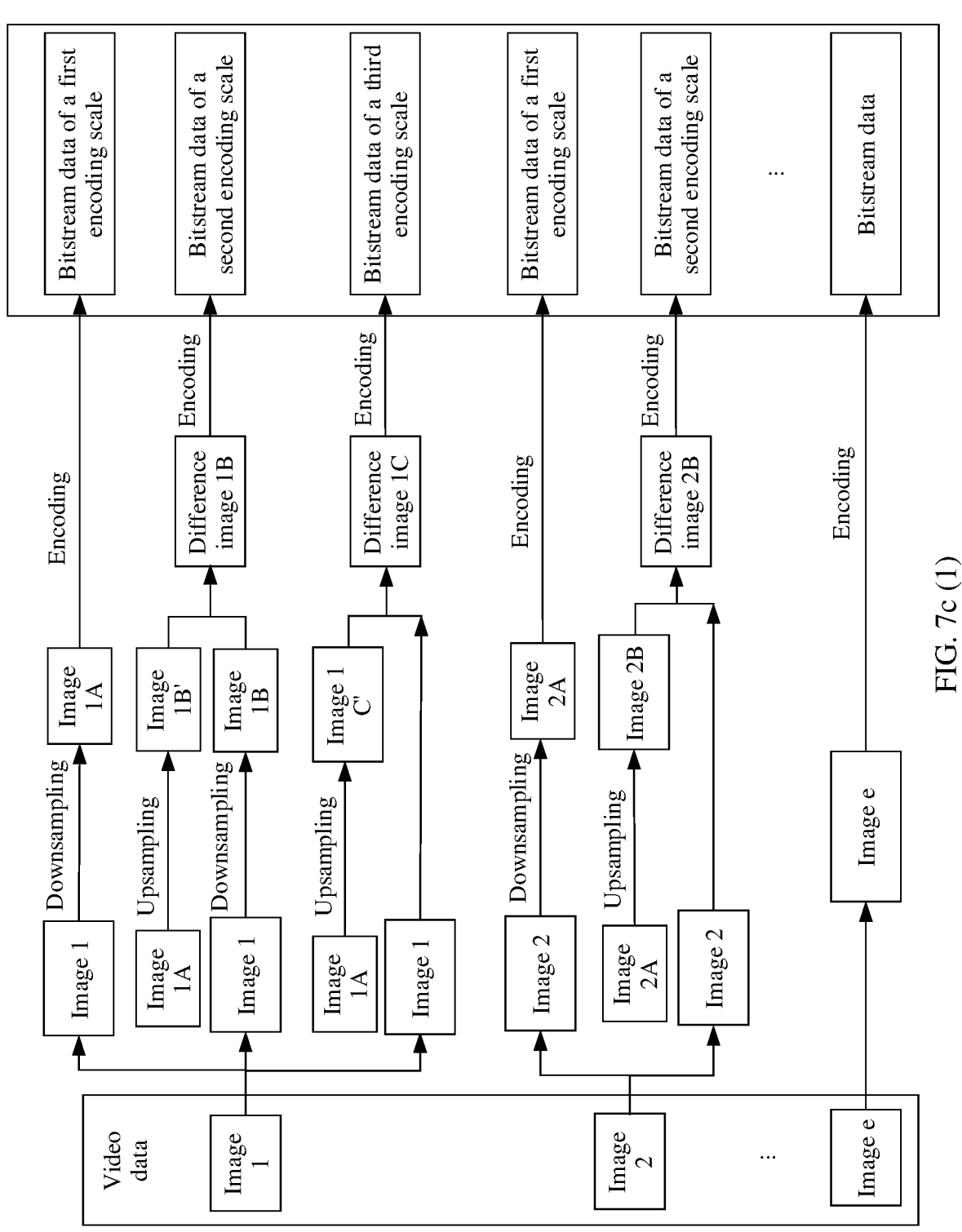
FIG. 7c (1)

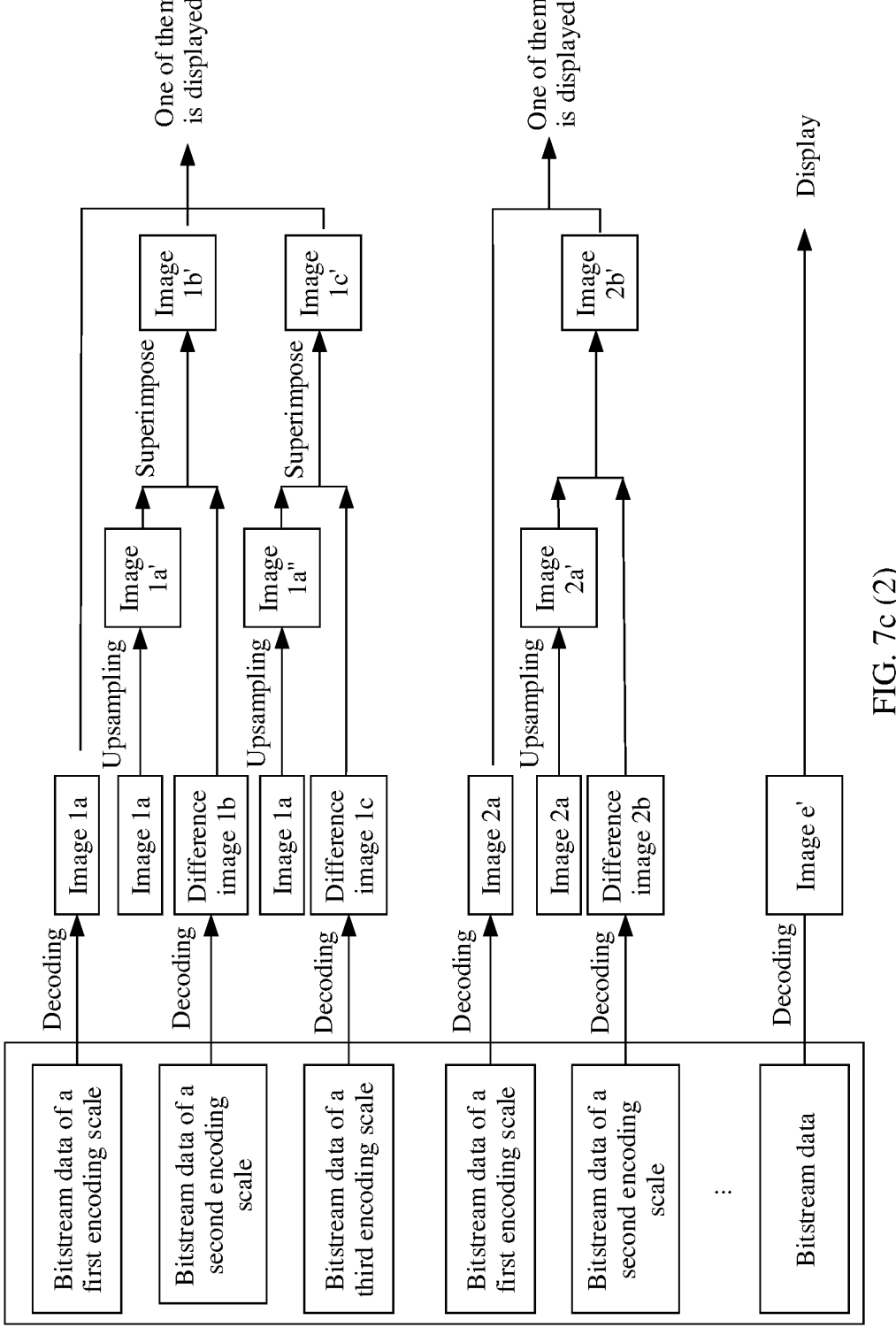
FIG. 7c (2)

ENCODING METHOD, ENCAPSULATION METHOD, DISPLAY METHOD, APPARATUS, AND ELECTRONIC DEVICE

CROSS-REFERENCE TO RELATED APPLICATIONS

This application is a continuation of International Application No. PCT/CN2022/113966, filed on Aug. 22, 2022, which claims priority to Chinese Patent Application No. 202111003288.4, filed on Aug. 30, 2021. The disclosures of the aforementioned applications are hereby incorporated by reference in their entireties.

TECHNICAL FIELD

Embodiments of this application relate to the data processing field, and in particular, to an encoding method, an encapsulation method, a display method, an apparatus, and an electronic device.

BACKGROUND

Currently, services such as video conference, video call, and online education, have high requirements on an end-to-end delay in addition to requirements on video quality and smoothness, to ensure smooth video playing at a receive end.

Network fluctuation is common in actual scenarios, and network fluctuation inevitably affects video playing smoothness and user experience. Therefore, how to improve video playing smoothness caused by network fluctuation is one of problems to be resolved urgently.

SUMMARY

To resolve the foregoing technical problem, this application provides an encoding method, an encapsulation method, a display method, an apparatus, and an electronic device, to resolve a problem of video playing freezing caused by network fluctuation, and improve video playing smoothness.

According to a first aspect, an embodiment of this application provides an encoding method. The method includes: obtaining a to-be-encoded image; determining N encoding scales (N is an integer greater than 1) for an image, and determining N groups of encoding parameters corresponding to the N encoding scales, where each encoding scale corresponds to one group of encoding parameters; and encoding the image N times by using a preset single-scale encoder based on the N groups of encoding parameters to obtain N groups of bitstream data. In this way, bitstream data with a small data amount (that is, bitstream data with a low encoding scale) can be obtained by encoding the image. Therefore, when a network fluctuates, bitstream data of the image can arrive at a decoder side with a higher probability, thereby ensuring smoothness of video playing. If bitstream data with a high encoding scale is lost, decoding and playing at a playing end are not affected, and no artifact occurs. If the bitstream data can arrive at the decoder side, playing quality can be improved.

For example, the single-scale encoder may be an encoder that can perform encoding on an image at only one encoding scale and output bitstream data at only one encoding scale, for example, an H.264 encoder, an H.265 encoder, an H.266 encoder, an AVS3 encoder, or an AV1 encoder, or a similar single-scale encoder that can be implemented in the future based on development of encoding technologies. This is not limited in this embodiment. For example, the single-scale encoder may be a software encoder, or may be a hardware encoder. This is not limited in this embodiment.

For example, the image may be a frame, or may be a field. When a video signal is sampled, if progressive scanning is performed, an obtained signal is a frame of image. When a video signal is sampled, if interlaced scanning (odd and even lines) is performed, a frame of image is divided into two fields. For example, in this embodiment, an example in which a captured image is a frame is used for description.

For example, an encoded image may be a complete frame, or may be a partial area in a frame, such as an image block obtained by dividing a frame into blocks in an encoding process, or a local area with rich texture information, a local area of interest to a user, or another key area.

According to the first aspect, the method further includes: determining, based on a case that importance of the image to encoding and decoding of another image in video data to which the image belongs meets a first preset condition, and/or a case that an impact degree of bitstream data corresponding to the image on a network meets a second preset condition, and/or a case that predicted image quality of the image meets a third preset condition, to perform multi-scale encoding on the image. When it is determined to perform multi-scale encoding on the image, the N encoding scales for the image is determined. In this way, an image that requires multi-scale encoding in a video stream is dynamically and accurately determined with reference to importance of bitstream data corresponding to each frame of image for encoding and decoding, an impact degree on a network, and image quality after image encoding.

For example, when it is determined not to perform multi-scale encoding on the image, single-scale encoding may be performed on the image. In this way, a calculation amount of the encoder can be reduced, and encoding efficiency can be improved.

According to any one of the first aspect or the foregoing implementations of the first aspect, the first preset condition includes at least one of the following: the image is an I frame or an IDR frame; the image is a scene switching frame; the image is a reference frame; and the image is a key frame. In this way, multi-scale encoding can be performed on an image that is important for encoding and decoding. After bitstream data of a minimum encoding scale of the image that is important for encoding and decoding arrives at a decoder side, it can be ensured that other frames in the video data can be decoded, thereby ensuring playing smoothness. Multi-scale encoding is not performed on the image that is not important for encoding and decoding. If corresponding bitstream data is lost, the impact on image reconstruction of other frames is small, and the impact on user watching is small.

For example, both the I frame and the IDR frame are frames encoded by using an intra-frame encoding manner.

For example, the reference frame is a frame referenced when an encoder encodes a frame, or a frame referenced when a decoder reconstructs a frame.

For example, the key frame is a frame that is used as a reference frame by frames that are more than a preset quantity threshold. The preset quantity threshold may be set based on a requirement. This is not limited in this embodiment.

For example, the scene switching frame is a first frame image of a scene after scene switching.

For example, a non-reference frame is a frame other than the reference frame.

According to any one of the first aspect or the foregoing implementations of the first aspect, the second preset condition includes at least one of the following: A data amount of bitstream data corresponding to the image is greater than a preset data amount threshold; and the data amount of the bitstream data corresponding to the image is greater than a network transmission capability. In this way, multi-scale encoding is performed on an image with large network impact, so that bitstream data with a small data amount can be obtained through encoding. Further, when a network fluctuates, a success rate of arrival of bitstream data of an image at a decoder side can be improved, and smoothness of video playing at the decoder side can be ensured.

For example, the data amount of bitstream data corresponding to the image is a bitstream data amount obtained after the image is encoded by using the single-scale encoder.

For example, the data amount of the bitstream data corresponding to the image is a bitstream data amount obtained through prediction by analyzing the image.

According to any one of the first aspect or the foregoing implementations of the first aspect, the predicted image quality of the image includes first predicted image quality and second predicted image quality. The first predicted image quality is predicted image quality of the image that is encoded based on source resolution of the image, and the second predicted image quality is predicted image quality of the image that is encoded based on resolution lower than the source resolution. The third preset condition includes: The first predicted image quality is lower than or equal to the second predicted image quality. In this way, blocking artifacts at a low bit rate can be reduced, and image quality can be improved. In addition, for encoding of a low-resolution image, a calculation amount of the encoder can be reduced, and encoding efficiency can be improved. In addition, encoding the low-resolution image can reduce a bit rate of bitstream data, and further improve a success rate of transmitting the bitstream data to the decoder side.

According to any one of the first aspect or the foregoing implementations of the first aspect, the encoding parameter includes at least one of the following: resolution, a quantization parameter, reference frame information, and a target bit rate.

For example, the resolution is resolution of an image input to the encoder.

For example, the quantization parameter is an encoding quantization parameter used by the encoder to encode the image. The quantization parameter determines a quality distortion degree of the encoded image. A larger quantization parameter indicates a higher distortion degree of the encoded image relative to a source image. A smaller quantization parameter indicates a lower distortion degree of the encoded image relative to the source image.

For example, the reference frame information indicates the reference frame. The reference frame information may be a sequence number (also referred to as a picture order count (POC) number) of a reference frame entering the encoder, or may be a distance between the reference frame and a currently encoded image of the encoder (the distance is a difference between the sequence number of the reference frame entering the encoder and a sequence number of the currently encoded image entering the encoder).

For example, the sequence number of the reference frame entering the encoder may be determined based on a sequence in which the reference frame enters the encoder. For example, two frames of images are captured, N encoding scales is 2 for a first frame of image, and N encoding scales is 2 for a second frame of image. After the first frame of image and a first group of encoding parameters corresponding to the first frame of image are input to the encoder, for the encoder, the first frame of image is input, and POC of this frame of image is 1. After the first frame of image and a second group of encoding parameters of the first frame of image are input to the encoder, for the encoder, the second frame of image is input, and POC of the input frame of image is 2. After the second frame of image and a first group of encoding parameters of the second frame of image are input to the encoder, for the encoder, a third frame of image is input, POC of the input frame of image is 3, and so on.

For example, a target bit rate is an expected bit rate of the encoded image.

According to any one of the first aspect or the foregoing implementations of the first aspect, the determining N encoding scales for the image includes: determining the N encoding scales based on an image type of the image and a preset correspondence between an image type and an encoding scale. In this way, the encoding scale can be determined based on importance of an image for encoding and decoding, and more encoding scales may be set for an image of high importance, so that a success rate of transmitting bitstream data of a high encoding scale to the decoder side can be increased, thereby improving quality of another frame that depends on the image of high importance for decoding.

For example, the image type may be a frame type.

According to any one of the first aspect or the foregoing implementations of the first aspect, the determining N encoding scales for the image includes: determining the N encoding scales for the image based on an encoding scale that is preset for each image in the video data to which the image belongs. In this way, efficiency of determining the N encoding scales can be improved, thereby shortening duration in which the bitstream data of the image arrives at the decoder side.

According to any one of the first aspect or the foregoing implementations of the first aspect, the determining N groups of encoding parameters corresponding to the N encoding scales includes: determining the N groups of encoding parameters based on the N encoding scales and a parameter value range of the encoder. In this way, the encoding parameter can be set to adapt to different parameters of the single-scale encoder.

According to any one of the first aspect or the foregoing implementations of the first aspect, the determining N groups of encoding parameters corresponding to the N encoding scales includes:

determining, based on encoding parameters that are preset for different N values, the N groups of coding parameters corresponding to the N coding scales.

According to any one of the first aspect or the foregoing implementations of the first aspect, the encoding parameter includes the reference frame information. When first feedback information is received, the reference frame information is determined based on the first feedback information. The first feedback information indicates that an encoded frame corresponding to sent bitstream data is successfully received. The encoded frame is acknowledged as the reference frame. The reference frame information indicates the reference frame. In this way, the encoded frame that is successfully transmitted to the decoder side may be used as the reference frame, thereby ensuring a success rate of image decoding. In addition, it can be ensured that when bitstream data of an encoded frame is lost, only decoding and display of the encoded frame are affected, and decoding and display of other encoded frames are not affected, thereby limiting impact of data loss on decoding and display.

For example, the encoded frame may refer to each frame of image that enters the encoder.

According to any one of the first aspect or the foregoing implementations of the first aspect, the encoding parameter includes reference frame information, and the reference frame information may be preset.

According to any one of the first aspect or the foregoing implementations of the first aspect, the encoding parameter includes the resolution. When the encoder supports multi-resolution encoding, the encoding the image for an $i^{th}$ time in N times by using a preset single-scale encoder based on the N groups of encoding parameters includes: when resolution in an $i^{th}$ group of encoding parameters is equal to the source resolution of the image, inputting the $i^{th}$ group of encoding parameters and the image into the preset single-scale encoder for encoding; or when the resolution in the $i^{th}$ group of encoding parameters is less than the source resolution of the image, downsampling the image to the resolution in the $i^{th}$ group of encoding parameters, and inputting the $i^{th}$ group of encoding parameters and the downsampled image into the preset single-scale encoder for encoding, where an encoding parameter corresponding to the $i^{th}$ encoding is the $i^{th}$ group of encoding parameters, and i is any integer from 1 to N. In this way, multi-scale encoding can be performed by using the single-scale encoder that supports multi-resolution encoding.

According to any one of the first aspect or the foregoing implementations of the first aspect, the encoding parameter includes the resolution. The resolution includes the source resolution and target encoding resolution. When the encoder supports multi-resolution encoding, the encoding the image for an $i^{th}$ time in N times by using a preset single-scale encoder based on the N groups of encoding parameters includes: when the source resolution of the image is equal to the target encoding resolution, performing encoding on the image for the $i^{th}$ time by using the preset single-scale encoder; and when the source resolution of the image is greater than the target resolution, downsampling is performed on the image based on the target encoding resolution by using the preset single-scale encoder, and the downsampled image is encoded.

According to any one of the first aspect or the foregoing implementations of the first aspect, the encoding parameter includes the resolution, and when the encoder supports encoding of only one resolution, the encoding the image for N times by using a preset single-scale encoder based on the N groups of encoding parameters includes: performing, for a lowest-resolution encoding scale, downsampling on the image based on resolution in an encoding parameter corresponding to the lowest-resolution encoding scale, to obtain a downsampled image img_DW1; inputting the encoding parameter corresponding to the lowest-resolution encoding scale and the downsampled image img_DW1 to an encoder corresponding to the resolution in the encoding parameter corresponding to the lowest-resolution encoding scale for encoding; performing, for other-resolution encoding scales, upsampling on the downsampled image img_DW1 based on resolution in an encoding parameter corresponding to one of the other-resolution encoding scales, to obtain an upsampled image img_UP1; performing downsampling on the image based on the resolution in the encoding parameter corresponding to one of the other-resolution encoding scales, to obtain a downsampled image img_DW2; determining a difference image between the downsampled image img_DW2 and the upsampled image img_UP1; and inputting, to an encoder corresponding to the resolution in the encoding parameter corresponding to one of the other-resolution encoding scales, the encoding parameter and the difference image that correspond to one of the other-resolution encoding scales, for encoding. In this way, multi-scale encoding can be performed by using a plurality of encoders that support only one resolution. In addition, for another encoding scale other than the lowest encoding scale, encoding is performed based on an encoded image of the lowest encoding scale, so that a calculation amount of the another encoding scale can be reduced, and encoding efficiency can be improved.

According to a second aspect, an embodiment of this application provides a data encapsulation method. The method includes: obtaining bitstream data obtained by encoding an image by an encoder, and description information of the bitstream data; and encapsulating the bitstream data and the description information of the bitstream data, to obtain encapsulated data, and store and/or transmit the encapsulated data. In this way, it can be convenient for a transmission device to determine a transmission policy of the bitstream data based on the description information, and it can be convenient for a decoder end to make a display decision of a reconstructed image based on the description information.

According to the second aspect, the description information includes scale identification information, and the method further includes: when it is determined, based on the scale identification information, that an encoding scale corresponding to the bitstream data is a lowest encoding scale, determining that a transmission policy of the bitstream data is a first transmission policy; or when it is determined, based on the scale identification information, that the encoding scale corresponding to the bitstream data is another encoding scale, determining that the transmission policy of the bitstream data is a second transmission policy, where the first transmission policy is superior to the second transmission policy. In this way, bitstream data of a lowest encoding scale may be preferentially transmitted, to ensure smoothness of video playing.

For example, the first transmission policy may include at least one of the following: performing transmission through a transmission channel whose quality of service is higher than first preset quality of service, retransmitting data and a quantity of retransmission times is greater than a first preset quantity of retransmission times, increasing redundancy of the data to be greater than a first redundancy threshold, and performing forward error correction (FEC) of a data packet on the data.

For example, the second transmission policy may include at least one of the following: performing transmission through a transmission channel whose quality of service is lower than or equal to the first preset quality of service, not retransmitting the data, retransmitting the data and the quantity of retransmission times is less than or equal to the first preset quantity of retransmission times, not increasing the redundancy of the data, increasing the redundancy of the data to be less than or equal to the first redundancy threshold, and discarding the data before sending.

According to any one of the second aspect or the foregoing implementations of the second aspect, the description information includes a frame type, and the method further includes: when it is determined that the frame type corresponding to the bitstream data is a preset frame type, determining that the transmission policy of the bitstream data is a third transmission policy; when it is determined that the frame type corresponding to the bitstream data is a non-preset frame type, determining that the transmission policy of the bitstream data is a fourth transmission policy;

and the third transmission policy is superior to the fourth transmission policy. The preset frame type includes at least one of the following: an I frame, an IDR frame, a key frame, a reference frame, and a scene switching frame. In this way, bitstream data of a frame that is important for encoding and decoding may be preferentially transmitted, to improve a success rate of decoding another frame, and ensure smoothness of watching a video by a user of a receiving device.

For example, the third transmission policy may include at least one of the following: performing transmission through a transmission channel whose quality of service is higher than second preset quality of service, retransmitting data and a quantity of retransmission times is greater than a second preset quantity of retransmission times, increasing redundancy of the data to be greater than a second redundancy threshold, and performing FEC on the data.

For example, the fourth transmission policy may include at least one of the following: performing transmission through a transmission channel whose quality of service is lower than or equal to the second preset quality of service, not retransmitting the data, retransmitting the data and the quantity of retransmission times is less than or equal to the second preset quantity of retransmission times, not increasing the redundancy of the data, increasing the redundancy of the data to be less than or equal to the second redundancy threshold, and discarding the data before sending.

According to any one of the second aspect or the foregoing implementations of the second aspect, the description information includes at least one of the following: the scale identification information, a frame type, and frame identification information.

For example, the frame identification information may include any identifier that may point to a frame of image, for example, a frame number and display time (a presentation time corresponding to a captured image).

According to a third aspect, an embodiment of this application provides a display method, including: obtaining a plurality of reconstructed images obtained by decoding bitstream data by a decoder, and obtaining a plurality of groups of description information corresponding to the plurality of reconstructed images, where each reconstructed image corresponds to one group of description information, and at least one group of description information in the plurality of groups of description information includes first frame identification information; if only one of the plurality of groups of description information includes the first frame identification information, selecting and displaying a reconstructed image corresponding to the first frame identification information; and if at least two groups of description information in the plurality of groups of description information include the first frame identification information, selecting a reconstructed image from at least two reconstructed images corresponding to the first frame identification information, and displaying the selected reconstructed image. In this way, a reconstructed image of an encoding scale can be selected for each frame for display.

According to any one of the third aspect or the foregoing implementations of the third aspect, the description information further includes scale identification information, and the selecting a reconstructed image from the plurality of reconstructed images corresponding to the first frame identification information includes: selecting, based on scale identification information of the reconstructed images corresponding to the first frame identification information, a reconstructed image with a highest encoding scale. A higher encoding scale indicates a superior image. In this way, when each frame is presented to the user, an optimal image is presented.

According to any one of the third aspect or the foregoing implementations of the third aspect, the description information further includes scale identification information, and the selecting a reconstructed image from the plurality of reconstructed images corresponding to the first frame identification information includes: selecting, based on scale identification information of the reconstructed images corresponding to the first frame identification information, a reconstructed image whose scale identification information is closest to scale identification information of a previously displayed reconstructed image. In this way, a difference between adjacent frames can be reduced, and visual smoothness of watching each frame of video by a user can be ensured.

According to any one of the third aspect or the foregoing implementations of the third aspect, the description information is obtained by decapsulating received data, and data obtained by decapsulating the received data further includes the bitstream data.

According to a fourth aspect, an embodiment of this application provides a multi-scale encoding apparatus, where the multi-scale encoding apparatus includes a pre-processing module and a single-scale encoder. The pre-processing module is configured to: obtain a to-be-encoded image; determine N encoding scales for the image, where N is an integer greater than 1; determine N groups of encoding parameters corresponding to the N encoding scales, where each encoding scale corresponds to one group of encoding parameters; and input the N groups of encoding parameters and the image to the single-scale encoder. The single-scale encoder is configured to: encode the image N times by using a preset single-scale encoder based on the N groups of encoding parameters to obtain N groups of bitstream data.

According to the fourth aspect, the pre-processing module is configured to determine, based on a case that importance of the image to encoding and decoding of another frame in video data to which the image belongs meets a first preset condition, and/or a case that an impact degree of bitstream data corresponding to the image on a network meets a second preset condition, and/or a case that predicted image quality of the image meets a third preset condition, to perform multi-scale encoding on the image.

According to any one of the fourth aspect or the foregoing implementations of the fourth aspect, the first preset condition includes at least one of the following:

the image is an I frame or an IDR frame;

the image is a scene switching frame;

the image is a reference frame; and the image is a key frame.

According to any one of the fourth aspect or the foregoing implementations of the fourth aspect, the second preset condition includes at least one of the following:

a data amount of bitstream data corresponding to the image is greater than a preset data amount threshold; and the data amount of the bitstream data corresponding to the image is greater than a network transmission capability.

According to any one of the fourth aspect or the foregoing implementations of the fourth aspect, the predicted image quality of the image includes first predicted image quality and second predicted image quality. The first predicted image quality is predicted image quality of the image that is encoded based on source resolution of the image, and the second predicted image quality is predicted image quality of the image that is encoded based on resolution lower than the source resolution. The third preset condition includes: The first predicted image quality is lower than or equal to the second predicted image quality.

According to any one of the fourth aspect or the foregoing implementations of the fourth aspect, the pre-processing module is configured to determine the N encoding scales based on an image type of the image and a preset correspondence between an image type and an encoding scale.

According to any one of the fourth aspect or the foregoing implementations of the fourth aspect, the pre-processing module is configured to determine the N groups of encoding parameters based on the N encoding scales and a parameter value range of the encoder.

According to any one of the fourth aspect or the foregoing implementations of the fourth aspect, the encoding parameter includes the reference frame information. When first feedback information is received, the reference frame information is determined based on the first feedback information. The first feedback information indicates that an encoded frame corresponding to sent bitstream data is successfully received. The encoded frame is acknowledged as the reference frame. The reference frame information indicates the reference frame.

The fourth aspect and any implementation of the fourth aspect respectively correspond to the first aspect and any implementation of the first aspect. For technical effects corresponding to the fourth aspect and any implementation of the fourth aspect, refer to the technical effects corresponding to the first aspect and any implementation of the first aspect.

According to a fifth aspect, an embodiment of this application discloses a data encapsulation apparatus, configured to perform the data encapsulation method in any one of the second aspect or the possible implementations of the second aspect.

The fifth aspect and any implementation of the fifth aspect respectively correspond to the second aspect and any implementation of the second aspect. For technical effects corresponding to the fifth aspect and any implementation of the fifth aspect, refer to the technical effects corresponding to the second aspect and any implementation of the second aspect.

According to a sixth aspect, an embodiment of this application discloses a multi-scale decoding apparatus. The multi-scale decoding apparatus includes a decoder and a post-processing module. The decoder is configured to: decode bitstream data to obtain a plurality of reconstructed images, and input the plurality of reconstructed images to the post-processing module. The post-processing module is configured to: obtain the plurality of reconstructed images obtained by decoding the bitstream data by the decoder, and obtain a plurality of groups of description information corresponding to the plurality of reconstructed images, where each reconstructed image corresponds to one group of description information, at least one group of description information in the plurality of groups of description information includes frame identification information; and if only one of the plurality of groups of description information includes first frame identification information, select a reconstructed image corresponding to the first frame identification information and input the reconstructed image to a display module for display; or if at least two groups of description information in the plurality of groups of description information include the first frame identification information, select a reconstructed image from at least two reconstructed images corresponding to the first frame identification information, and input the selected reconstructed image to the display module for display.

The sixth aspect and any implementation of the sixth aspect respectively correspond to the third aspect and any implementation of the third aspect. For technical effects corresponding to the sixth aspect and any implementation of the sixth aspect, refer to the technical effects corresponding to the third aspect and any implementation of the third aspect.

According to a seventh aspect, an embodiment of this application provides an electronic device, including the multi-scale encoding apparatus in the fourth aspect and the data encapsulation apparatus in the fifth aspect.

According to an eighth aspect, an embodiment of this application provides an electronic device, including a memory and a processor. The memory is coupled to the processor. The memory stores program instructions. When the program instructions are executed by the processor, the electronic device is enabled to perform the encoding method in any one of the first aspect or the possible implementations of the first aspect.

The eighth aspect and any implementation of the eighth aspect respectively correspond to the first aspect and any implementation of the first aspect. For technical effects corresponding to the eighth aspect and any implementation of the eighth aspect, refer to the technical effects corresponding to the first aspect and any implementation of the first aspect.

According to a ninth aspect, an embodiment of this application provides an electronic device, including a memory and a processor. The memory is coupled to the processor. The memory stores program instructions. When the program instructions are executed by the processor, the electronic device is enabled to perform the data encapsulation method in any one of the second aspect or the possible implementations of the second aspect.

The ninth aspect and any implementation of the ninth aspect respectively correspond to the second aspect and any implementation of the second aspect. For technical effects corresponding to the ninth aspect and any implementation of the ninth aspect, refer to the technical effects corresponding to the second aspect and any implementation of the second aspect.

According to a tenth aspect, an embodiment of this application provides an electronic device, including a memory and a processor. The memory is coupled to the processor. The memory stores program instructions. When the program instructions are executed by the processor, the electronic device is enabled to perform the display method in any one of the third aspect or third possible implementations of the third aspect.

The tenth aspect and any implementation of the tenth aspect respectively correspond to the third aspect and any implementation of the third aspect. For technical effects corresponding to the tenth aspect and any implementation of the tenth aspect, refer to the technical effects corresponding to the third aspect and any implementation of the third aspect.

According to an eleventh aspect, an embodiment of this application provides a chip, including one or more interface circuits and one or more processors. The interface circuit is configured to receive a signal from a memory of an electronic device, and send the signal to the processor. The signal includes computer instructions stored in the memory. When the processor executes the computer instructions, the electronic device is enabled to perform the encoding method in any one of the first aspect or the possible implementations of the first aspect.

The eleventh aspect and any implementation of the eleventh aspect respectively correspond to the first aspect and any implementation of the first aspect. For technical effects corresponding to the eleventh aspect and any implementation of the eleventh aspect, refer to the technical effects corresponding to the first aspect and any implementation of the first aspect.

According to a twelfth aspect, an embodiment of this application provides a chip, including one or more interface circuits and one or more processors. The interface circuit is configured to receive a signal from a memory of an electronic device, and send the signal to the processor. The signal includes computer instructions stored in the memory. When the processor executes the computer instructions, the electronic device is enabled to perform the data encapsulation method in any one of the second aspect or the possible implementations of the second aspect.

The twelfth aspect and any implementation of the twelfth aspect respectively correspond to the second aspect and any implementation of the second aspect. For technical effects corresponding to the twelfth aspect and any implementation of the twelfth aspect, refer to the technical effects corresponding to the second aspect and any implementation of the second aspect.

According to a thirteenth aspect, an embodiment of this application provides a chip, including one or more interface circuits and one or more processors. The interface circuit is configured to receive a signal from a memory of an electronic device, and send the signal to the processor. The signal includes computer instructions stored in the memory. When the processor executes the computer instructions, the electronic device is enabled to perform the display method in any one of the third aspect or the possible implementations of the third aspect.

The thirteenth aspect and any implementation of the thirteenth aspect respectively correspond to the third aspect and any implementation of the third aspect. For technical effects corresponding to the thirteenth aspect and any implementation of the thirteenth aspect, refer to the technical effects corresponding to the third aspect and any implementation of the third aspect.

According to a fourteenth aspect, an embodiment of this application provides a computer storage medium. The computer-readable storage medium stores a computer program. When the computer program is run on a computer or a processor, the computer or the processor is enabled to perform the encoding method in any one of the first aspect or the possible implementations of the first aspect.

The fourteenth aspect and any implementation of the fourteenth aspect respectively correspond to the first aspect and any implementation of the first aspect. For technical effects corresponding to the fourteenth aspect and any implementation of the fourteenth aspect, refer to the technical effects corresponding to the first aspect and any implementation of the first aspect.

According to a fifteenth aspect, an embodiment of this application provides a computer storage medium. The computer-readable storage medium stores a computer program. When the computer program is run on a computer or a processor, the computer or the processor is enabled to perform the data encapsulation method in any one of the second aspect or the possible implementations of the second aspect.

The fifteenth aspect and any implementation of the fifteenth aspect respectively correspond to the second aspect and any implementation of the second aspect. For technical effects corresponding to the fifteenth aspect and any implementation of the fifteenth aspect, refer to the technical effects corresponding to the second aspect and any implementation of the second aspect.

According to a sixteenth aspect, an embodiment of this application provides a computer storage medium. The computer-readable storage medium stores a computer program. When the computer program is run on a computer or a processor, the computer or the processor is enabled to perform the display method in any one of the third aspect or the possible implementations of the third aspect.

The sixteenth aspect and any implementation of the sixteenth aspect respectively correspond to the third aspect and any implementation of the third aspect. For technical effects corresponding to the sixteenth aspect and any implementation of the sixteenth aspect, refer to the technical effects corresponding to the third aspect and any implementation of the third aspect.

According to a seventeenth aspect, an embodiment of this application provides a computer program product. The computer program product includes a software program. When the software program is executed by a computer or a processor, the steps in the first aspect or any possible implementation of the first aspect are performed.

The seventeenth aspect and any implementation of the seventeenth aspect respectively correspond to the first aspect and any implementation of the first aspect. For technical effects corresponding to the seventeenth aspect and any implementation of the seventeenth aspect, refer to the technical effects corresponding to the first aspect and any implementation of the first aspect.

According to an eighteenth aspect, an embodiment of this application provides a computer program product. The computer program product includes a software program. When the software program is executed by a computer or a processor, the steps in the second aspect or any possible implementation of the second aspect are performed.

The eighteenth aspect and any implementation of the eighteenth aspect respectively correspond to the second aspect and any implementation of the second aspect. For technical effects corresponding to the eighteenth aspect and any implementation of the eighteenth aspect, refer to the technical effects corresponding to the second aspect and any implementation of the second aspect.

According to a nineteenth aspect, an embodiment of this application provides a computer program product. The computer program product includes a software program. When the software program is executed by a computer or a processor, the steps in the third aspect or any possible implementation of the third aspect are performed.

The nineteenth aspect and any implementation of the nineteenth aspect respectively correspond to the third aspect and any implementation of the third aspect. For technical effects corresponding to the nineteenth aspect and any implementation of the nineteenth aspect, refer to the technical effects corresponding to the third aspect and any implementation of the third aspect.

BRIEF DESCRIPTION OF DRAWINGS

FIG. 4b-1 and FIG. 4b-2 are schematic diagrams of an example of data processing;

FIG. 6a-1 and FIG. 6a-2 are schematic diagrams of an example of a processing process;

FIG. 6b (1) and FIG. 6b (2) are schematic diagrams of an example of a processing process;

FIG. 7a-1 and FIG. 7a-2 are schematic diagrams of an example of a structure of a device;

FIG. 7b-1 and FIG. 7b-2 are schematic diagrams of an example of a processing process;

FIG. 7c (1) and FIG. 7c (2) are schematic diagrams of an example of a processing process.

DESCRIPTION OF EMBODIMENTS

The following clearly and completely describes the technical solutions in embodiments of this application with reference to the accompanying drawings in embodiments of this application. It is clear that the described embodiments are some but not all of embodiments of this application. All other embodiments obtained by a person of ordinary skill in the art based on embodiments of this application without creative efforts shall fall within the protection scope of this application.

The term "and/or" in this specification describes only an association relationship for describing associated objects and represents that at least three relationships may exist. For example, A and/or B may represent the following three cases: Only A exists, both A and B exist, and only B exists.

In the specification and claims in embodiments of this application, the terms "first", "second", and so on are intended to distinguish between different objects but do not indicate a particular order of the objects. For example, a first target object, and a second target object are used to distinguish between different target objects, but are not used to describe a particular order of the target objects.

In addition, in embodiments of this application, the word "exemplary" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

In the description of the embodiment of this application, unless otherwise stated, "multiple" means two or more than two. For example, a plurality of processing units means two or more processing units; and a plurality of systems mean two or more systems.

Figure 1:
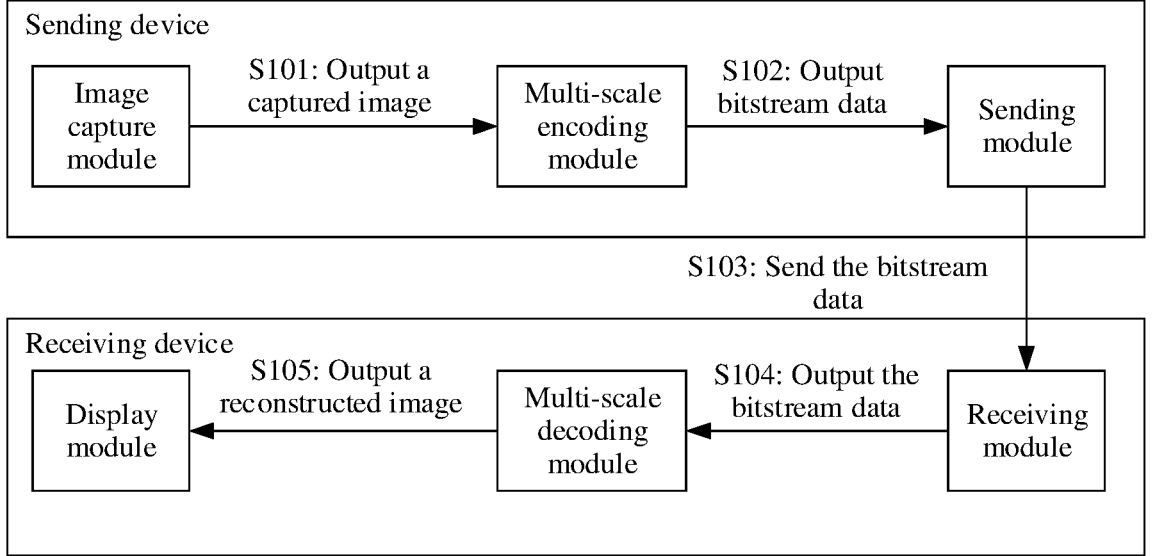
FIG. 1 is a schematic diagram of an example of an application scenario.

FIG. 1 is a schematic diagram of an example of an application scenario.

Refer to FIG. 1. For example, the application scenario in FIG. 1 may be various video service scenarios, such as a video conference scenario, a video call scenario, an online education scenario, a remote tutoring scenario, a low-latency live broadcast scenario, a cloud game scenario, a wireless screen projection scenario, and a wireless extended screen scenario. This is not limited in this embodiment.

Refer to FIG. 1. For example, the application scenario may include a sending device and a receiving device.

For example, the sending device includes but is not limited to a server, a personal computer (PC), a laptop computer, a tablet computer, a mobile phone, and a watch.

For example, the receiving device includes but is not limited to a PC, a laptop computer, a tablet computer, a mobile phone, and a watch.

For example, in a video conference scenario, the sending device may be a PC or a laptop computer, and the receiving device may be a PC or a laptop computer.

For example, in an online education scenario, the sending device may be a PC or a laptop computer, and the receiving device may be a tablet computer.

For example, in a cloud game scenario, the sending device may be a server, and the receiving device may be a tablet computer, a PC, a laptop computer, or a mobile phone.

For example, the sending device may include an image capture module, a multi-scale encoding module, and a sending module. It should be understood that FIG. 1 is merely an example of the sending device. The sending device in some other embodiments of this application has more modules than those shown in FIG. 1. This is not limited in this embodiment.

For example, the image capture module is configured to capture an image.

For example, the multi-scale encoding module is configured to perform multi-scale encoding decision-making and encoding.

For example, the sending module is configured to send data.

For example, the receiving device may include a display module, a multi-scale decoding module, and a receiving module. It should be understood that FIG. 1 is merely an example of the receiving device. The receiving device in some other embodiments of this application has more modules than those shown in FIG. 1. This is not limited in this embodiment.

For example, the receiving module is configured to receive data.

For example, the multi-scale decoding module is configured to perform decoding and display decision-making.

For example, the display module is configured to perform displaying.

Still refer to FIG. 1. For example, a process that after capturing the image, the sending device sends the captured image to the receiving device for display is as follows.

S101: The image capture module outputs the captured image to the multi-scale encoding module.

For example, the image capture module may capture the image by using a camera.

For example, the image capture module may capture the image output by a display card (also referred to as a graphics card).

For example, the image capture module may capture the image in a screen capture manner.

For example, after capturing the image, the image capture module may output the captured image to the multi-scale encoding module.

S102: The multi-scale encoding module outputs bitstream data to the sending module.

For example, after receiving the image, the multi-scale encoding module may perform multi-scale encoding decision-making, that is, perform decision-making on whether to perform multi-scale encoding (which may also be referred to as scalable encoding, hierarchical encoding, or layered encoding) on the image. When it is determined to perform multi-scale encoding on the image, multi-scale encoding may be performed on the image. When it is determined not to perform multi-scale encoding on the image, single-scale encoding is performed on the image. After the image is encoded, the multi-scale encoding module outputs the bitstream data obtained through encoding to the sending module.

S103: The sending module sends the bitstream data to the receiving module.

For example, after receiving the bitstream data, the sending module may send the bitstream data to the receiving device.

S104: The receiving module outputs the received bitstream data to the multi-scale decoding module.

For example, the receiving module of the receiving device may receive the bitstream data, and then output the bitstream data to the multi-scale decoding module.

S105: The multi-scale decoding module outputs a reconstructed image to the display module.

For example, after receiving the bitstream data, the multi-scale decoding module may perform decoding on the bitstream data, and perform image reconstruction, to obtain the reconstructed image. For example, for an image on which multi-scale encoding is performed, reconstructed images of a plurality of encoding scales are obtained through decoding. In this case, the multi-scale decoding module may perform display decision, select a reconstructed image with an encoding scale, and output the reconstructed image of the encoding scale to the display module. For example, for an image on which single-scale encoding is performed, a reconstructed image of an encoding scale is obtained through decoding. In this case, the multi-scale decoding module may directly output the image to the display module.

For example, after receiving the reconstructed image input by the multi-scale decoding module, the display module may display the reconstructed image.

Figure 2:
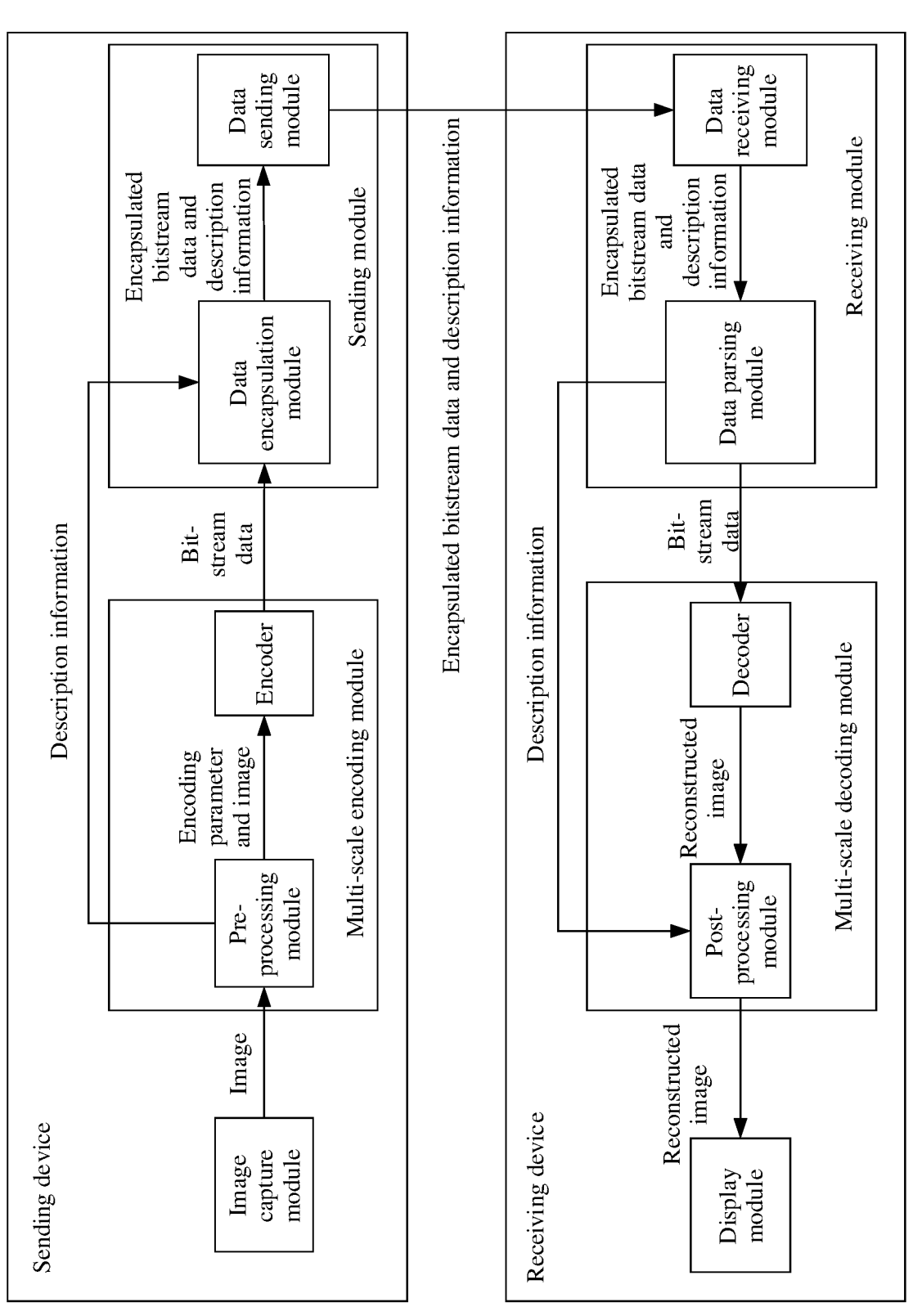
FIG. 2 is a schematic diagram of an example of a scenario.

FIG. 2 is a schematic diagram of an example of a scenario.

Refer to FIG. 2. For example, a multi-scale encoding module may include a pre-processing module and an encoder.

For example, the pre-processing module may be configured to perform multi-scale encoding decision-making, and the encoder may be configured to perform encoding.

It should be noted that the encoder included in the multi-scale encoding module is a single-scale encoder. The single-scale encoder may be an encoder that can perform encoding on an image at only one encoding scale and output bitstream data with only one encoding scale, for example, an H.264 encoder, an H.265 encoder, an H.266 encoder, an AV1 encoder, or an AVS3 encoder. This is not limited in this embodiment. For example, the single-scale encoder may be a software encoder, or may be a hardware encoder. This is not limited in this embodiment.

For example, a pre-processing module may be added to a sending device including the single-scale encoder (that is, program code corresponding to the pre-processing module is written into the sending device). To be specific, a multi-scale encoding module may be obtained, to implement multi-scale encoding by using the existing single-scale encoder.

Because costs of a multi-scale encoder (such as a scalable video coding (SVC) encoder and a scalable high-efficiency video coding (SHVC) encoder) in the conventional technology are high, and encoders in most electronic devices currently are single-scale encoders. Therefore, by using the foregoing described method, multi-scale encoding and decoding can be implemented without increasing costs in an electronic device that does not support multi-scale encoding.

Still refer to FIG. 2. For example, a sending module may include a data encapsulation module and a data sending module. For example, the data encapsulation module is configured to encapsulate data, and the data sending module is configured to send encapsulated data.

Still refer to FIG. 2. For example, a multi-scale decoding module may include a decoder and a post-processing module. For example, the decoder is configured to perform decoding, and the post-processing module is configured to display a decision.

For example, the decoder may be a single-scale decoder. The single-scale decoder may be a decoder that can decode data of only one encoding scale and generate a unique reconstructed image after decoding, for example, an H.264 decoder, an H.265 decoder, an H.266 decoder, an AV1 decoder, or an AVS3 decoder. This is not limited in this embodiment. For example, the single-scale decoder may be a software decoder, or may be a hardware decoder. This is not limited in this embodiment.

For example, a post-processing module may be added to a receiving device including the single-scale decoder (that is, program code corresponding to the post-processing module is written into the receiving device). To be specific, a multi-scale decoding module may be obtained, to implement multi-scale decoding by using the existing single-scale decoder.

In the conventional technology, costs of a decoder (such as an SVC decoder or an SHVC decoder) that supports multi-scale decoding are high, and decoders in most electronic devices are currently single-scale decoders. Therefore, by using the foregoing described method, multi-scale decoding can be implemented without increasing costs in an electronic device that does not support multi-scale encoding and decoding.

Still refer to FIG. 2. For example, the receiving module includes a data receiving module and a data parsing module. For example, the data receiving module is configured to receive data, and the data parsing module is configured to parse the data.

Still refer to FIG. 2. For example, after capturing an image, an image capture module may output the captured image to the pre-processing module. For example, in a video service scenario, the image capture module may capture the image based on a specified video sampling rate, to obtain video data corresponding to the video service scenario. For example, the image capture module may transfer the image to the pre-processing module at a specified interval (the specified interval may be set according to a requirement), or may transfer one frame of image to the pre-processing module after each frame of image is captured. This is not limited in this embodiment. In this embodiment, a frame of image in video data is used as an example for description.

For example, the pre-processing module may determine whether to perform multi-scale encoding on the image, and when determining to perform multi-scale encoding on the image, determine N encoding scales (N is a positive integer greater than 1) for the image, and determine N groups of encoding parameters corresponding to the N encoding scales. Each encoding scale corresponds to one encoding parameter (that is, an encoding parameter corresponding to each of the N encoding scales is determined). Then, the pre-processing module may indicate the encoder to encode the image for N times based on the N groups of encoding parameters, to obtain N groups of bitstream data. Each group of bitstream data corresponds to an encoding scale. A manner in which the pre-processing module determines whether to perform multi-scale encoding on the image, a manner of determining the N encoding scales, and a manner of determining the encoding parameter are all described subsequently.

For example, the encoding parameter may include at least one of the following: resolution, a quantization parameter, reference frame information, and a target bit rate. The quantization parameter and the target bit rate may be obtained through mutual conversion. Therefore, when the encoding parameter includes a plurality of parameters, the encoding parameter may include only one of the quantization parameter and the target bit rate.

For example, the resolution may include source resolution and/or target encoding resolution.

For example, the source resolution is resolution of an image input to the encoder.

For example, the target encoding resolution is resolution of an image that can be reconstructed after image encoding, or resolution at which the encoder actually performs encoding.

It should be understood that when the source resolution and the target encoding resolution are the same, only one of the source resolution and the target encoding resolution may be input.

For example, the quantization parameter is an encoding quantization parameter used by the encoder to encode the image. The quantization parameter determines a quality distortion degree of the encoded image. A larger quantization parameter indicates a higher distortion degree of the encoded image relative to a source image. A smaller quantization parameter indicates a lower distortion degree of the encoded image relative to the source image.

For example, a reference frame may be a frame referenced when an encoder encodes a frame, or a frame referenced when a decoder reconstructs a frame. The reference frame information indicates a reference frame, and may include a frame identifier, scale identification information, and the like. The frame identifier may include any identifier that may point to a frame of image, for example, a frame number and display time (a presentation time corresponding to the captured image). The scale identification information is used to uniquely identify an encoding scale.

For example, a target bit rate is an expected bit rate of the encoded image.

It should be understood that the encoding parameter may further include another parameter such as target quality. This is not limited in this application. For example, the target quality is expected quality of the encoded image. For example, the target quality may include but is not limited to a target peak signal to noise ratio (PSNR), a target mean square error (MSE), structural similarity (SSIM), video multimethod assessment fusion (VMAF), and the like.

For example, after determining the encoding parameter, the pre-processing module may transfer the encoding parameter and the image to the encoder. For example, the pre-processing module may transfer the image and a group of encoding parameters to the encoder each time for encoding until the N groups of encoding parameters are transferred to the encoder.

For example, when determining not to perform multi-scale encoding on the image, the pre-processing module may determine an encoding parameter of single-scale encoding, and then indicate the encoder to perform single-scale encoding on the image based on the encoding parameter of single-scale encoding, to obtain a group of bitstream data.

For example, after receiving the encoding parameter and the image, the encoder may encode the image based on the encoding parameter to obtain the bitstream data, and then transmit the bitstream data to the data encapsulation module.

For example, the pre-processing module may further determine description information of the image. The description information may include a plurality of types of information, including but not limited to scale identification information, a frame identifier, and a frame type. It should be understood that the description information may further include other information. This is not limited in this application.

For example, the frame type may include but is not limited to: an I/IDR frame (intra frame, intra-encoded frame), a key frame, a scene switching frame, a reference frame, and a non-reference frame.

For example, the I/IDR frame refers to a frame encoded in an intra-frame encoding manner.

For example, the key frame is a frame that is used as a reference frame by frames that are more than a preset quantity threshold. The preset quantity threshold may be set based on a requirement. This is not limited in this embodiment.

For example, the scene switching frame is a first frame image of a scene after scene switching.

For example, the non-reference frame is a frame other than the reference frame.

For example, for a frame of image on which multi-scale encoding is performed, after determining each group of encoding parameters, the pre-processing module may use scale identification information of an encoding scale corresponding to the group of encoding parameters, a frame identifier of the image, and a frame type of the image as description information of the image with the encoding scale. That is, for the image on which multi-scale encoding is performed, the pre-processing module may correspondingly generate N groups of description information. Each group of description information corresponds to one encoding scale. The N groups of description information have same frame identification information.

For example, for a frame of image on which single-scale encoding is performed, the pre-processing module may use the frame identifier and the frame type of the image as the description information of the image. It should be understood that the pre-processing module may alternatively use the scale identification information of the encoding scale corresponding to the single scale, the frame identifier of the image, and the frame type of the image as the description information of the image. This is not limited in this embodiment.

For example, for the frame of image on which multi-scale encoding is performed, the data encapsulation module may encapsulate an $i^{th}$ group of description information and an $i^{th}$ group of bitstream data to obtain bitstream data and description information that are of the image and that are encapsulated at an $i^{th}$ encoding scale. i is a positive integer less than or equal to N.

For example, for the frame of image on which single-scale encoding is performed, the pre-processing module may encapsulate the description information and the bitstream data of the image to obtain encapsulated bitstream data and description information that correspond to the image.

For example, in a possible manner, the data encapsulation module may directly transfer the encapsulated bitstream data and description information to the data sending module. In another possible manner, the data encapsulation module may further store the encapsulated bitstream data and description information.

For example, the data encapsulation module may further determine a transmission policy of the encapsulated bitstream data and description information based on the description information, and then send the corresponding transmission policy to the data sending module when sending the encapsulated bitstream data and description information to the data sending module.

For example, when determining, based on the scale identification information, that an encoding scale corresponding to the bitstream data is a lowest encoding scale, the data encapsulation module determines that a transmission policy of the bitstream data is a first transmission policy; or when determining, based on the scale identification information, that the encoding scale corresponding to the bitstream data is another encoding scale, the data encapsulation module determines that the transmission policy of the bitstream data is a second transmission policy, where the first transmission policy is superior to the second transmission policy. In this way, the bitstream data with the lowest encoding scale may be preferentially transmitted, to improve a success rate of transmitting the bitstream data with the lowest encoding scale to a receiving device, thereby ensuring smoothness of watching a video by a user of the receiving device.

For example, the first transmission policy may include at least one of the following: performing transmission through a transmission channel whose quality of service is higher than first preset quality of service, retransmitting data and a quantity of retransmission times is greater than a first preset quantity of retransmission times, increasing redundancy of the data to be greater than a first redundancy threshold, and performing forward error correction (forward error correction, FEC of a data packet) on the data.

For example, the second transmission policy may include at least one of the following: performing transmission through a transmission channel whose quality of service is lower than or equal to the first preset quality of service, not retransmitting the data, retransmitting the data and a quantity of retransmission times is less than or equal to the first preset quantity of retransmission times, not increasing redundancy of the data, increasing redundancy of the data to be less than or equal to the first redundancy threshold, and discarding the data before sending.

The first preset quality of service, the first preset quantity of retransmission times, and the first redundancy threshold may all be set based on a requirement. This is not limited in this embodiment.

For example, when determining that the frame type corresponding to the bitstream data is a preset frame type, the data encapsulation module determines that the transmission policy of the bitstream data is a third transmission policy; or when determining that the frame type corresponding to the bitstream data is a non-preset frame type, the data encapsulation module determines that the transmission policy of the bitstream data is a fourth transmission policy, where the third transmission policy is superior to the fourth transmission policy. The preset frame type includes at least one of the following: an I frame, an IDR frame, a key frame, a reference frame, and a scene switching frame. In this way, a frame of bitstream data that is important for encoding and decoding may be preferentially transmitted, to improve a success rate of decoding another frame, and ensure smoothness of watching a video by a user of a receiving device.

For example, the third transmission policy may include at least one of the following: performing transmission through a transmission channel whose quality of service is higher than second preset quality of service, retransmitting data and a quantity of retransmission times is greater than a second preset quantity of retransmission times, increasing redundancy of the data to be greater than a second redundancy threshold, and performing FEC (forward error correction, forward error correction of a data packet) on the data.

For example, the fourth transmission policy may include at least one of the following: performing transmission through a transmission channel whose quality of service is lower than or equal to the second preset quality of service, not retransmitting data, retransmitting the data and a quantity of retransmission times is less than or equal to the second preset quantity of retransmission times, not increasing redundancy of the data, increasing the redundancy of the data to be less than or equal to the second redundancy threshold, and discarding the data before sending.

The second preset quality of service, the second preset quantity of retransmission times, and the second redundancy threshold may all be set based on a requirement. This is not limited in this embodiment.

For example, the second preset quality of service may be the same as or different from the first preset quality of service. The second preset quantity of retransmission times may be the same as or different from the first preset quantity of retransmission times. The second redundancy threshold may be the same as or different from the first redundancy threshold. This is not limited in this embodiment.

For example, after receiving the encapsulated bitstream data and the description information, the data receiving module may send the encapsulated bitstream data and description information to the receiving device according to a corresponding transmission policy.

For example, after receiving the encapsulated bitstream data and description information, the data receiving module of the receiving device sends the encapsulated bitstream data and description information to the data parsing module.

For example, the data parsing module may decapsulate the encapsulated bitstream data and description information, to obtain the description information and the bitstream data. Then, the data parsing module may send the bitstream data to the decoder, and the data parsing module may send the description information to the post-processing module.

For example, the decoder may perform image reconstruction based on the bitstream data to obtain a reconstructed image, and then may send the reconstructed image to the post-processing module. For the image on which multi-scale encoding is performed, there are N reconstructed images corresponding to the image, and each reconstructed image corresponds to one encoding scale. Because only one reconstructed image is displayed in a same frame during display, the post-processing module needs to make a display decision. For example, for the image on which single-scale encoding is performed, there is one reconstructed image corresponding to the image.

For example, after receiving the plurality of reconstructed images, the post-processing module may select, based on a plurality of groups of description information corresponding to the plurality of reconstructed images, a reconstructed image for display. Each reconstructed image corresponds to one group of description information, and each group of description information includes frame identification information. For example, in the plurality of received reconstructed images, frame identification information of each reconstructed image may be different, or frame identification information of some reconstructed images may be the same. Further, for each piece of frame identification information, a reconstructed image for display may be selected from reconstructed images corresponding to the frame identification information. When the post-processing module receives a display sending signal sent by the display module, or a display sending period arrives, the post-processing module may select, from the plurality of groups of description information, frame identification information corresponding to a latest decoded reconstructed image as first frame identification information, and then determine a quantity of pieces of description information of the first frame identification information included in the plurality of groups of description information. If only one group of description information in the plurality of groups of description information includes the first frame identification information, a reconstructed image corresponding to the first frame identification information is selected for display; or if at least two groups of description information in the plurality of groups of description information include the first frame identification information, a reconstructed image is selected from at least two reconstructed images corresponding to the first frame identification information, and the selected reconstructed image is displayed.

In a possible manner, the post-processing module may determine scale identification information of each reconstructed image based on the description information corresponding to each reconstructed image. Then, a reconstructed image with a highest encoding scale may be selected from the plurality of reconstructed images corresponding to the first frame identification information based on the scale identification information of the plurality of reconstructed images corresponding to the first frame identification information. A higher encoding scale indicates a superior image. Therefore, when each frame is presented to the user, an optimal image is presented.

In a possible manner, the post-processing module may select, from the plurality of reconstructed images corresponding to the first frame identification information and based on the scale identification information of the plurality of reconstructed images corresponding to the first frame identification information, a reconstructed image whose scale identification information is closest to scale identification information of a previously displayed reconstructed image. Further, a difference between adjacent frames can be reduced, and visual smoothness of watching each frame of video by the user can be ensured.

For example, after receiving the reconstructed image sent by the post-processing module, the display module may display the received reconstructed image based on a frame number of each reconstructed image.

The following describes the manner in which the pre-processing module determines whether to perform multi-scale encoding on the image, the manner of determining the N encoding scales, and the manner of determining the encoding parameter.

An $m^{th}$ (m is a positive integer) frame of image is used as an example for description.

Figure 3A:
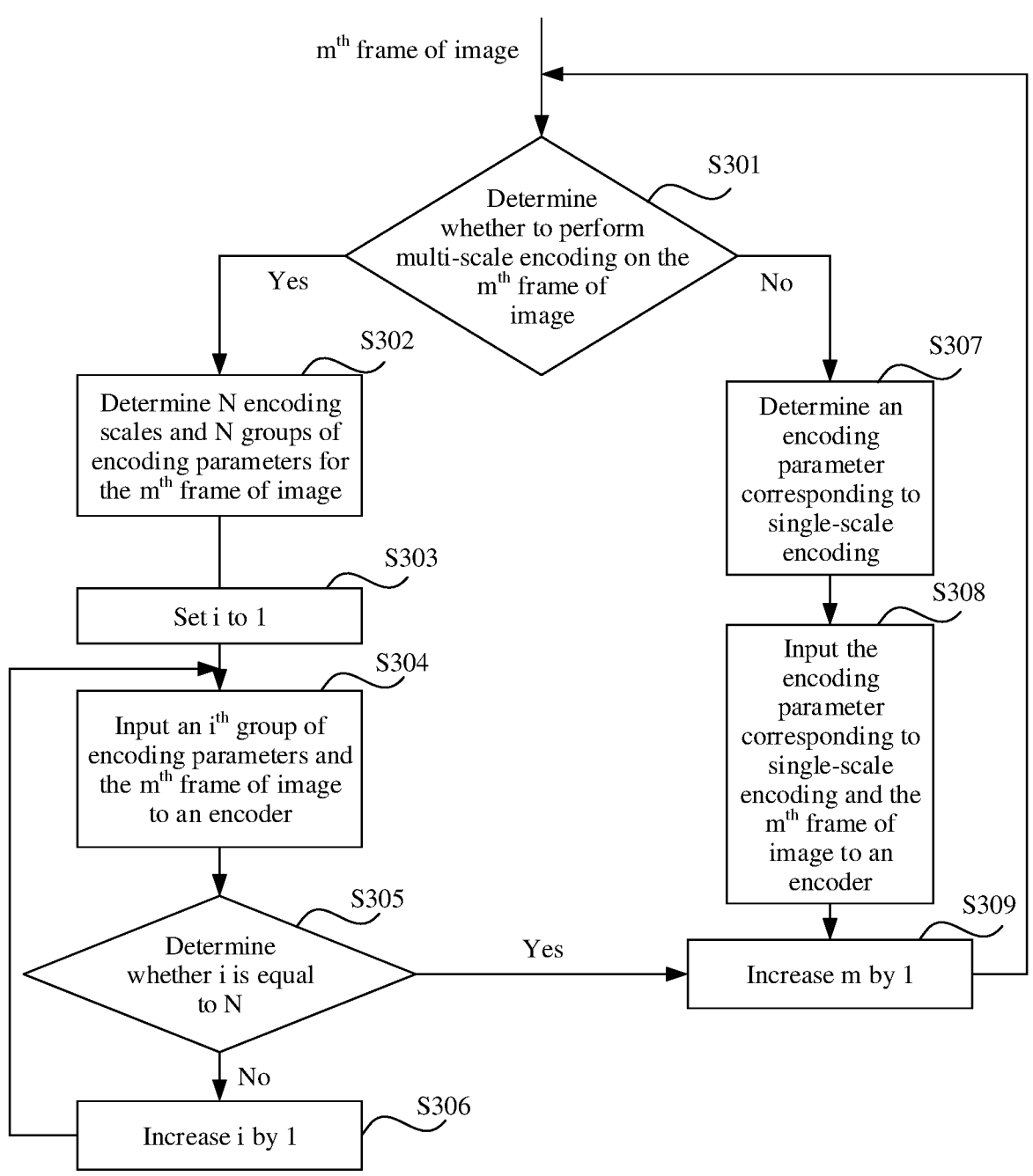
FIG. 3a is a schematic diagram of an example of a processing process.

FIG. 3a is a schematic diagram of an example of a pre-processing process. Refer to FIG. 3. For example, a data processing process of the pre-processing module is as follows.

S301: Determine whether to perform multi-scale encoding on the $m^{th}$ frame of image.

For example, after receiving the $m^{th}$ frame of image input by the image capture module, the pre-processing module may determine, based on importance of the $m^{th}$ frame of image to encoding and decoding of another frame in video data to which the $m^{th}$ frame of image belongs, and/or an impact degree of bitstream data corresponding to the $m^{th}$ frame of image on a network, whether to perform multi-scale encoding on the $m^{th}$ frame of image. When importance of the $m^{th}$ frame of image to encoding and decoding of another frame in the video data to which the $m^{th}$ frame of image belongs meets a first preset condition, and/or the impact degree of the bitstream data corresponding to the $m^{th}$ frame of image on the network meets a second preset condition, it is determined to perform multi-scale encoding on the image.

For example, the first preset condition includes at least one of the following:

the $m^{th}$ frame of image is an I frame or an IDR frame;

the $m^{th}$ frame of image is a scene switching frame;

the $m^{th}$ frame of image is a reference frame; and the $m^{th}$ frame of image is a key frame.

That is, when the $m^{th}$ frame of image is the I frame or the IDR frame, and/or the scene switching frame, and/or the reference frame, and/or the key frame, it indicates that the $m^{th}$ frame of image is important to encoding and decoding of another frame in the video data. In this case, it may be determined to perform multi-scale encoding on the $m^{th}$ frame of image, to ensure that when a network transmission capability is poor, a probability of successfully transmitting bitstream data with a minimum encoding scale to the receiving device can be increased, thereby ensuring smoothness of watching the video by the user of the receiving device.

For example, a manner of determining, based on importance of the $m^{th}$ frame of image to encoding and decoding of another frame in the video data to which the $m^{th}$ frame of image belongs, whether to perform multi-scale encoding on the $m^{th}$ frame of image may include at least one of the following.

(1) Determine whether the $m^{th}$ frame of image is the I frame or the IDR frame.

For example, determining whether the $m^{th}$ frame of image is the I frame or the IDR frame is determining whether the $m^{th}$ frame of image is to be encoded into the I frame or the IDR frame.

For example, a quantity S (S is a positive integer) of images included in a group of picture (GOP) may be set in advance based on a video service scenario, and a first frame of image in each GOP is set as an I frame or an IDR frame. After receiving the $m^{th}$ frame of image, the pre-processing module may determine, based on m and S, whether to encode the $m^{th}$ frame of image into the I/IDR frame. For example, when m=1, the pre-processing module may determine that the $m^{th}$ frame of image is the I/IDR frame. When m is greater than 1 and m is less than or equal to S, the pre-processing module may determine that the $m^{th}$ frame of image is not the I/IDR frame. When m is greater than S, the pre-processing module may calculate a remainder between m and S. If the remainder is equal to 1, the pre-processing module may determine that the $m^{th}$ frame of image is the I/IDR frame. If the remainder is not equal to 1, the pre-processing module may determine that the $m^{th}$ frame of image is not the I/IDR frame.

For example, in a process in which the pre-processing module determines, based on m and S, whether the $m^{th}$ frame of image is the I/IDR frame, if the pre-processing module receives display failure information (for example, artifacts) fed back by the receiving device, the pre-processing module may determine the $m^{th}$ frame of image as the I/IDR frame, use the image as the first frame of the GOP, and record a value of m as R. After receiving the image after R frames, the pre-processing module may determine, based on R, m, and S, whether the $m^{th}$ image frame is the I/IDR frame. For example, when (m–R) is greater than 0 and (m–R) is less than or equal to S, the pre-processing module may determine that the $m^{th}$ frame of image is not the I/IDR frame. When (m–R) is greater than S, the pre-processing module may calculate a remainder between (m–R) and S. If the remainder is equal to 1, the pre-processing module may determine that the $m^{th}$ frame of image is the I/IDR frame. If the remainder is not equal to 1, the pre-processing module may determine that the $m^{th}$ frame of image is not the I/IDR frame.

(2) Determine whether the $m^{th}$ frame of image is the scene switching frame.

For example, if m=1, the pre-processing module may determine that the $m^{th}$ frame of image is the scene switching frame. If m is greater than 1, the pre-processing module may compare the $m^{th}$ frame of image with an (m–1)th frame of image. If similarity between the $m^{th}$ frame of image and the (m–1)th frame of image is less than or equal to a similarity threshold, it may be determined that the $m^{th}$ frame of image is the scene switching frame. If similarity between the $m^{th}$ frame of image and the (m–1)th frame of image is greater than the preset similarity threshold, it may be determined that the $m^{th}$ frame of image is not the scene switching frame.

(3) Determine whether the $m^{th}$ frame of image is the reference frame.

For example, before sending each frame of image to the encoder, the pre-processing module may specify a corresponding reference frame for each frame of image.

For example, determining whether the $m^{th}$ frame of image is the reference frame is determining whether the $m^{th}$ frame of image is specified as a reference frame of another frame. For example, the $m^{th}$ frame of image may be designated as a reference frame of another frame before the $m^{th}$ frame of image, or may be designated as a reference frame of another frame after the $m^{th}$ frame of image. When the $m^{th}$ frame of image is specified as the reference frame of the another frame, it may be determined that the $m^{th}$ frame is the reference frame.

(4) Determine whether the $m^{th}$ frame of image is the key frame.

For example, whether a quantity of other frames that depend on bitstream data of the $m^{th}$ frame of image for encoding is less than a preset quantity threshold is determined. The preset quantity threshold may be set according to a requirement. For example, one GOP includes eight frames of images, and the preset quantity threshold may be 4, that is, four frames of images in the GOP depend on the image for encoding and decoding.

For example, when the quantity of other frames that depend on the $m^{th}$ frame of image for encoding and decoding is greater than or equal to the preset quantity threshold, it may be determined that the $m^{th}$ frame of image is the key frame. When the quantity of other frames that depend on the $m^{th}$ frame of image for encoding and decoding is less than the preset quantity threshold, it may be determined that the $m^{th}$ frame of image is not the key frame.

For example, the $m^{th}$ frame of image may be one or more of the scene switching frame, the I frame, the IDR frame, the reference frame, and the key frame.

For example, the second preset condition includes at least one of the following:

a data amount of bitstream data of the $m^{th}$ frame of image is greater than a preset data amount threshold; and the data amount of the bitstream data of the $m^{th}$ frame of image is greater than a network transmission capability.

To be specific, when the data amount of the bitstream data of the $m^{th}$ frame of image is greater than the preset data amount threshold, or the data amount of the bitstream data of the $m^{th}$ frame of image is greater than the network transmission capability, it indicates that the bitstream data corresponding to the $m^{th}$ frame of image has large impact on the network. In this case, it may be determined to perform multi-scale encoding on the $m^{th}$ frame of image, so that a probability of successfully transmitting bitstream data with a lowest encoding scale and a minimum data amount to the receiving device can be increased, thereby ensuring smoothness of watching the video by the user of the receiving device.

For example, a manner of determining, based on the impact degree of the bitstream data corresponding to the $m^{th}$ frame of image on the network, whether to perform multi-scale encoding on the $m^{th}$ frame of image may include at least one of the following.

(1) Determine whether the data amount of the bitstream data of the $m^{th}$ frame of image is greater than the preset data amount threshold.

For example, the pre-processing module may estimate the data amount of the bitstream data of the $m^{th}$ frame of image based on a parameter of the encoder and image complexity of the $m^{th}$ frame of image, and then determine whether the data amount of the bitstream data of the $m^{th}$ frame of image is greater than the preset data amount threshold. The preset data amount threshold may be set based on a requirement. This is not limited in this embodiment.

In a possible manner, the pre-processing module may send the $m^{th}$ frame of image to the encoder for precoding, to determine whether the data amount of the bitstream data of the $m^{th}$ frame of image is greater than the preset data amount threshold.

(2) Determine whether the data amount of the bitstream data of the $m^{th}$ frame of image is greater than the network transmission capability.

For example, the pre-processing module may obtain the current network transmission capability (for example, network bandwidth, that is, an amount of data that can be transmitted in a unit time (generally refer to one second)) of the sending device, and estimate the data amount of the bitstream data of the $m^{th}$ frame of image. For this, refer to the foregoing related descriptions. Then, the pre-processing module compares the data amount of the bitstream data of the $m^{th}$ frame of image with the current network transmission capability of the sending device, to determine whether the data amount of the bitstream data of the $m^{th}$ frame of image is greater than the network transmission capability.

For example, when it is determined to perform multi-scale encoding on the $m^{th}$ frame of image, S302 may be performed. When it is determined not to perform multi-scale encoding on the $m^{th}$ frame of image, S307 may be performed.

S302: Determine N encoding scales and N groups of encoding parameters for the $m^{th}$ frame of image.

In a possible manner, a corresponding encoding scale may be preset for each frame in the video data. Refer to Table 1.

TABLE 1

| Frame number | Encoding scale |
| --- | --- |
| 1 | N = 4 |
| 2 | N = 3 |

TABLE 1-continued

| Frame number | Encoding scale |
|---|---|
| 3 | N = 2 |
| 4 | Multi-scale encoding is not performed |
| . . . | . . . |
| M (M is a positive integer) | N = 2 |

In Table 1, M may be a total quantity of frames of images included in the video data, or may be a quantity of frames of images included in one GOP in the video data. This is not limited in this embodiment. For example, when M is the quantity of frames of image included in the one GOP, encoding scales set for frames at a same location in different GOPs may be the same or may be different. This is not limited in this embodiment.

Further, the encoding scale corresponding to the $m^{th}$ frame of image may be searched for from the encoding scale preset for each frame in the video data. For example, M is a total quantity of image frames included in the video data. If m=2, it may be determined that the N encoding scales corresponding to the $m^{th}$ frame of image is 3.

In a possible manner, encoding scales corresponding to various frame types may be preset, as shown in Table 2.

TABLE 2

| Frame type | Encoding scale |
|---|---|
| I/IDR frame | N = 4 |
| Scene switching frame | N = 3 |
| Key frame | N = 3 |
| Reference frame | N = 2 |
| . . . | . . . |

Further, the encoding scale corresponding to the $m^{th}$ frame of image may be searched for from the preset encoding scales corresponding to the various frame types based on the frame type of the $m^{th}$ frame of image. For example, if the frame type of the $m^{th}$ frame of image is the key frame, it may be determined that the N encoding scales corresponding to the $m^{th}$ frame of image is 3.

In a possible manner, N encoding scales corresponding to various network transmission capabilities may be preset, as shown in Table 3.

TABLE 3

| Network transmission capability | Encoding scale |
|---|---|
| Network data transmission amount $\epsilon$ [0, D1] | N = 4 |
| Network data transmission amount $\epsilon$ (D1, D2] | N = 3 |
| Network data transmission amount $\epsilon$ (D3, D4] | N = 2 |
| Network data transmission amount $\epsilon$ (D4, D5] | N = 2 |
| . . . | . . . |

For example, D1<D2<D3<D4<D5 in Table 3. D1, D2, D3, D4, and D5 may be set based on a requirement. This is not limited in this embodiment.

Further, the encoding scale corresponding to the $m^{th}$ frame of image may be searched for from the preset encoding scales corresponding to the various network transmission capabilities based on the data amount of the $m^{th}$ frame of image. For example, if the data amount of the bitstream data of the $m^{th}$ frame of image $\in$ (D3, D4], it may be determined that the N encoding scales corresponding to the $m^{th}$ frame of image is 2.

In a possible manner, encoding scales corresponding to frame types of images and network transmission capabilities may be preset, as shown in Table 4.

TABLE 4

| Frame type | Network transmission capability | Encoding scale |
|---|---|---|
| I/IDR frame | Network data transmission amount $\epsilon$ [0, D1] | N = 4 |
| | Network data transmission amount $\epsilon$ (D1, D2] | N = 3 |
| | Network data transmission amount $\epsilon$ (D3, D4] | N = 2 |
| | Network data transmission amount $\epsilon$ (D4, D5] | N = 2 |
| Scene switching frame | Network data transmission amount $\epsilon$ [0, D1] | N = 5 |
| | Network data transmission amount $\epsilon$ (D1, D2] | N = 4 |
| | Network data transmission amount $\epsilon$ (D3, D4] | N = 3 |
| | Network data transmission amount $\epsilon$ (D4, D5] | N = 2 |
| . . . | . . . | . . . |

Further, based on the data amount and the frame type of the bitstream data of the $m^{th}$ frame of image, the encoding scale corresponding to the $m^{th}$ frame of image may be searched for from the preset encoding scale corresponding to the frame type and the network transmission capability of the image. For example, if the data amount of the bitstream data of the $m^{th}$ frame of image $\in$ (D3, D4], and the frame type is the scene switching frame, it may be determined that the N encoding scales corresponding to the $m^{th}$ frame of image is 3.

It should be noted that Table 1 to Table 4 are merely examples of the N encoding scales, and do not represent a value of the N encoding scales in an actual application process.

In a possible manner, for each N value, an encoding parameter of each of the N encoding scales may be preset, that is, N groups of encoding parameters corresponding to each N value are preset.

For example, for N=2 in Table 1, encoding parameters corresponding to two encoding scales may be preset, as shown in Table 5.

TABLE 5

| N = 2 | Encoding scale type | Encoding parameter Quantization parameter |
|---|---|---|
| | First encoding scale | QP = 35 |
| | Second encoding scale | QP = 25 |

When N=3 in Table 1, encoding parameters corresponding to three encoding scales may be preset, as shown in Table 6.

TABLE 6

| N = 3 | Encoding scale type | Encoding parameter Quantization parameter |
|---|---|---|
| | First encoding scale | QP (quantization parameter, quantization parameter) = 35 |
| | Second encoding scale | QP = 30 |
| | Third encoding scale | QP = 25 |

When N=4 in Table 1, encoding parameters corresponding to four encoding scales may be preset, as shown in Table 7.

TABLE 7

| N = 4 | Encoding scale type | Encoding parameter |
|---|---|---|
| | | Quantization parameter |
| | First encoding scale | QP = 35 |
| | Second encoding scale | QP = 30 |
| | Third encoding scale | QP = 25 |
| | Fourth encoding scale | QP = 20 |

For example, in Table 5 to Table 7, a larger QP indicates lower encoding quality, and a smaller QP indicates higher encoding quality.

It should be noted that although encoding parameters corresponding to the first encoding scale shown in Table 5, Table 6, and Table 7 are the same, it should be understood that the encoding parameters corresponding to the first encoding scale in Table 5, Table 6, and Table 7 may be different. Although encoding parameters corresponding to the second encoding scale shown in Table 6 and Table 7 are the same, it should be understood that the encoding parameters corresponding to the second encoding scale in Table 6 and Table 7 may be different, and so on. In other words, when values of the N encoding scales are different, corresponding encoding parameters of a same encoding scale may be the same or may be different. This is not limited in this embodiment.

For example, the pre-processing module may find, from the preset encoding parameter based on the N encoding scales corresponding to the $m^{th}$ frame of image, the encoding parameter corresponding to N.

For example, if the N encoding scales corresponding to the $m^{th}$ frame of image is 2, the corresponding encoding parameter may be shown in Table 5.

For example, if the N encoding scales corresponding to the $m^{th}$ frame of image is 3, the corresponding encoding parameter may be shown in Table 6.

In a possible manner, an encoding parameter corresponding to each encoding scale may be determined based on at least two of the N encoding scales, image complexity of the $m^{th}$ frame of image, a current network transmission capability, and a parameter value range of the encoder.

For example, the encoding parameter corresponding to each encoding scale may be determined based on the N encoding scales and the parameter value range of the encoder.

For example, if N=2, and the parameter value range of the encoder meets the first encoding condition, the encoding parameters are shown in Table 8.

TABLE 8

| N = 2 (the parameter value range of the encoder meets the first encoding condition) | Encoding scale type | Encoding parameter Quantization parameter |
|---|---|---|
| | First encoding scale | QP = 25 |
| | Second encoding scale | QP = 25 |

For example, if N=2, and the parameter value range of the encoder meets the second encoding condition, the encoding parameters are shown in Table 9.

TABLE 9

| N = 2 (the parameter value range of the encoder meets the second encoding condition) | Encoding scale type | Encoding parameter Quantization parameter |
|---|---|---|
| | First encoding scale | QP = 35 |
| | Second encoding scale | QP-30 |

Encoding quality of the encoder when the parameter value range of the encoder meets the second encoding condition is greater than encoding quality of the encoder when the parameter value range of the encoder meets the first encoding condition.

For example, the first encoding condition and the second encoding condition may be set based on the encoding quality of the encoder when the parameters of the encoder take different range values.

For example, if N=3, and the parameter value range of the encoder meets the first encoding condition, the encoding parameters are shown in Table 10.

TABLE 10

| N = 3 (the parameter value range of the encoder meets the first encoding condition) | Encoding scale type | Encoding parameter Quantization parameter |
|---|---|---|
| | First encoding scale | QP = 35 |
| | Second encoding scale | QP = 30 |
| | Third encoding scale | QP = 20 |

For example, the encoding parameter corresponding to each encoding scale may be determined based on the N encoding scales and the network transmission capability.

For example, if N=2, and the network data transmission amount is greater than a first data amount threshold, the encoding parameter is shown in Table 11.

TABLE 11

| N = 2 (the network data transmission amount is less than the first data amount threshold) | Encoding scale type | Encoding parameter Quantization parameter |
|---|---|---|
| | First encoding scale | QP = 35 |
| | Second encoding scale | QP = 25 |

For example, if N=2, and the network data transmission amount is greater than a second data amount threshold, the encoding parameter is shown in Table 12.

TABLE 12

| | | Encoding parameter Quantization parameter |
|---|---|---|
| | Encoding scale type | |
| N = 2 (the network data transmission amount is greater than the first data amount threshold) | First encoding scale | QP = 35 |
| | Second encoding scale | QP = 20 |

The first quantity threshold may be specifically set based on a requirement. This is not limited in this embodiment.

For example, if N=3, and the network data transmission amount is greater than the first data amount threshold, the encoding parameter is shown in Table 13.

TABLE 13

|  | Encoding scale type | Encoding parameter Quantization parameter |
|---|---|---|
| N = 3 (the network data transmission amount is greater than the first data amount threshold) | First encoding scale Second encoding scale Third encoding scale | QP = 35 QP = 30 QP = 20 |

It should be understood that the encoding parameter corresponding to each encoding scale may also be determined based on the N encoding scales and the image complexity. The encoding parameter corresponding to each encoding scale may be further determined based on the N encoding scales, the image complexity, and the parameter value range of the encoder. The encoding parameter corresponding to each encoding scale may be further determined based on the N encoding scales, the image complexity, and the network transmission capability. The encoding parameter corresponding to each encoding scale may be determined based on the N encoding scales, the image complexity, the parameter value range of the encoder, and the network transmission capability.

For example, the encoding parameter may further include reference frame information.

In a possible manner, the reference frame information may be preset. For example, a corresponding reference frame may be preset for each frame of image in the video data. For example, for each frame of image, a frame whose frame type before the frame of image is a preset frame type (for example, an I/IDR frame, a scene switching frame, a key frame, or a reference frame) may be determined as a reference frame of each frame of image at an encoding scale.

For example, after the reference frame of each frame of image is determined, the reference frame information of each frame of image at the encoding scale may be determined based on a sequence number (that is, a POC number) of the reference frame of each frame of image entering the encoder.

For example, the POC number of the reference frame of each frame of image entering the encoder may be used as the reference frame information of each frame of image at the encoding scale.

For example, for a frame of image, a distance between the reference frame of the frame of image and the frame of image may be determined based on the POC number of the reference frame of the frame of image entering the encoder and the POC number of the frame of image that is input to the encoder when the frame of image is encoded at the encoding scale. The distance between the reference frame of the frame of image and the frame of image is determined as the reference frame information of the frame of image at the encoding scale. For example, the distance between the reference frame of the frame image and the frame image may refer to a difference between the POC number of the frame image that is input to the encoder when the frame image is encoded at the encoding scale and the POC number of the reference frame of the frame image entering the encoder.

Further, the pre-processing module may search preset reference frame information for the reference frame information of the $m^{th}$ frame of image.

In a possible manner, when first feedback information is received, the reference frame information is determined based on the first feedback information. The first feedback information indicates that an encoded frame corresponding to sent bitstream data is successfully received. The encoded frame is acknowledged as the reference frame. The reference frame information indicates the reference frame. In this way, it can be ensured that when bitstream data of an encoded frame is lost, only decoding and display of the encoded frame are affected, and decoding and display of other encoded frames are not affected, thereby limiting impact of data loss on decoding and display.

For example, the first feedback information may include frame identification information and scale identification information. For example, it may be determined, based on the frame identification information and the scale identification information in the first feedback information, that the frame identification information and the scale identification information are the reference frame information of the $m^{th}$ frame of image at the encoding scale.

For example, the POC number of the reference frame of the $m^{th}$ frame of image entering the encoder may be used as the reference frame information of the $m^{th}$ frame of image at the encoding scale.

For example, the distance between the reference frame of the $m^{th}$ frame of image and the $m^{th}$ frame of image may be determined based on the POC number of the reference frame of the $m^{th}$ frame of image entering the encoder and the POC number of the $m^{th}$ frame of image input to the encoder when the $m^{th}$ frame of image is encoded at the encoding scale. The distance between the reference frame of the $m^{th}$ frame of image and the $m^{th}$ frame of image is determined as reference frame information of the $m^{th}$ frame of image at the encoding scale. For example, the distance between the reference frame of the $m^{th}$ frame of image and the $m^{th}$ frame of image may be a difference between the POC number of the $m^{th}$ frame of image that is input to the encoder when the $m^{th}$ frame of image is encoded at the encoding scale and the POC number of the reference frame of the $m^{th}$ frame of image entering the encoder.

For example, reference frame information of the $m^{th}$ frame of image at different encoding scales may be the same, or may be different. This may be specifically set based on a requirement. This is not limited in this embodiment.

Figure 3B:
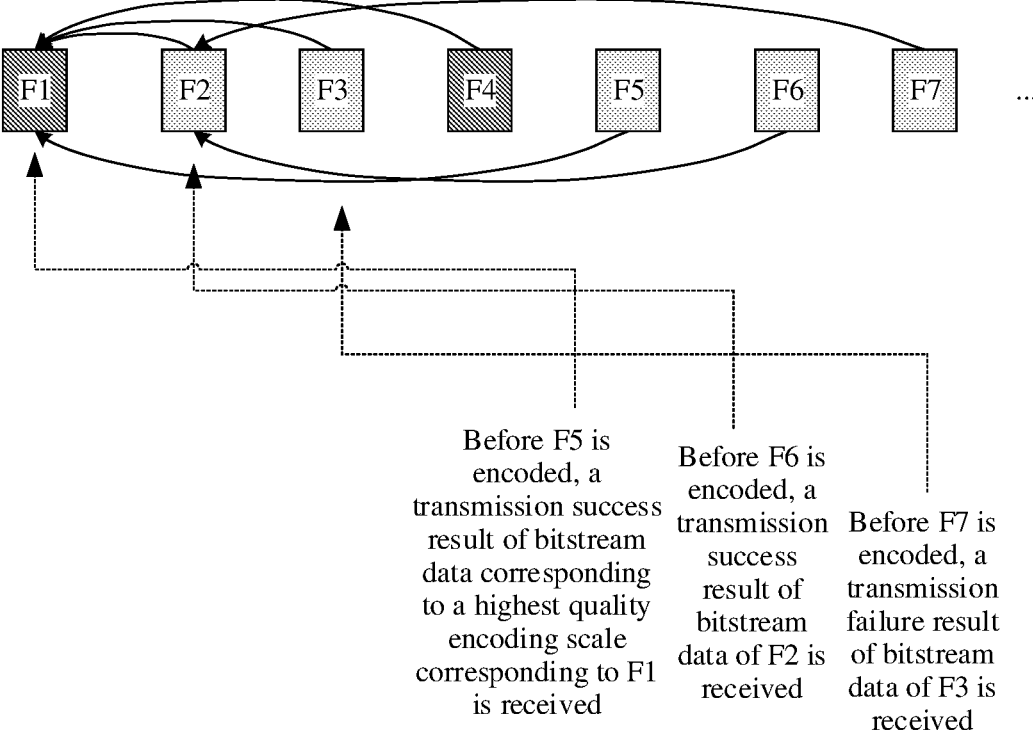
FIG. 3b is a schematic diagram of an example of reference frame selection.

FIG. 3b is a schematic diagram of an example of reference frame selection. Refer to FIG. 3. For example, F1 to F7 are seven frames of images. Multi-scale encoding needs to be performed on F1 and F4, and multi-scale encoding does not need to be performed on F2, F3, F5, F6, and F7.

Before F4 is encoded, a transmission result of bitstream data corresponding to any one of F1 to F3 is not received. Therefore, F2 to F4 may be encoded by using a reconstructed image of a lowest encoding scale of F1 as a reference. Before F5 is encoded, if a received transmission result of bitstream data corresponding to a highest encoding scale of F1 is that transmission is successful, a reconstructed image of the highest encoding scale of F1 is used as a reference to encode F5. Before F6 is encoded, if a received transmission result of bitstream data corresponding to F2 is that transmission is successful, a reconstructed image of F2 is used as a reference to encode F6. Before F7 is encoded, if a received transmission result of bitstream data of F3 is that transmission fails, a reconstructed image of F2 is used as a reference to encode F7.

For example, in this embodiment, the encoding parameter includes the quantization parameter and the reference frame information.

For example, after determining the N encoding scales and the N groups of encoding parameters, the pre-processing module may first send the group of encoding parameters and the $m^{th}$ frame of image to the encoder, and the encoder encodes the $m^{th}$ frame of image based on the group of encoding parameters. Then, a next group of encoding parameters and the $m^{th}$ frame image are sent to the encoder. The encoder encodes the $m^{th}$ frame image based on the next group of encoding parameters. This process repeats until a last group of encoding parameters and the $m^{th}$ frame image are sent to the encoder.

To describe the foregoing cyclic process description, a parameter i may be set, and i is set to 1. Then, i is increased by 1 each time an $i^{th}$ group of encoding parameters and the $m^{th}$ frame of image are sent to the encoder.

S303: Set i to 1.

S304: Input the $i^{th}$ group of encoding parameters and the $m^{th}$ frame of image to the encoder.

For example, after determining the $i^{th}$ group of encoding parameters, the pre-processing module may input the $i^{th}$ group of encoding parameters and the $m^{th}$ frame of image to the encoder, and the encoder encodes the $m^{th}$ frame of image based on the $i^{th}$ group of encoding parameters, to obtain an $i^{th}$ group of bitstream data.

For example, a sequence of inputting the $i^{th}$ group of encoding parameters and the $m^{th}$ frame of image into the encoder is not limited in this embodiment. For example, the $i^{th}$ group of encoding parameters and the $m^{th}$ frame of image may be input to the encoder at the same time. For another example, the $i^{th}$ group of encoding parameters may be first input to the encoder, and then the $m^{th}$ frame of image is input to the encoder. For another example, the $m^{th}$ frame of image is first input to the encoder, and then the $i^{th}$ group of encoding parameters is input to the encoder.

S305: Determine whether i is equal to N.

For example, each time after inputting the $i^{th}$ group of encoding parameters to the encoder, the pre-processing module may determine whether i is equal to N, that is, determine whether all the N groups of encoding parameters have been input to the encoder. If i is not equal to N, it indicates that some groups of encoding parameters are not input to the encoder. In this case, S306 may be performed. If i is equal to N, it indicates that the N groups of encoding parameters have been input to the encoder. In this case, S309 may be performed.

For example, the pre-processing module may alternatively determine, after receiving the encoding completion information fed back by the encoder, whether i is equal to N. This is not limited in this embodiment.

S306: Increase i by 1.

For example, after S306 is performed, S304 may be performed again, that is, the next group of encoding parameters and the $m^{th}$ frame of image are input to the encoder, and the encoder encodes the $m^{th}$ frame of image at a next encoding scale.

S307: Determine an encoding parameter corresponding to single-scale encoding.

For example, when determining not to perform multi-scale encoding on the $m^{th}$ frame of image, the pre-processing module may determine the encoding parameter corresponding to single-scale encoding.

For example, the encoding parameter corresponding to single-scale encoding may be preset, as shown in Table 14.

TABLE 14

| Encoding parameter | |
| --- | --- |
| Quantization parameter | QP = 25 |

Further, the preset encoding parameter of single-scale encoding may be used as the encoding parameter corresponding to single-scale encoding of the $m^{th}$ frame of image.

S308: Input the encoding parameter corresponding to single-scale encoding and the $m^{th}$ frame of image to the encoder.

For example, the pre-processing module may input the encoding parameter corresponding to single-scale encoding and the $m^{th}$ frame of image to the encoder, and the encoder encodes the $m^{th}$ frame of image based on the encoding parameter corresponding to single-scale encoding, to obtain the bitstream data of single-scale encoding.

S309: Increase m by 1.

For example, if i is equal to N or after S308 is performed, m may be increased by 1, so that a next frame of image may be input to the pre-processing module, and then the next frame of image is encoded according to S301 to S308.

It should be noted that N encoding scales of different images in a video stream of a same video service may be the same or may be different. Multi-scale encoding may be performed on some images in video data of a same video service, and single-scale encoding may be performed on the other images.

For example, when determining whether to perform multi-scale encoding on the $m^{th}$ frame of image, the pre-processing module may further determine the frame type of the $m^{th}$ frame of image according to the determining method described above. The scale identification information of the $i^{th}$ encoding scale is determined when the $i^{th}$ group of encoding parameters and the image are input to the encoder. Then, the pre-processing module may generate, by using the frame type of the $m^{th}$ frame of image, the scale identification information of the $i^{th}$ encoding scale, and a frame identifier, the $i^{th}$ group of description information corresponding to the $m^{th}$ frame of image, and then output the $i^{th}$ group of description information corresponding to the $m^{th}$ frame of image to the data encapsulation module.

In this way, an image that requires multi-scale encoding in a video stream is determined with reference to importance of bitstream data corresponding to each frame of image for encoding and decoding and an impact degree on a network. For an image that is important and/or prone to impact on the network, it may be determined that multi-scale encoding is required. When multi-scale encoding is performed on the image, the image may be encoded into a piece of bitstream data with a small data amount (that is, bitstream data with of low encoding scale), or encoded into one or more pieces of bitstream data with a high data amount (that is, one or more pieces of bitstream data of a high encoding scale). Further, the bitstream data of the low encoding scale can arrive at a decoder side with a higher probability, thereby ensuring smooth playing without artifacts. If the bitstream data with the high encoding scale is lost, decoding and playing at a playing end are not affected, and no artifact occurs. If the bitstream data can arrive at the decoder side, playing quality can be improved. For an image that is not important and/or has little impact on the network, multi-scale encoding is not performed. If the data is lost, impact on image reconstruction and impact on user viewing in a decoding process are small. In addition, because multi-scale encoding affects encoding compression efficiency and increases encoding calculation time, multi-scale encoding is not performed on some images, so that impact of multi-scale encoding on a compression rate and calculation can be reduced.

In a possible manner, encoding at a low encoding scale may be performed on an entire frame of image, and encoding at a high encoding scale may be performed on some areas in the image, so that a calculation amount of encoding at the high encoding scale performed by the encoder can be reduced, and encoding efficiency can be improved.

Figure 4A:
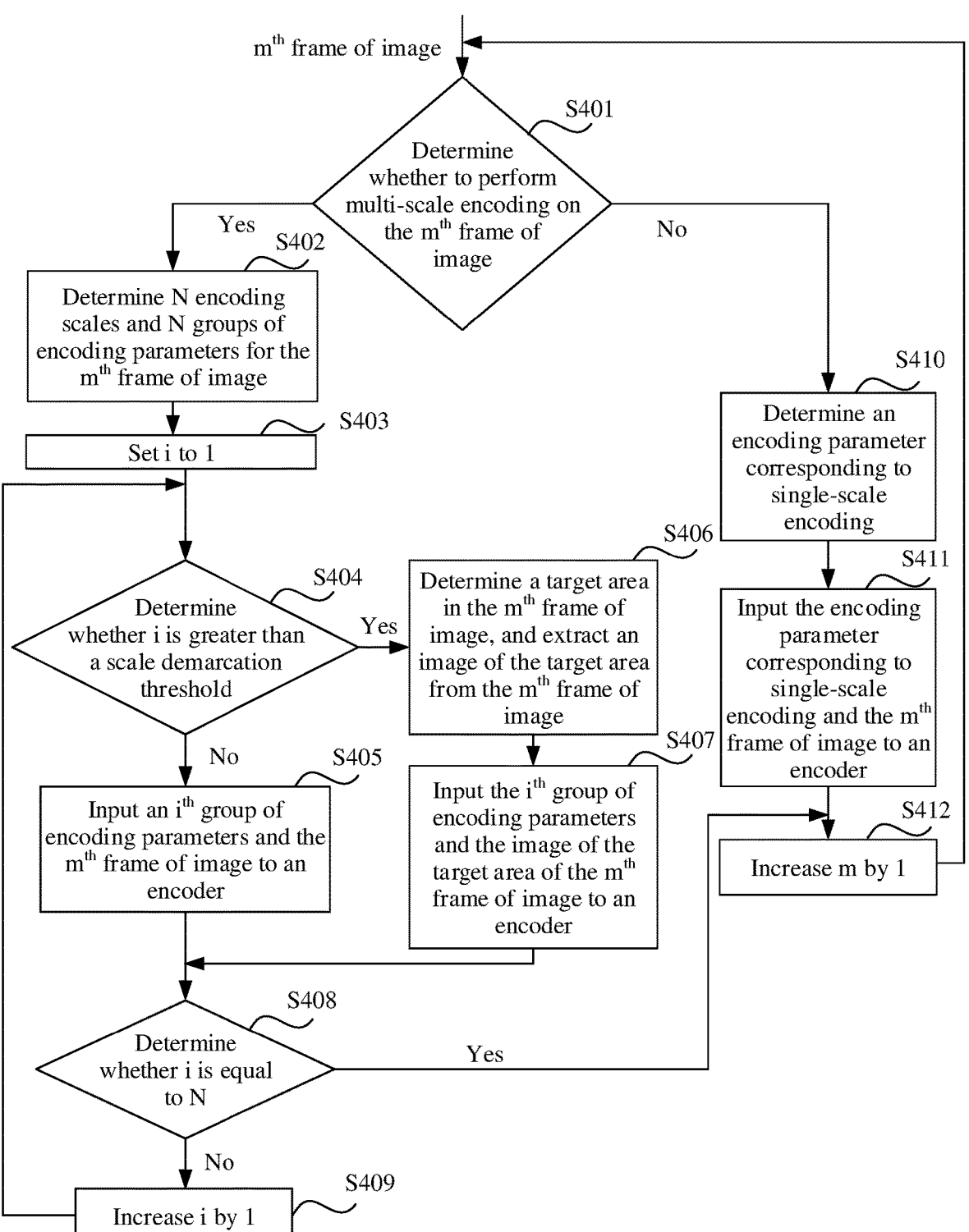
FIG. 4a is a schematic diagram of an example of data processing.

FIG. 4*a* is a schematic diagram of an example of data processing. Refer to FIG. 4*a*. For example, a data processing process of a pre-processing module is as follows.

S401: Determine whether to perform multi-scale encoding on an $m^{th}$ frame of image.

S402: Determine N encoding scales and N groups of encoding parameters for the $m^{th}$ frame of image.

S403: Set i to 1.

For example, for S401 to S403, refer to S301 to S303.

S404: Determine whether i is greater than a scale demarcation threshold.

For example, the scale demarcation threshold may be preset based on a requirement. This is not limited in this embodiment.

For example, different scale demarcation thresholds may be preset for different values of N. For example, if N=1, the scale demarcation threshold may be set to 1. For another example, if N=3, the scale demarcation threshold may be set to 2. For another example, if N=4, the scale demarcation threshold may be set to 2.

For example, the scale demarcation threshold may also be determined based on at least one of the N encoding scales, image complexity of the $m^{th}$ frame of image, a network transmission capability, and a parameter of the encoder. For example, it is assumed that N=4. If a network data transmission amount is less than a first data amount threshold, it may be determined that the scale demarcation threshold is 2. If the network data transmission amount is greater than the first data amount threshold, it may be determined that the scale demarcation threshold is 3. For another example, it is assumed that N=4. If the image complexity of the $m^{th}$ frame of image is less than the first complexity threshold, it may be determined that the scale demarcation threshold is 2. If the image complexity of the $m^{th}$ frame of image is greater than the first complexity threshold, it may be determined that the scale demarcation threshold is 3. The first complexity threshold may be set based on a requirement. This is not limited in this embodiment.

For example, when a current encoding scale is less than or equal to the scale demarcation threshold, the entire frame of image may be encoded. When the current encoding scale is greater than the scale demarcation threshold, some areas in the entire frame of image may be encoded.

For example, an $i^{th}$ group of encoding parameters corresponds to an $i^{th}$ encoding scale, and a larger i indicates a higher encoding scale.

For example, when i is less than or equal to the scale demarcation threshold, S405 may be performed. When i is greater than the scale demarcation threshold, S406 may be performed.

S405: Input the $i^{th}$ group of encoding parameters and the $m^{th}$ frame of image to an encoder.

For example, for S405, refer to S304 in the foregoing description.

S406: Determine a target area in the $m^{th}$ frame of image, and extract an image of the target area from the $m^{th}$ frame of image.

For example, when i is greater than the scale demarcation threshold, a to-be-encoded target area in the $m^{th}$ frame of image may be determined.

For example, the pre-processing module may analyze the $m^{th}$ frame of image, determine an area of interest to the user, and determine the area of interest to the user as the target area.

For example, the pre-processing module may perform subject detection on the $m^{th}$ frame of image, and determine an area in which a detected subject is located as the target area. For example, the target area is an area in which a face is located or an area in which an animal is located.

For example, after determining the target area, the pre-processing module may extract an image of the target area from the $m^{th}$ frame of image.

For example, after extracting the image of the target area from the $m^{th}$ frame of image, the pre-processing module may discard an image of another area of the $m^{th}$ frame of image.

S407: Input the $i^{th}$ group of encoding parameters and the image of the target area of the $m^{th}$ frame of image to the encoder.

For example, the pre-processing module may input the $i^{th}$ group of encoding parameters and the image of the target area in the $m^{th}$ frame of image to the encoder. The encoder encodes the image of the target area in the $m^{th}$ frame of image at an $i^{th}$ encoding scale, to obtain bitstream data corresponding to the image of the target area in the $m^{th}$ frame of image.

S408: Determine whether i is equal to N.

S409: Increase i by 1.

S410: Determine an encoding parameter corresponding to single-scale encoding.

S411: Input the encoding parameter corresponding to single-scale encoding and the $m^{th}$ frame of image to the encoder.

S412: Increase m by 1.

For example, for S408 to S412, refer to the foregoing S305 to S309.

For example, for a method for determining the description information by the pre-processing module, refer to the foregoing description.

Figures 1, 4B:
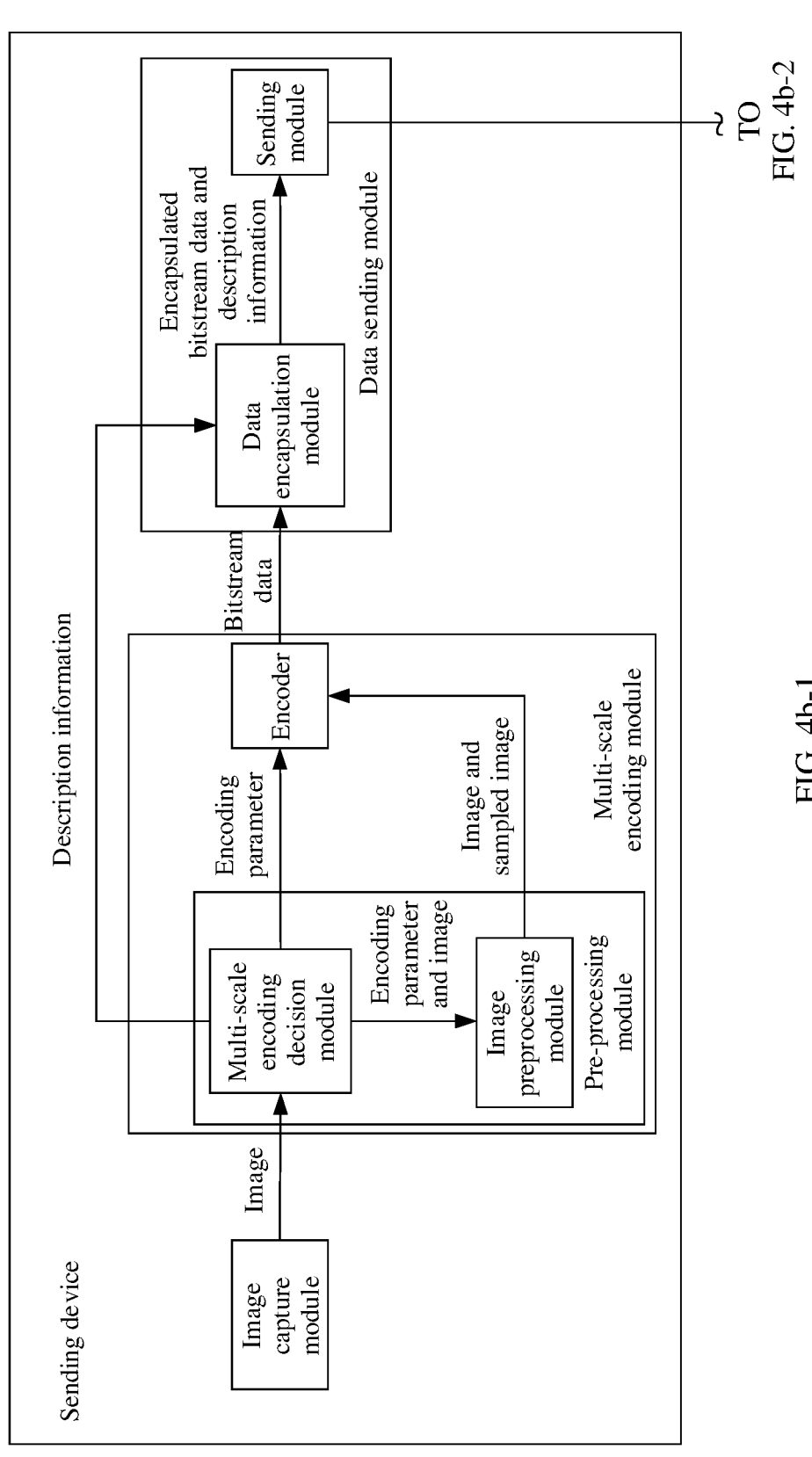
Figures 2, 4B:
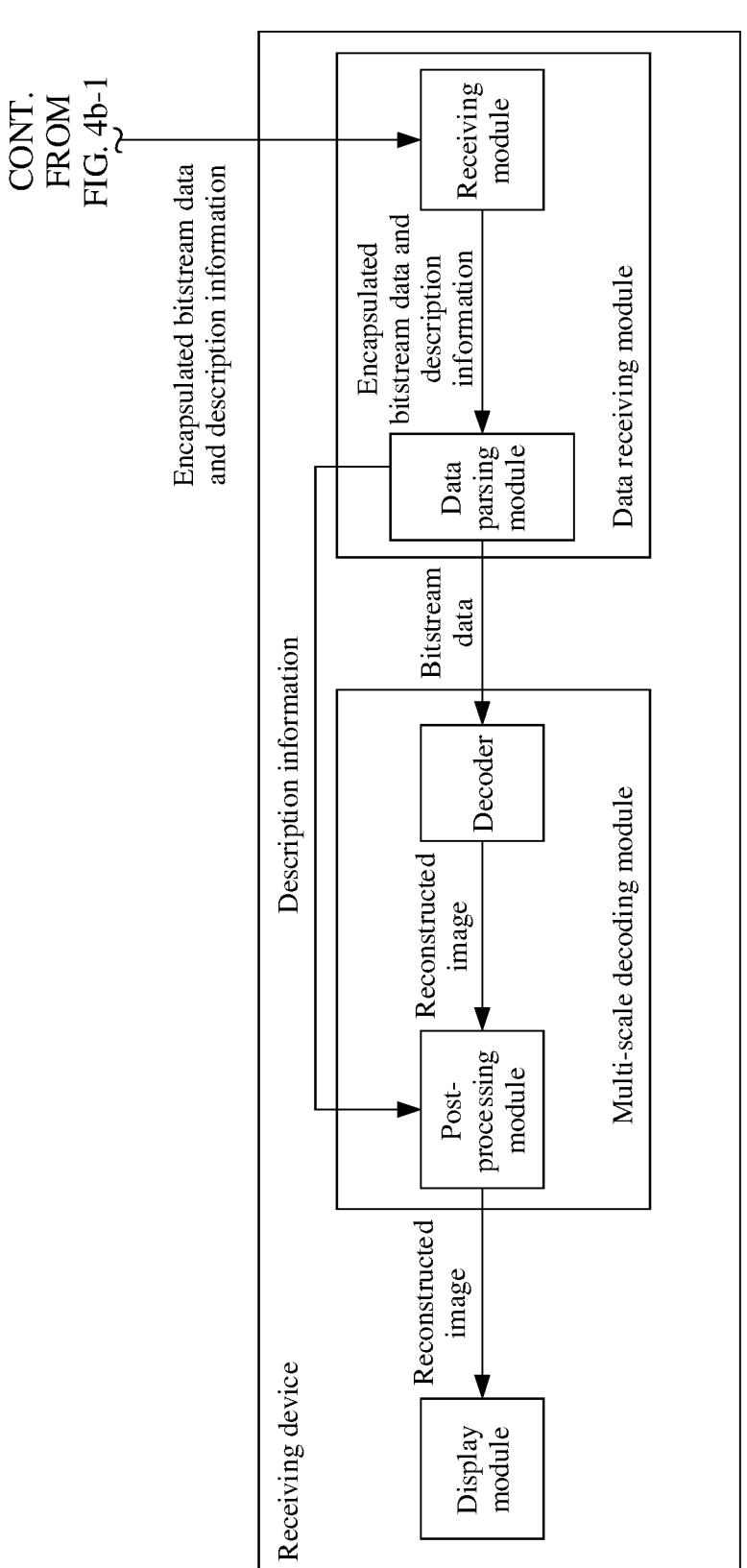

FIG. 4*b*-1 and FIG. 4*b*-2 are a schematic diagram of an example of data processing. Refer to FIG. 4*b*-1 and FIG. 4*b*-2. For example, the pre-processing module may include a multi-scale encoding decision module and an image pre-processing module. After the multi-scale encoding decision module performs S401, if it is determined to perform multi-scale encoding on the $m^{th}$ frame of image, S402 to S404 may be performed. If i is less than or equal to the scale boundary threshold, on one hand, S405 of inputting the i groups of encoding parameters to the encoder is performed. On the other hand, inputting the $m^{th}$ frame of image to the image preprocessing module is performed, and the image preprocessing module performs S405 of inputting the $m^{th}$ frame of image to the encoder. If i is greater than the scale boundary threshold, on one hand, the multi-scale encoding decision module may input the $i^{th}$ group of encoding parameters and the image to the image preprocessing module, and then the image preprocessing module may perform S406 and S407 to input the image of the target area in the $m^{th}$ frame of image to the encoder. On the other hand, the multi-scale encoding decision module may perform S407 to input the i groups of encoding parameters to the encoder. If the multi-scale encoding decision module determines not to perform multi-scale encoding on the $m^{th}$ frame of image, S410 may be performed. Then, on one hand, the encoding parameter corresponding to single-scale encoding may be input to the encoder in S411. On the other hand, the $m^{th}$ frame of image may be input to the image preprocessing module, and the image preprocessing module performs S411 to input the $m^{th}$ frame of image to the encoder. Then, the multi-scale encoding decision module performs S408, S409, and S412. To be specific, the image preprocessing module is configured to perform the steps of processing the $m^{th}$ frame of image and inputting a processed $m^{th}$ frame of image or the $m^{th}$ frame of image to the encoder in S401 to S412. The multi-scale decision module is configured to perform steps other than the steps performed by the image preprocessing module in S401 to S412, and perform the steps of inputting the $i^{th}$ group of encoding parameters and the $m^{th}$ frame of image to the image preprocessing module.

In addition, after determining the $i^{th}$ group of description information of the $m^{th}$ frame of image, the multi-scale encoding decision module may further input the $i^{th}$ group of description information of the $m^{th}$ frame of image to the data encapsulation module. This may refer to the foregoing description.

For example, S401 to S412 may also be performed by the pre-processing module, that is, the pre-processing module is not divided into a multi-scale encoding decision module and an image preprocessing module, as shown in FIG. 2.

Still refer to FIG. 4b-1 and FIG. 4b-2. For example, if multi-scale encoding is performed on the $m^{th}$ frame of image, a reconstructed image of the decoder received by a post-processing module includes: a reconstructed image of the $m^{th}$ frame of image at a lowest encoding scale and a reconstructed image of the target area in the $m^{th}$ frame of image at another encoding scale.

For example, when the post-processing module selects the reconstructed image corresponding to the another encoding scale and outputs the reconstructed image to the display module, the reconstructed image of the target area in the $m^{th}$ frame of image at the another encoding scale may be used to replace the image of the target area in the reconstructed image of the $m^{th}$ frame of image at a lowest encoding scale, to obtain the reconstructed image of the $m^{th}$ frame of image at the another encoding scale. Then, the reconstructed image of the $m^{th}$ frame of image at the another encoding scale is output to the display module. Then, the display module displays the reconstructed image of the $m^{th}$ frame of image at the another encoding scale.

Figure 4C:
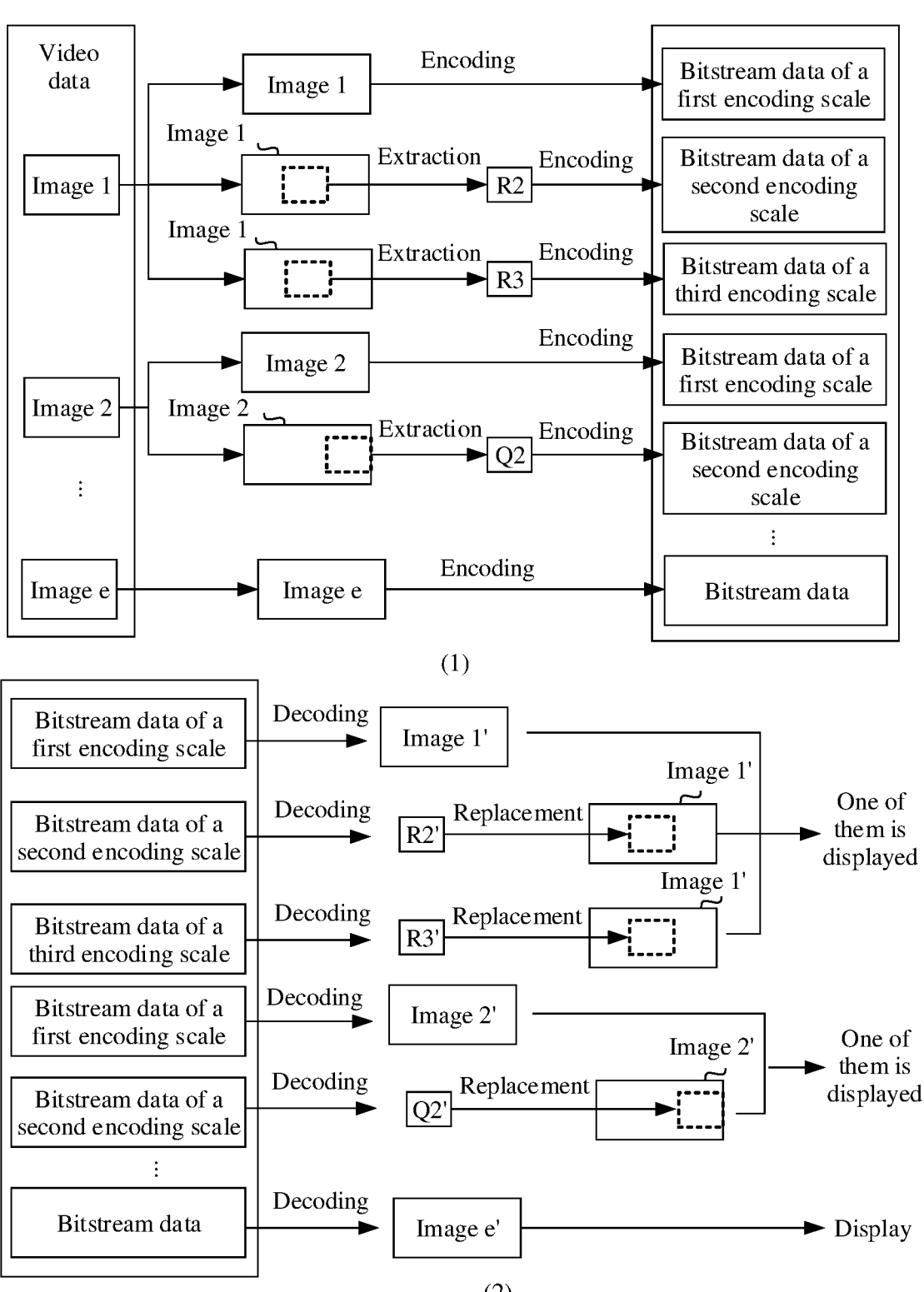
FIG. 4c is a schematic diagram of an example of data processing.

FIG. 4c is a schematic diagram of an example of data processing. Refer to FIG. 4c. The video data includes e (e is a positive integer) frames of images, for example, an image 1, an image 2, . . . , and an image e.

Refer to FIG. 4c(1). For example, for the image 1, the multi-scale encoding module encodes the image 1 at three encoding scales, to obtain bitstream data at the three encoding scales.

Refer to FIG. 4c(1). For example, the multi-scale encoding module encodes the image 1 based on an encoding parameter corresponding to a first encoding scale, to obtain bitstream data of the first encoding scale. Refer to FIG. 4c(2). For example, the bitstream data of the first encoding scale corresponding to the image 1 is decoded to obtain an image 1', where the image 1' is a reconstructed image corresponding to the image 1.

Refer to FIG. 4c(1). For example, the multi-scale encoding module first extracts R2 of a target area from the image 1, and then encodes R2 based on an encoding parameter corresponding to a second encoding scale, to obtain bitstream data of the second encoding scale. Refer to FIG. 4c(2). For example, the bitstream data of the second encoding scale corresponding to the image 1 is decoded to obtain R2', where R2' is a reconstructed image corresponding to R2.

Refer to FIG. 4c(1). For example, the multi-scale encoding module first extracts R3 of the target area from the image 1, and then encodes R3 based on an encoding parameter corresponding to a third encoding scale, to obtain bitstream data of the third encoding scale. Refer to FIG. 4c(2). For example, the bitstream data of the third encoding scale corresponding to the image 1 is decoded to obtain R3', where R3' is a reconstructed image corresponding to R3.

Refer to FIG. 4c(2). For example, for the image 1, when the reconstructed image of the first encoding scale is selected for output, the image 1' may be directly output to the display module for display. When the reconstructed image of the second encoding scale is selected for output, R2' may be used to replace the image of the target area in the image 1', and then the replaced image 1' is output. When the reconstructed image of the third encoding scale is selected for output, R3' may be used to replace the image of the target area in the image 1', and then the replaced image 1' is output.

Refer to FIG. 4c(1). For example, for the image 2, the multi-scale encoding module encodes the image 2 at two encoding scales, to obtain bitstream data at the two encoding scales.

Refer to FIG. 4c(1). For example, the multi-scale encoding module encodes the image 2 based on the encoding parameter corresponding to the first encoding scale, to obtain bitstream data of the first encoding scale. Refer to FIG. 4c(2). For example, the bitstream data of the first encoding scale corresponding to the image 2 is decoded to obtain an image 2', where the image 2' is a reconstructed image corresponding to the image 2.

Refer to FIG. 4c(1). For example, the multi-scale encoding module first extracts Q2 of the target area from the image 2, and then encodes Q2 based on an encoding parameter corresponding to the second encoding scale, to obtain bitstream data of the second encoding scale. Refer to FIG. 4c(2). For example, the bitstream data of the second encoding scale corresponding to the image 2 is decoded to obtain Q2', where Q2' is a reconstructed image corresponding to Q2.

Refer to FIG. 4c(2). For example, for the image 2, when the reconstructed image of the first encoding scale is selected for output, the image 2' may be directly output to the display module for display. When the reconstructed image of the second encoding scale is selected for output, Q2' may be used to replace the image of the target area in the image 2', and then the replaced image 2' is output.

For example, the multi-scale encoding module performs single-scale encoding on the image e to obtain corresponding bitstream data. Then, the bitstream data corresponding to the image e may be decoded to obtain an image e', where the image e' is a reconstructed image corresponding to the image e, and then the image e' may be directly output and displayed.

In a possible manner, the encoding parameter may include resolution, a quantization parameter, and reference frame information.

Figure 5A:
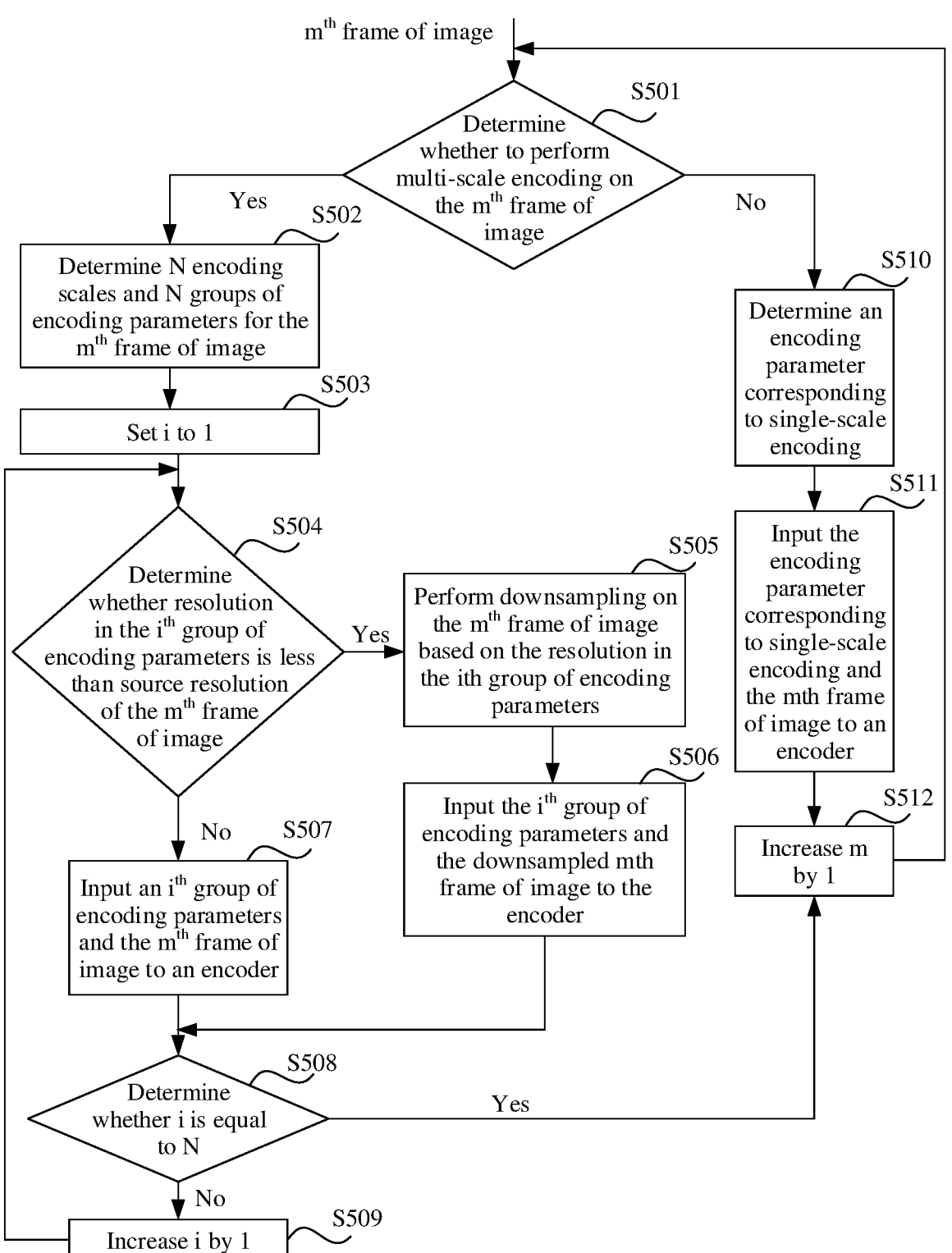
FIG. 5a is a schematic diagram of an example of a processing process.

FIG. 5a is a schematic diagram of an example of a processing process. Refer to FIG. 5a. For example, when an existing encoder in a sending device supports encoding of images with different types of resolution, and an existing decoder in a receiving device supports decoding of images with different types of resolution, a data processing process of a pre-processing module is as follows.

S501: Determine whether to perform multi-scale encoding on an $m^{th}$ frame of image.

For example, after receiving the $m^{th}$ frame of image input by an image capture module, the pre-processing module may determine, based on importance of the $m^{th}$ frame of image to encoding and decoding of another frame in video data to which the $m^{th}$ frame of image belongs, and/or an impact degree of bitstream data corresponding to the $m^{th}$ frame of image on a network, and/or predicted image quality of the $m^{th}$ frame of image, whether to perform multi-scale encoding on the image. When the importance of the image to encoding and decoding of another frame in the video data to which the image belongs meets the first preset condition, and/or the impact degree of the bitstream data corresponding to the $m^{th}$ frame of image on the network meets the second preset condition, and the predicted image quality of the $m^{th}$ frame of image meets the third preset condition, it is determined to perform multi-scale encoding on the image.

For example, the first preset condition includes at least one of the following:

the $m^{th}$ frame of image is an I frame or an IDR frame;
the $m^{th}$ frame of image is a scene switching frame;
the $m^{th}$ frame of image is a reference frame; and
the $m^{th}$ frame of image is a key frame.

For example, for a manner of determining, based on importance of the $m^{th}$ frame of image to encoding and decoding of the another frame in the video data to which the $m^{th}$ frame of image belongs, whether to perform multi-scale encoding on the $m^{th}$ frame of image, refer to the foregoing example.

For example, the second preset condition includes at least one of the following:

a data amount of bitstream data of the $m^{th}$ frame of image is greater than a preset data amount threshold; and
the data amount of the bitstream data of the $m^{th}$ frame of image is greater than a network transmission capability.

For example, for a manner of determining, based on the impact degree of the bitstream data corresponding to the $m^{th}$ frame of image on the network, whether to perform multi-scale encoding on the $m^{th}$ frame of image, refer to the foregoing example.

For example, the predicted image quality of the $m^{th}$ frame of image includes first predicted image quality and second predicted image quality. The first predicted image quality is predicted image quality of the $m^{th}$ frame of image that is encoded based on source resolution of the image. The second predicted image quality is predicted image quality of the $m^{th}$ frame of image that is encoded based on resolution lower than the source resolution. The third preset condition includes: The first predicted image quality is lower than or equal to the second predicted image quality.

For example, the first predicted image quality obtained by encoding the $m^{th}$ frame of image by using the source resolution may be predicted based on image complexity of the $m^{th}$ frame of image and a first target data amount. The second predicted image quality obtained by encoding the $m^{th}$ frame of image by using the resolution lower than the source resolution may be predicted based on the image complexity of the $m^{th}$ frame of image and a second target data amount. For example, the first target data amount and the second target data amount may be two close values. Optionally, a difference between the first target data amount and the second target data amount is less than a preset data amount value, and the preset data amount value may be set according to a requirement.

For example, based on the image complexity of the $m^{th}$ frame of image, it is predicted that the $m^{th}$ frame of image is encoded into the first predicted image quality of 500 K by using source resolution of 1920*1080. Based on the image complexity of the $m^{th}$ frame of image, it is predicted that the $m^{th}$ frame of image is encoded into the second predicted image quality of 500 K by using resolution of 1280*720. If the first predicted image quality of 500 K obtained by encoding the $m^{th}$ frame of image at the resolution of 1920*1080 is higher than the second predicted image quality of 500 K obtained by encoding the $m^{th}$ frame of image at the resolution of 1280*720, it may be determined not to perform multi-scale encoding on the $m^{th}$ frame of image. If the first predicted image quality of 500 K obtained by encoding the $m^{th}$ frame of image at the resolution of 1920*1080 is lower than or equal to the second predicted image quality of 500 K obtained by encoding the $m^{th}$ frame of image at the resolution of 1280*720, it may be determined to perform multi-scale encoding on the $m^{th}$ frame of image.

For example, when it is determined to perform multi-scale encoding on the $m^{th}$ frame of image, S502 may be performed. When it is determined not to perform multi-scale encoding on the $m^{th}$ frame of image, S510 may be performed.

S502: Determine N encoding scales and N groups of encoding parameters for the $m^{th}$ frame of image.

For example, for a manner of determining the N encoding scales for the $m^{th}$ frame of image, refer to the foregoing description of S302.

In a possible manner, for each N value, an encoding parameter of each of the N encoding scales may be preset. For example, for N=2 in Table 1, encoding parameters corresponding to two encoding scales may be preset, as shown in Table 15.

TABLE 15

| | | Encoding parameter | |
| --- | --- | --- | --- |
| N = 2 | Encoding scale type | Resolution | Quantization parameter |
| | First encoding scale | Source resolution/4 | QP = 35 |
| | Second encoding scale | Source resolution | QP = 25 |

For example, for N=3 in Table 1, encoding parameters corresponding to three encoding scales may be preset, as shown in Table 16.

TABLE 16

| | | Encoding parameter | |
| --- | --- | --- | --- |
| N = 3 | Encoding scale type | Resolution | Quantization parameter |
| | First encoding scale | Source resolution/8 | QP = 35 |
| | Second encoding scale | Source resolution/4 | QP = 30 |
| | Third encoding scale | Source resolution | QP = 25 |

For example, for N=4 in Table 1, encoding parameters corresponding to four encoding scales may be preset, as shown in Table 17.

TABLE 17

| | | Encoding parameter | |
| --- | --- | --- | --- |
| | | | Quantization parameter |
| N = 4 | Encoding scale type | Resolution | eter |
| | First encoding scale | Source resolution/16 | QP = 35 |
| | Second encoding scale | Source resolution/8 | QP = 30 |
| | Third encoding scale | Source resolution/4 | QP = 25 |
| | Fourth encoding scale | Source resolution | QP = 20 |

For example, the "source resolution" in the resolution column in Table 15 to Table 17 refers to the resolution of the $m^{th}$ frame of image. "Source resolution/4" indicates that the resolution is a quarter of the source resolution. That is, a horizontal pixel is half of a horizontal pixel of the source resolution, and a vertical pixel is half of a vertical pixel of the source resolution. "Source resolution/8" indicates that the resolution is one eighth of the source resolution. That is, the horizontal pixel is one quarter of the horizontal pixel of the source resolution, and the vertical pixel is half of the vertical pixel of the source resolution. "Source resolution/16" indicates that the resolution is one sixteenth of the source resolution. That is, the horizontal pixel is one quarter of the horizontal pixel of the source resolution, and the vertical pixel is one quarter of the vertical pixel of the source resolution.

It should be noted that although encoding parameters corresponding to the first encoding scale shown in Table 15, Table 16, and Table 17 are the same, it should be understood that the encoding parameters corresponding to the first encoding scale in Table 15, Table 16, and Table 17 may be different. Although encoding parameters corresponding to the second encoding scale shown in Table 16 and Table 17 are the same, it should be understood that the encoding parameters corresponding to the second encoding scale in Table 16 and Table 17 may be different, and so on. In other words, when values of the N encoding scales are different, corresponding encoding parameters of a same encoding scale may be the same or may be different. This is not limited in this embodiment.

For example, the pre-processing module may find, from the preset encoding parameter based on the N encoding scales corresponding to the m$^{th}$ frame of image, the encoding parameter corresponding to N.

For example, if the N encoding scales corresponding to the m$^{th}$ frame of image is 2, the corresponding encoding parameter may be shown in Table 15.

For example, if the N encoding scales corresponding to the m$^{th}$ frame of image is 3, the corresponding encoding parameter may be shown in Table 16.

In a possible manner, an encoding parameter corresponding to each encoding scale may be determined based on at least two of the N encoding scales, image complexity of the m$^{th}$ frame of image, a current network transmission capability, and a parameter value range of the encoder.

For example, the encoding parameter corresponding to each encoding scale may be determined based on the N encoding scales and the parameter value range of the encoder.

For example, if N=2, and the parameter value range of the encoder meets the first encoding condition, the encoding parameters are shown in Table 18.

TABLE 18

| | Encoding scale type | Encoding parameter | |
|---|---|---|---|
| | | Resolution | Quantization parameter |
| N = 2 (the parameter value range of the encoder meets the first encoding condition) | First encoding scale | Source resolution/8 | QP = 35 |
| | Second encoding scale | Source resolution/4 | QP = 25 |

For example, if N=2, and the parameter value range of the encoder meets the second encoding condition, the encoding parameters are shown in Table 19.

TABLE 19

| | Encoding scale type | Encoding parameter | |
|---|---|---|---|
| | | Resolution | Quantization parameter |
| N = 2 (the parameter value range of the encoder meets the second encoding condition) | First encoding scale | Source resolution/4 | QP = 35 |
| | Second encoding scale | Source resolution | QP = 30 |

Encoding quality of the encoder when the parameter value range of the encoder meets the second encoding condition is greater than encoding quality of the encoder when the parameter value range of the encoder meets the first encoding condition.

For example, the first encoding condition and the second encoding condition may be set based on the encoding quality of the encoder when the parameters of the encoder take different range values.

For example, if N=3, and the parameter value range of the encoder meets the first encoding condition, the encoding parameters are shown in Table 20.

TABLE 20

| | Encoding scale type | Encoding parameter | |
|---|---|---|---|
| | | Resolution | Quantization parameter |
| N = 3 (the parameter value range of the encoder meets the first encoding condition) | First encoding scale | Source resolution/8 | QP = 35 |
| | Second encoding scale | Source resolution/4 | QP = 30 |
| | Third encoding scale | Source resolution | QP = 20 |

For example, the encoding parameter corresponding to each encoding scale may be determined based on the N encoding scales and the network transmission capability.

For example, if N=2, and the network data transmission amount is greater than the first data amount threshold, the encoding parameter is shown in Table 21.

TABLE 21

| | | Encoding parameter | |
|---|---|---|---|
| | Encoding scale type | Resolution | Quantization parameter |
| N = 2 (the network data transmission amount is greater than the first data amount threshold) | First encoding scale | Source resolution/8 | QP = 35 |
| | Second encoding scale | Source resolution/4 | QP = 25 |

For example, if N=2, and the network data transmission amount is greater than a second data amount threshold, the encoding parameter is shown in Table 22.

TABLE 22

| | Encoding parameter | | |
| | Encoding scale type | Resolution | Quantization parameter |
|---|---|---|---|
| N = 2 (the network data transmission amount is greater than the second data amount threshold) | First encoding scale | Source resolution/4 | QP = 35 |
| | Second encoding scale | Source resolution | QP = 20 |

The second data amount threshold is greater than the first data amount threshold. The first quantity threshold and the second data amount threshold may be specifically set based on a requirement. This is not limited in this embodiment.

For example, if N=3, and the network data transmission amount is greater than the first data amount threshold, the encoding parameter is shown in Table 23.

TABLE 23

| | Encoding parameter | | |
| | Encoding scale type | Resolution | Quantization parameter |
|---|---|---|---|
| N = 3 (the network data transmission amount is greater than the first data amount threshold) | First encoding scale | Source resolution/8 | QP = 35 |
| | Second encoding scale | Source resolution/4 | QP = 30 |
| | Third encoding scale | Source resolution | QP = 20 |

It should be understood that the encoding parameter corresponding to each encoding scale may also be determined based on the N encoding scales and the image complexity. The encoding parameter corresponding to each encoding scale may be further determined based on the N encoding scales, the image complexity, and the parameter value range of the encoder. The encoding parameter corresponding to each encoding scale may be further determined based on the N encoding scales, the image complexity, and the network transmission capability. The encoding parameter corresponding to each encoding scale may be determined based on the N encoding scales, the image complexity, the parameter value range of the encoder, and the network transmission capability.

For example, for a manner in which the pre-processing module determines the reference frame information of the $m^{th}$ frame of image, refer to the foregoing description.

S503: Set i to 1.

S504: Determine whether resolution in the $i^{th}$ group of encoding parameters is less than source resolution of the $m^{th}$ frame of image.

For example, when the resolution in the $i^{th}$ group of encoding parameters is less than the source resolution of the $m^{th}$ frame of image, downsampling may be first performed on the $m^{th}$ frame of image, and then the $m^{th}$ frame of image is input to the encoder. In other words, S505 is first performed, and S506 is performed.

For example, when the resolution in the $i^{th}$ group of encoding parameters is equal to the source resolution of the $m^{th}$ frame of image, downsampling does not need to be performed on the $m^{th}$ frame of image, and the image is directly input to the encoder. In other words, S507 is performed.

S505: Perform downsampling on the $m^{th}$ frame of image based on the resolution in the $i^{th}$ group of encoding parameters.

For example, if the resolution in the $i^{th}$ group of encoding parameters is less than the source resolution of the $m^{th}$ frame of image, the pre-processing module may perform downsampling on the $m^{th}$ frame of image based on the resolution in the $i^{th}$ group of encoding parameters.

For example, if the source resolution of the $m^{th}$ frame of image is 1920*1080, and the resolution of the $i^{th}$ group of encoding parameters is 1280*720, the pre-processing module may perform downsampling on the $m^{th}$ frame of image to obtain an image with resolution of 1280*720.

S506: Input the $i^{th}$ group of encoding parameters and the downsampled $m^{th}$ frame of image to the encoder.

S507: Input the $i^{th}$ group of encoding parameters and the $m^{th}$ frame of image to the encoder.

For example, if the resolution in the $i^{th}$ group of encoding parameters is equal to the source resolution of the $m^{th}$ frame of image, the $i^{th}$ group of encoding parameters and the $m^{th}$ frame of image may be directly input to the encoder. Refer to the description in S304.

S508: Determine whether i is equal to N.

For example, for S508, refer to the description of S305.

S509: Increase i by 1.

For example, after S509 is performed, S504 to S507 may be performed again. That is, an encoding parameter of a next encoding scale and a downsampled $m^{th}$ frame of image or the $m^{th}$ frame of image are input to the encoder, and the encoder encodes the $m^{th}$ frame of image at the next encoding scale.

S510: Determine an encoding parameter corresponding to single-scale encoding.

S511: Input the encoding parameter corresponding to single-scale encoding and the $m^{th}$ frame of image to the encoder.

S512: Increase m by 1.

For example, for S510 to S512, refer to S307 to S309.

It should be noted that N encoding scales of different images in a video stream of a same video service may be the same or may be different. Multi-scale encoding may be performed on some images in video stream of a same video service, and single-scale encoding may be performed on the other images. This is not limited in this embodiment.

For example, for a manner in which the pre-processing module determines the $i^{th}$ group of description information, refer to the foregoing descriptions.

Refer to FIG. 4b-1 and FIG. 4b-2. For example, the image preprocessing module is configured to perform the steps of processing the $m^{th}$ frame of image and inputting a processed $m^{th}$ frame of image or the $m^{th}$ frame of image to the encoder in S501 to S512. The multi-scale decision module is configured to perform steps other than the steps performed by the image preprocessing module in S501 to S512, and perform the steps of inputting the $i^{th}$ group of encoding parameters and the $m^{th}$ frame of image to the image preprocessing module. This may refer to the foregoing descriptions.

In addition, after determining the $i^{th}$ group of description information of the $m^{th}$ frame of image, the multi-scale encoding decision module may further input the $i^{th}$ group of description information of the $m^{th}$ frame of image to the data encapsulation module. This may refer to the foregoing description.

For example, S501 to S512 may also be performed by the pre-processing module, that is, the pre-processing module is not divided into a multi-scale encoding decision module and an image preprocessing module, as shown in FIG. 2.

Figure 5B:
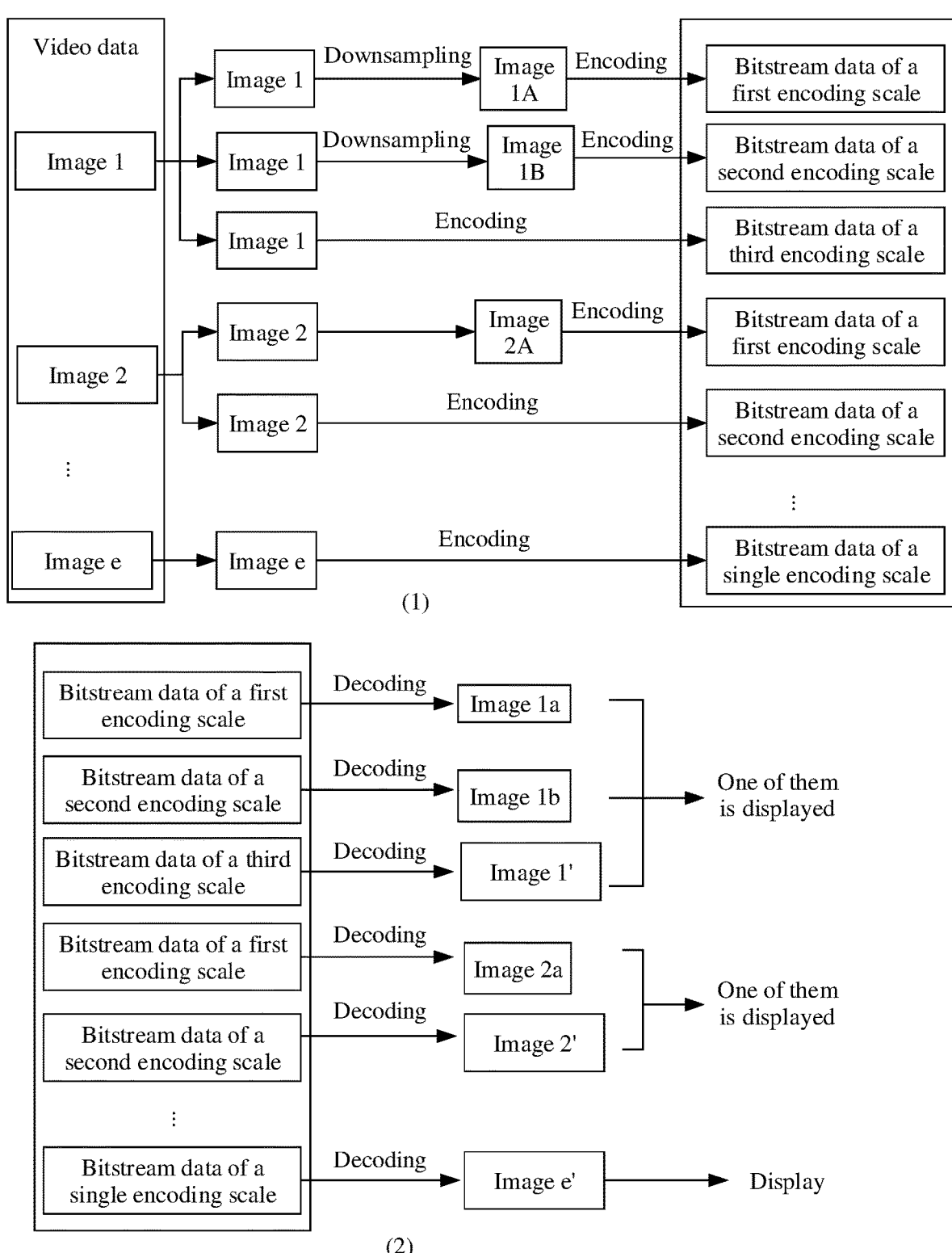
FIG. 5b is a schematic diagram of an example of encoding.

FIG. 5*b* is a schematic diagram of an example of encoding. Refer to FIG. 5*b*. The video stream includes e (e is a positive integer) frames of images, for example, an image 1, an image 2, . . . , and an image e.

Refer to FIG. 5*b* (1). For example, for the image 1, the multi-scale encoding module encodes the image 1 at three encoding scales, to obtain bitstream data at the three encoding scales.

Refer to FIG. 5*b* (1). For example, the multi-scale encoding module may first perform sampling on the image 1 based on resolution in an encoding parameter corresponding to a first encoding scale, to obtain an image 1A. Then, the image 1A is encoded based on the encoding parameter corresponding to the first encoding scale to obtain bitstream data of the first encoding scale. Refer to FIG. 5*b* (2). For example, the bitstream data of the first encoding scale corresponding to the image 1 is decoded to obtain an image 1*a*, where the image 1*a* is a reconstructed image corresponding to the image 1A.

Refer to FIG. 5*b* (1). For example, the multi-scale encoding module may first perform sampling on the image 1 based on resolution in an encoding parameter corresponding to a second encoding scale, to obtain an image 1B. Then, the image 1B is encoded based on the encoding parameter corresponding to the second encoding scale to obtain bitstream data of the first encoding scale. Refer to FIG. 5*b* (2). For example, the bitstream data of the second encoding scale corresponding to the image 1 is decoded to obtain an image 1*b*, where the image 1*b* is a reconstructed image corresponding to the image 1B.

Refer to FIG. 5*b* (1). For example, the multi-scale encoding module encodes the image 1 based on an encoding parameter corresponding to a third encoding scale, to obtain bitstream data of the third encoding scale. Refer to FIG. 5*b* (2). For example, the bitstream data of the third encoding scale corresponding to the image 1 is decoded to obtain an image 1', where the image 1' is a reconstructed image corresponding to the image 1.

For example, one frame of image may be selected from the image 1*a*, the image 1*b*, and the image 1' for display.

For example, the multi-scale encoding module encodes the image 2 at two encoding scales, to obtain bitstream data at the two encoding scales.

Refer to FIG. 5*b* (1). For example, the multi-scale encoding module may first perform sampling on the image 2 based on resolution in an encoding parameter corresponding to a first encoding scale, to obtain an image 2A. Then, the image 2A is encoded based on the encoding parameter corresponding to the first encoding scale to obtain the bitstream data of the first encoding scale. Refer to FIG. 5*b* (2). For example, the bitstream data of the first encoding scale corresponding to the image 2 is decoded to obtain an image 2*a*, where the image 2*a* is a reconstructed image corresponding to the image 2A.

Refer to FIG. 5*b* (1). For example, the multi-scale encoding module encodes the image 2 based on the encoding parameter corresponding to the second encoding scale, to obtain the bitstream data of the second encoding scale. Refer to FIG. 5*b* (2). For example, the bitstream data of the second encoding scale corresponding to the image 2 is decoded to obtain an image 2', where the image 2' is a reconstructed image corresponding to the image 2.

For example, one frame of image may be selected from the image 2*a* and the image 2' for display.

For example, the multi-scale encoding module performs single-scale encoding on the image e to obtain corresponding bitstream data. Then, the bitstream data corresponding to the image e may be decoded to obtain an image e', where the image e' is a reconstructed image corresponding to the image e, and then the image e' may be directly output and displayed.

In this way, an image that requires multi-scale encoding in a video stream is determined with reference to importance of bitstream data corresponding to each frame of image for encoding and decoding and an impact degree on a network. For an image that is important and/or prone to impact on the network, it may be determined that multi-scale encoding is required. This type of image may be encoded into bitstream data with a small data amount, and this type of image may be encoded into one or more images with a large data amount. Further, the bitstream data of the low encoding scale can arrive at a decoder side with a higher probability, thereby ensuring smooth playing without artifacts. If the bitstream data with the high encoding scale is lost, decoding and playing at a playing end are not affected, and no artifact occurs. If the bitstream data can arrive at the decoder side, playing quality can be improved. For an image that is not important and/or has little impact on the network, multi-scale encoding is not performed. If the data is lost, impact on decoding and reconstruction and subjective impact on a user are small.

In addition, because multi-scale encoding affects encoding compression efficiency and increases encoding calculation time, multi-scale encoding is not performed on some images, so that impact of multi-scale encoding on a compression rate and calculation can be reduced.

In addition, when image quality of the image encoded by using the source resolution is lower than or equal to image quality of the image encoded by using the source resolution, resolution of image encoding may be reduced, to reduce a bit rate of corresponding bitstream data. This reduces blocking effects at a low bit rate, improves image quality, and further reduces a calculation amount of the encoder.

It should be noted that, when the encoder has a downsampling function, the pre-processing module may not need to perform downsampling on the image, but input the source resolution, the target encoding resolution, the quantization parameter, and the reference frame information to the encoder. The encoder determines, based on the source resolution and the target encoding resolution, whether downsampling needs to be performed on the image. When determining, based on the source resolution and the target encoding resolution, that downsampling needs to be performed on the image, the encoder may perform downsampling on the image based on the target encoding resolution, and then the encoder encodes the downsampled image based on another parameter in the encoding parameter. When determining, based on the source resolution and the target encoding resolution, that downsampling does not need to be performed on the image, the encoder may encode the image based on the another parameter in the encoding parameter.

In a possible manner, encoding at a low encoding scale may be performed on an entire frame of image, and encoding at a high encoding scale may be performed on some areas in the image, so that a calculation amount of encoding at the high encoding scale performed by the encoder can be reduced, and encoding efficiency can be improved.

Figures 1, 6A:
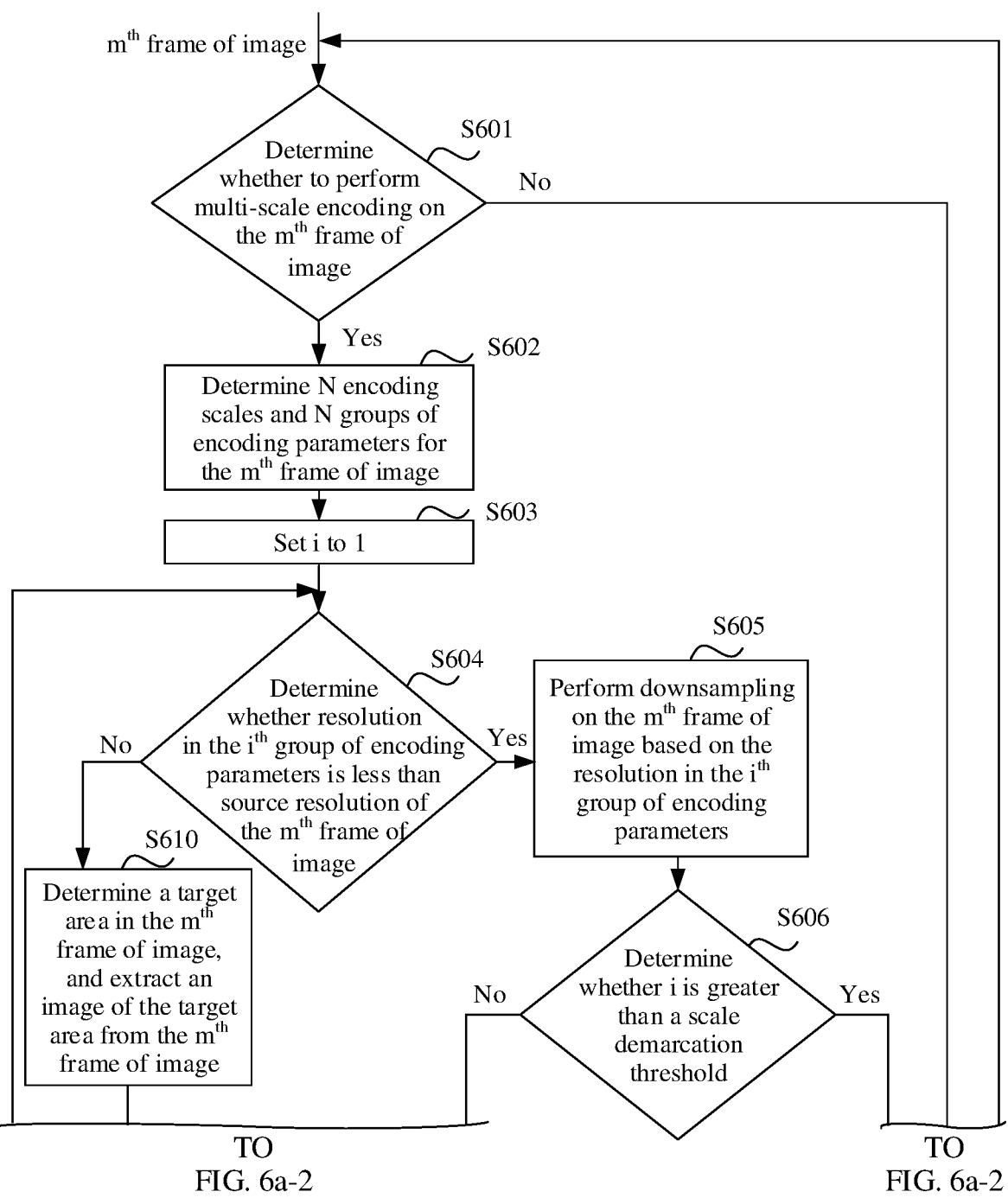
Figures 2, 6A:
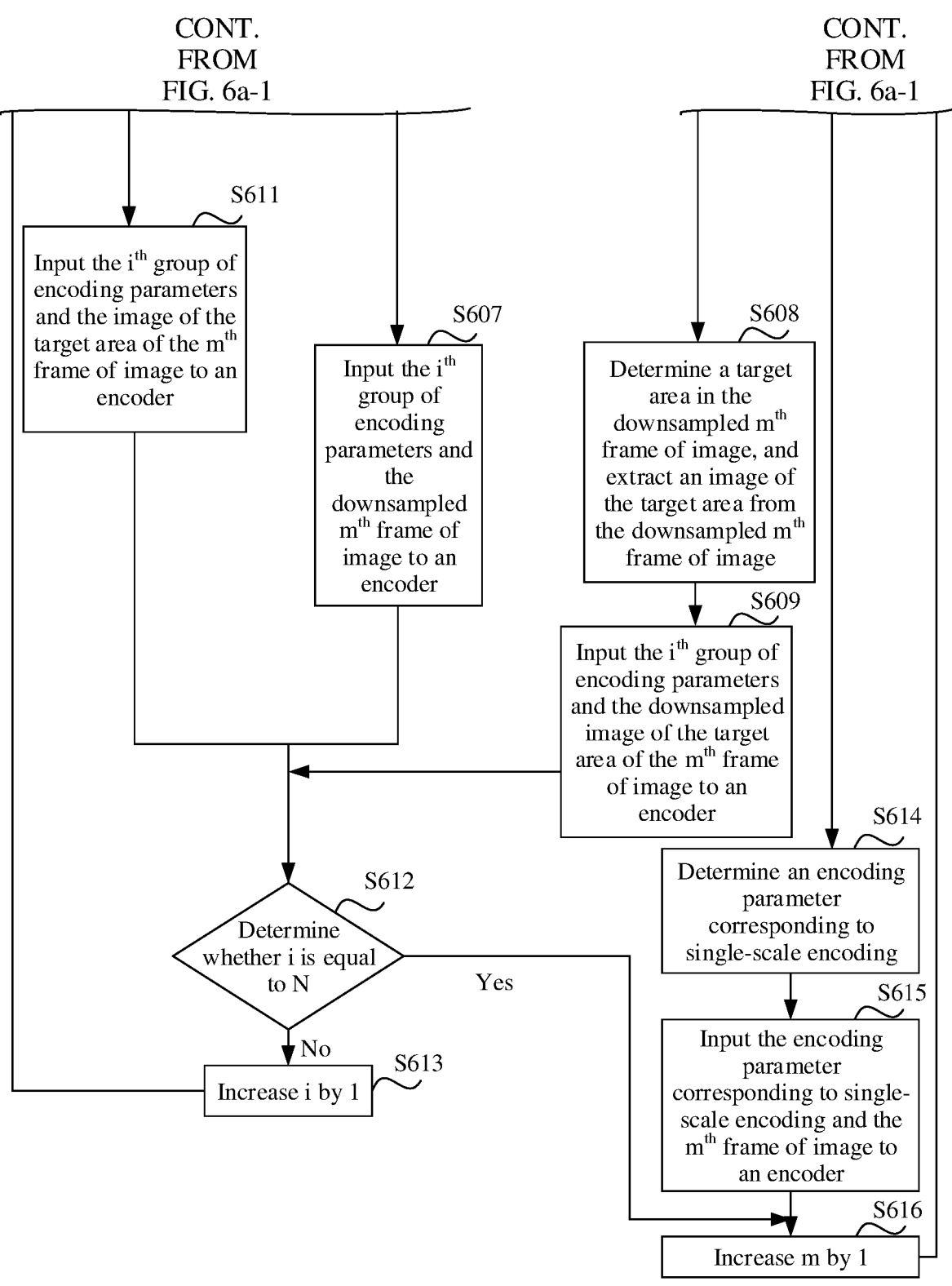

FIG. 6*a*-1 and FIG. 6*a*-2 are a schematic diagram of an example of a processing process. Refer to FIG. 6*a*-1 and FIG. 6*a*-2. For example, when an existing encoder in a sending device supports encoding of images with different types of resolution, and an existing decoder in a receiving device supports decoding of images with different types of resolution, a data processing process of a pre-processing module is as follows.

S601: Determine whether to perform multi-scale encoding on an $m^{th}$ frame of image.

S602: Determine N encoding scales and N groups of encoding parameters for the $m^{th}$ frame of image.

S603: Set i to 1.

For example, for S601 to S603, refer to the foregoing descriptions of S301 to S303.

S604: Determine whether resolution in the $i^{th}$ group of encoding parameters is less than source resolution of the $m^{th}$ frame of image.

For example, if resolution in an $i^{th}$ group of encoding parameters is less than the source resolution of the $m^{th}$ frame of image, S605 is performed. If the resolution in the $i^{th}$ group of encoding parameters is equal to the source resolution of the $m^{th}$ frame of image, S610 is performed.

S605: Perform downsampling on the $m^{th}$ frame of image based on the resolution in the $i^{th}$ group of encoding parameters.

For example, for S605, refer to the foregoing description of S505.

S606: Determine whether i is greater than a scale demarcation threshold.

For example, if i is less than or equal to the scale demarcation threshold, S607 may be performed. If i is greater than the scale demarcation threshold, S608 may be performed.

For example, for S606, refer to the description of S604.

For example, an execution sequence of S604 and S606 is not limited in this embodiment.

S607: Input the $i^{th}$ group of encoding parameters and the downsampled $m^{th}$ frame of image to the encoder.

For example, for S607, refer to S506.

S608: Determine a target area in the downsampled $m^{th}$ frame of image, and extract an image of the target area from the downsampled $m^{th}$ frame of image.

S609: Input the $i^{th}$ group of encoding parameters and the downsampled image of the target area of the $m^{th}$ frame of image to the encoder.

For example, for S608 to S609, refer to the foregoing descriptions of S405 to S406.

S610: Determine a target area in the $m^{th}$ frame of image, and extract an image of the target area from the $m^{th}$ frame of image.

S611: Input the $i^{th}$ group of encoding parameters and the image of the target area of the $m^{th}$ frame of image to the encoder.

For example, for S610 and S611, refer to the foregoing descriptions in S405 and S406.

S612: Determine whether i is equal to N.

S613: Increase i by 1.

S614: Determine an encoding parameter corresponding to single-scale encoding.

S615: Input the encoding parameter corresponding to single-scale encoding and the $m^{th}$ frame of image to the encoder.

S616: Increase m by 1.

For example, for S612 to S616, refer to S305 to S309.

Refer to FIG. 4b-1 and FIG. 4b-2. The image preprocessing module is configured to perform the steps of processing the $m^{th}$ frame of image and inputting a processed $m^{th}$ frame of image or the $m^{th}$ frame of image to the encoder in S601 to S616. The multi-scale decision module is configured to perform steps other than the steps performed by the image preprocessing module in S601 to S616, and perform the steps of inputting the $i^{th}$ group of encoding parameters and the $m^{th}$ frame of image to the image preprocessing module. This may refer to the foregoing description.

Still refer to FIG. 4b-1 and FIG. 4b-2. For example, if multi-scale encoding is performed on the $m^{th}$ frame of image, the reconstructed image of the decoder received by the post-processing module includes: a reconstructed image of the $m^{th}$ frame of image at a lowest encoding scale and a reconstructed image of the target area at another encoding scale.

For example, when the post-processing module selects the $m^{th}$ frame of image to reconstruct the image at the $i^{th}$ encoding scale (any encoding scale other than a lowest encoding scale), and outputs the reconstructed image to the display module, upsampling may be performed on the reconstructed image of the $m^{th}$ frame of image at the lowest encoding scale based on the resolution of the $i^{th}$ encoding scale, to obtain an upsampled image IMG_UP0. Then, the target area is used to reconstruct an image at the $i^{th}$ encoding scale, and an image in the target area in the upsampled image IMG_UP0 is replaced, to obtain a reconstructed image of the $m^{th}$ frame of image at the $i^{th}$ encoding scale. Then, the reconstructed image of the $m^{th}$ frame of image at the $i^{th}$ encoding scale is output to the display module, and the display module displays the reconstructed image.

FIG. 6b (1) and FIG. 6b (2) are a schematic diagram of an example of a processing process. Refer to FIG. 6b (1) and FIG. 6b (2). The video stream includes e (e is a positive integer) frames of images, for example, an image 1, an image 2, . . . , and an image e.

Refer to FIG. 6b (1). For example, the multi-scale encoding module encodes the image 1 at three encoding scales, to obtain bitstream data at the three encoding scales.

Refer to FIG. 6b (1). For example, for the image 1, the multi-scale encoding module may first perform downsampling on the image 1 based on resolution in the encoding parameter corresponding to the first encoding scale, to obtain an image 1a. Then, the image 1a is encoded based on the encoding parameter corresponding to the first encoding scale to obtain the bitstream data of the first encoding scale. Refer to FIG. 6b (2). For example, the bitstream data of the first encoding scale corresponding to the image 1 is decoded to obtain an image 1a', where the image 1a' is a reconstructed image corresponding to the image 1a.

Refer to FIG. 6b (1). For example, for the image 1, the multi-scale encoding module may first perform downsampling on the image 1 based on the resolution in the encoding parameter corresponding to a second encoding scale, to obtain an image 1b. Then, R2 of the target area is extracted from FIG. 1b, and then R2 is encoded based on an encoding parameter corresponding to the second encoding scale, to obtain bitstream data of the second encoding scale. Refer to FIG. 6b (2). For example, the bitstream data of the second encoding scale corresponding to the image 1 is decoded to obtain R2', where R2' is a reconstructed image corresponding to R2.

Refer to FIG. 6b (1). For example, for the image 1, the multi-scale encoding module may first extract an image R3 of the target area from the image 1, and then encode R3 based on an encoding parameter corresponding to a third encoding scale, to obtain bitstream data of the third encoding scale. Refer to FIG. 6b (2). For example, the bitstream data of the third encoding scale corresponding to the image 1 is decoded to obtain R3', where R3' is a reconstructed image corresponding to R3.

Refer to FIG. 6*b* (2). For example, for the image 1, when the reconstructed image of the first encoding scale is selected for output, the image 1*a'* may be directly output to an image display module for display. When the reconstructed image of the second encoding scale is selected for output, upsampling may be performed on the image 1*a'* based on the resolution in the encoding parameter corresponding to the second encoding scale, to obtain an image 1*b'*. Resolution of the image 1*b'* and resolution of the image 1*b* are the same. Then, R2' is used to replace the image of the target area in the image 1*b'*, and the replaced image 1*b'* is output. When the reconstructed image of the third encoding scale is selected for output, upsampling may be performed on the image 1*a'* based on the resolution in the encoding parameter corresponding to the third encoding scale, to obtain an image 1'. Resolution of the image 1' and resolution of the image 1 are the same. Then, R3' is used to replace the image of the target area in the image 1', and the replaced image 1' is output.

Refer to FIG. 6*b* (1). For example, the multi-scale encoding module encodes the image 2 at two encoding scales, to obtain bitstream data at the two encoding scales.

Refer to FIG. 6*b* (1). For example, for the image 2, the multi-scale encoding module may first perform downsampling on the image 2 based on resolution in the encoding parameter corresponding to the first encoding scale, to obtain an image 2*a*. Then, the image 2*a* is encoded based on the encoding parameter corresponding to the first encoding scale to obtain the bitstream data of the first encoding scale. Refer to FIG. 6*b* (2). For example, the bitstream data of a first encoding scale corresponding to the image 2 is decoded to obtain an image 2*a'*, where the image 2*a'* is a reconstructed image corresponding to the image 2*a*.

Refer to FIG. 6*b* (1). For example, for the image 2, the multi-scale encoding module may first extract Q2 of the target area from the image 2, and then encode Q2 based on the encoding parameter corresponding to the second encoding scale, to obtain bitstream data of the second encoding scale. Refer to FIG. 6*b* (2). For example, the bitstream data of the third encoding scale corresponding to the image 2 is decoded to obtain Q2', where Q2' is a reconstructed image corresponding to Q2.

Refer to FIG. 6*b* (2). For example, for the image 2, when the reconstructed image of the first encoding scale is selected for output, the image 2*a'* may be directly output to the image display module for display. When the reconstructed image of the second encoding scale is selected for output, upsampling may be performed on the image 2*a'* based on the resolution in the encoding parameter corresponding to the second encoding scale, to obtain an image 2'. Resolution of the image 2' and resolution of the image 2 are the same. Then, Q2' is used to replace the image of the target area in the image 2', and the replaced image 2' is output.

For example, the multi-scale encoding module performs single-scale encoding on the image e to obtain corresponding bitstream data. Then, the bitstream data corresponding to the image e may be decoded to obtain an image e', where the image e' is a reconstructed image corresponding to the image e, and then the image e' may be directly output and displayed.

For example, when an existing encoder in the sending device does not support encoding of images with different types of resolution, and an existing decoder in the receiving device does not support decoding of images with different types of resolution, processing methods of the multi-scale encoding module and the multi-scale decoding module may be as follows.

Figures 1, 7A:
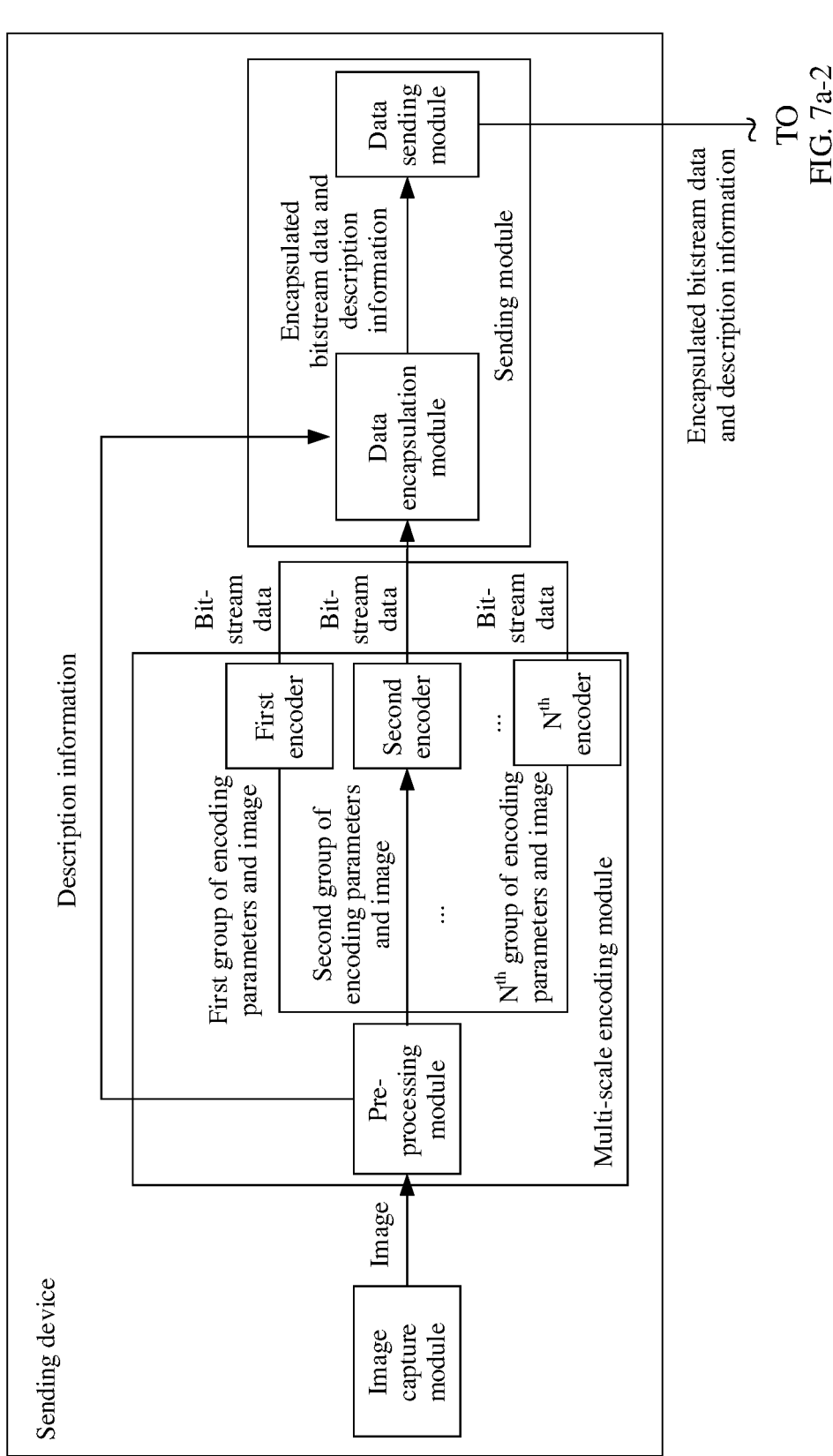
Figures 2, 7A:
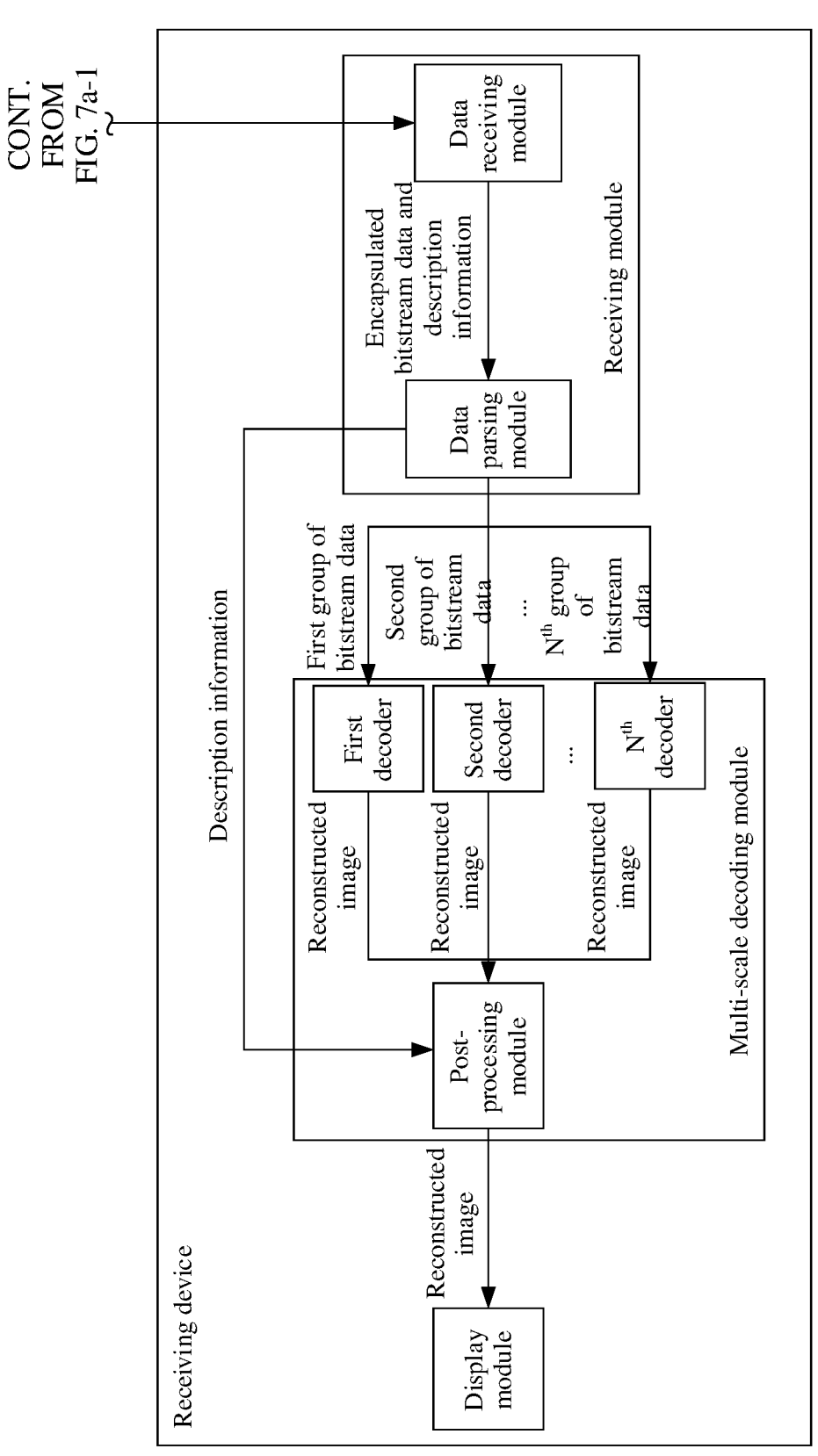

FIG. 7*a*-1 and FIG. 7*a*-2 are a schematic diagram of an example of a structure of a device. Refer to FIG. 7*a*-1 and FIG. 7*a*-2, a sending device may include N encoders, and a receiving device may include N decoders. For example, each encoder in the sending device correspondingly supports different types of resolution, and resolution supported by one encoder may correspond to resolution in a group of encoding parameters. For example, each decoder in the receiving device correspondingly supports different types of resolution, and resolution supported by one decoder may correspond to resolution in a group of encoding parameters.

Figures 1, 7B:
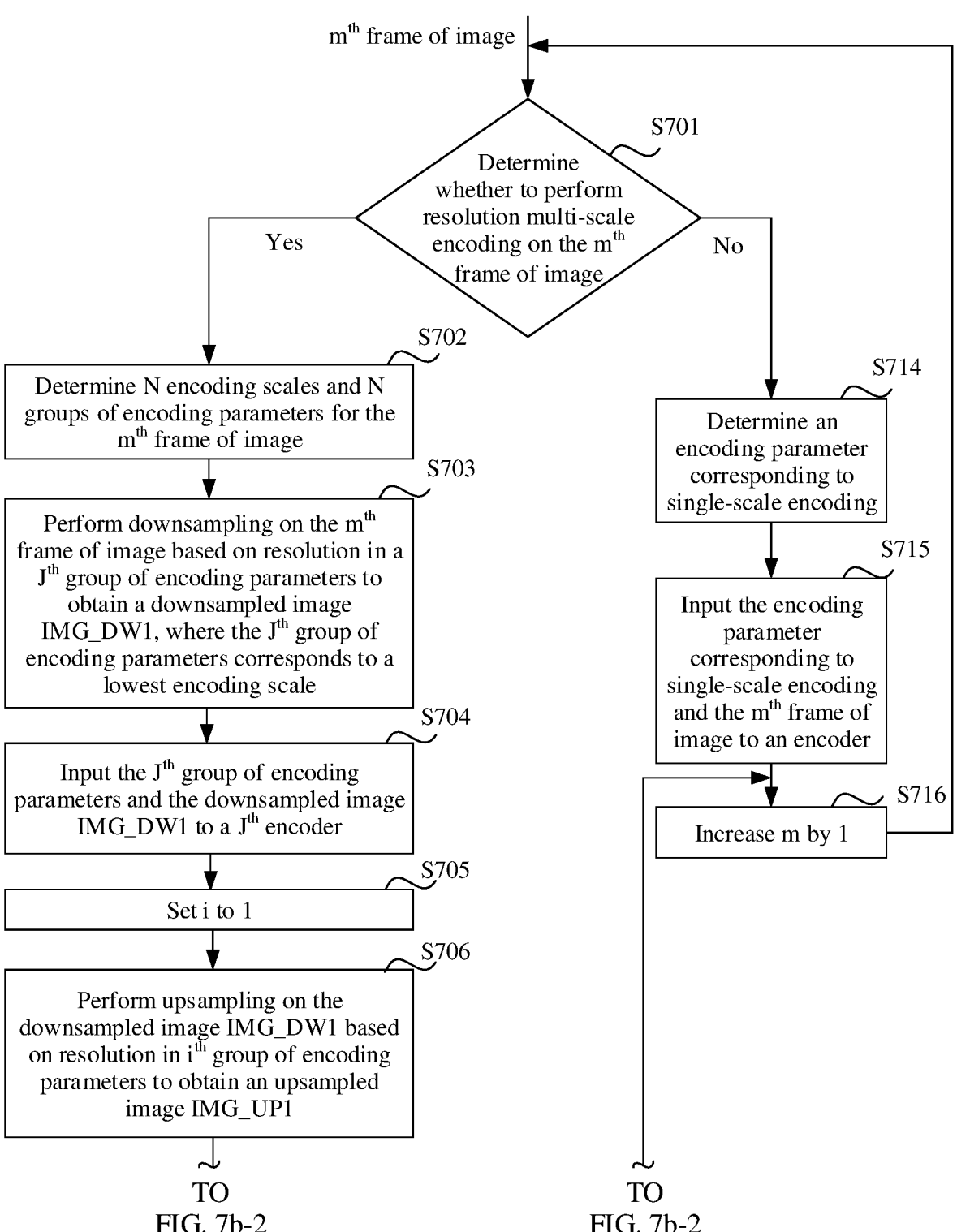
Figures 2, 7B:
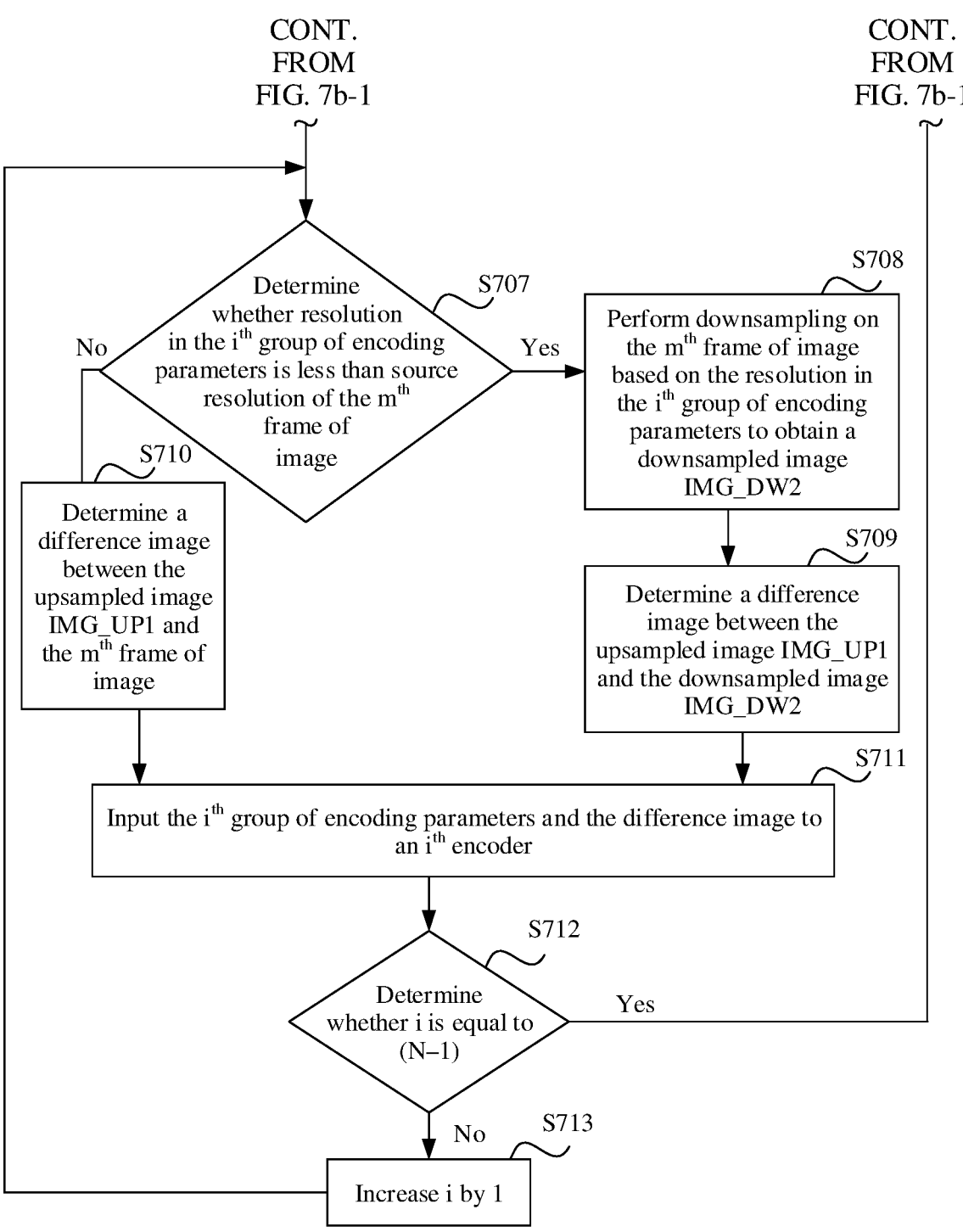

FIG. 7*b*-1 and FIG. 7*b*-2 are a schematic diagram of an example of a processing process. Refer to FIG. 7*b*-1 and FIG. 7*b*-2. For example, when an existing encoder in the sending device does not support encoding of images with different types of resolution, and an existing decoder in the receiving device does not support decoding of images with different types of resolution, a data processing process of the pre-processing module is as follows.

S701: Determine whether to perform multi-scale encoding on an $m^{th}$ frame of image.

S702: Determine N encoding scales and N groups of encoding parameters for the $m^{th}$ frame of image.

For example, for S701 to S702, refer to S501 to S502.

S703: Perform downsampling on the $m^{th}$ frame of image based on resolution in a $J^{th}$ group of encoding parameters to obtain a downsampled image IMG_DW1, where the $J^{th}$ group of encoding parameters corresponds to a lowest encoding scale.

For example, encoding at a high encoding scale may be performed based on encoding at a low encoding scale. For example, encoding of the $m^{th}$ frame of image at the high encoding scale may be performed on a basis of bitstream data obtained by encoding at the lowest encoding scale.

For example, a group of encoding parameters with lowest resolution may be searched for from the N groups of encoding parameters, and is used as an encoding parameter corresponding to the lowest encoding scale. For ease of description, the encoding parameter corresponding to the lowest encoding scale may be referred to as the $J^{th}$ group of encoding parameters. Then, downsampling may be performed on the $m^{th}$ frame of image based on the resolution in the $J^{th}$ group of encoding parameters, to obtain a downsampled image. For ease of distinguishing, downsampling is performed on the $m^{th}$ frame of image based on the resolution in the encoding parameter corresponding to the lowest encoding scale, to obtain the downsampled image referred to as the IMG_DW1.

S704: Input the $J^{th}$ group of encoding parameters and the downsampled image IMG_DW1 to a $J^{th}$ encoder.

For example, resolution supported by the $J^{th}$ encoder is the same as the resolution in the $J^{th}$ group of encoding parameters.

For example, after the $m^{th}$ frame of image is encoded at the lowest encoding scale, encoding at other encoding scales may be separately performed on the $m^{th}$ frame of image. This may refer to S705 to S712.

For example, in the N groups of encoding parameters, (N−1) groups of encoding parameters remain in addition to the $J^{th}$ group of encoding parameters. In S705 and S712, a group of encoding parameters and a corresponding to-be-encoded image may be selected from the (N−1) groups of encoding parameters each time, and input to a corresponding encoder for encoding.

S705: Set i to 1.

S706: Perform upsampling on the downsampled image IMG_DW1 based on resolution in $i^{th}$ group of encoding parameters to obtain an upsampled image IMG_UP1.

For example, interpolation may be performed on the downsampled image IMG_DW1 based on the resolution in the $i^{th}$ group of encoding parameters, to perform upsampling, to obtain the upsampled image IMG_UP1. A manner of upsampling is not limited in this embodiment.

S707: Determine whether resolution in the $i^{th}$ group of encoding parameters is less than source resolution of the $m^{th}$ frame of image.

For example, if the resolution in the $i^{th}$ group of encoding parameters is less than source resolution of the $m^{th}$ frame of image, S708 is performed. If the resolution in the $i^{th}$ group of encoding parameters is equal to the source resolution of the $m^{th}$ frame of image, S710 is performed.

S708: Perform downsampling on the $m^{th}$ frame of image based on the resolution in the $i^{th}$ group of encoding parameters to obtain a downsampled image IMG_DW2.

For example, downsampling may be performed on the $m^{th}$ frame of image based on the resolution in the $i^{th}$ group of encoding parameters, to obtain the downsampled image IMG_DW2.

S709: Determine a difference image between the upsampled image IMG_UP1 and the downsampled image IMG_DW2.

For example, resolution of the upsampled image IMG_UP1 and resolution of the downsampled image IMG_DW2 are the same, and a difference may be obtained by calculating pixel values of pixels corresponding to the upsampled image IMG_UP1 and the downsampled image IMG_DW2, to obtain the difference image.

S710: Determine a difference image between the upsampled image IMG_UP1 and the $m^{th}$ frame of image.

For example, S710 may be described according to S709.

S711. Input the $i^{th}$ group of encoding parameters and the difference image to an $i^{th}$ encoder.

For example, resolution supported by the $i^{th}$ encoder is the same as the resolution in the $i^{th}$ group of encoding parameters.

S712: Determine whether i is equal to (N−1).

For example, for S712, refer to the description of S305.

For example, if i is equal to (N−1), S716 is performed. If i is not equal to (N−1), return to perform S706.

S713: Increase i by 1.

S714: Determine an encoding parameter corresponding to single-scale encoding.

S715: Input the encoding parameter corresponding to single-scale encoding and the $m^{th}$ frame of image to the encoder.

S716: Increase m by 1.

For example, for S713 to S716, refer to S306 to S309.

It should be noted that N encoding scales of different images in a video stream of a same video service may be the same or may be different. In the video stream of the same video service, multi-scale encoding may be performed on some images, and single-scale encoding may be performed on the other images. This is not limited in this embodiment.

Refer to FIG. 4b-1 and FIG. 4b-2. The image preprocessing module is configured to perform the steps of processing the $m^{th}$ frame of image and inputting a processed $m^{th}$ frame of image or the $m^{th}$ frame of image to the encoder in S701 to S716. The multi-scale decision module is configured to perform steps other than the steps performed by the image preprocessing module in S701 to S716, and perform the steps of inputting the $i^{th}$ group of encoding parameters and the $m^{th}$ frame of image to the image preprocessing module. This may refer to the foregoing description.

Refer to FIG. 7a-1 and FIG. 7a-2. After receiving encapsulated description data and bitstream data, the data receiving module of the receiving device may input the encapsulated description data and the bitstream data to a data parsing module. The data parsing module decapsulates the encapsulated description data and bitstream data to obtain the bitstream data and the description data.

For example, the data parsing module may input the $i^{th}$ group of bitstream data to the $i^{th}$ decoder, and the $i^{th}$ decoder performs image reconstruction based on the $i^{th}$ group of bitstream data to obtain the reconstructed image.

For example, after obtaining the reconstructed image, each decoder may input the reconstructed image to a post-processing module.

For example, reconstructed images received by the post-processing module include a reconstructed image of the downsampled image IMG_DW1 and a reconstructed image of the difference image.

For example, when selecting the reconstructed image corresponding to the $J^{th}$ encoding scale (that is, the lowest encoding scale) for display, the post-processing module may directly output the reconstructed image of the downsampled image IMG_DW1 to a display module.

For example, when the post-processing module selects the reconstructed image corresponding to the $i^{th}$ encoding scale (any encoding scale other than the lowest encoding scale) and outputs the reconstructed image to the display module, upsampling may be performed on the reconstructed image of the downsampled image IMG_DW1 based on the resolution of the $i^{th}$ encoding scale, to obtain an upsampled image IMG_UP2. Then, the upsampled image IMG_UP2 may be superimposed on the reconstructed image at the $i^{th}$ encoding scale to obtain the reconstructed image of the $m^{th}$ frame of image at the $i^{th}$ encoding scale. Then, the reconstructed image of the $m^{th}$ frame of image at the $i^{th}$ encoding scale is input to the display module.

For example, for another encoding scale other than the lowest encoding scale, an image of a target area of the difference image may be input into a corresponding encoder for encoding, thereby further reducing a calculation amount of the encoder. This may refer to the foregoing description.

For example, the reconstructed image received by the post-processing module includes the reconstructed image of the downsampled image IMG_DW1 and a reconstructed image of an image in the target area in the difference image.

For example, when the post-processing module selects the reconstructed image corresponding to the $i^{th}$ encoding scale (any encoding scale other than the lowest encoding scale) and outputs the reconstructed image to the display module, upsampling may be performed on the reconstructed image of the downsampled image IMG_DW1 based on the resolution of the $i^{th}$ encoding scale, to obtain an upsampled image IMG_UP2. Then, the upsampled image IMG_UP2 may be superimposed on the reconstructed image at the $i^{th}$ encoding scale to obtain the reconstructed image of the $m^{th}$ frame of image at the $i^{th}$ encoding scale. Then, the reconstructed image of the $m^{th}$ frame of image at the $i^{th}$ encoding scale is input to the display module.

FIG. 7c (1) and FIG. 7c (2) are a schematic diagram of an example of a processing process. Refer to FIG. 7c (1) and FIG. 7c (2). The video stream includes e (e is a positive integer) frames of images, for example, an image 1, an image 2, . . . , and an image e.

Refer to FIG. 7c (1). For example, the multi-scale encoding module encodes the image 1 at three encoding scales, to obtain bitstream data at the three encoding scales.

Refer to FIG. 7c (1). For example, for the image 1, the multi-scale encoding module may first perform downsampling on the image 1 based on resolution in the encoding parameter corresponding to the first encoding scale, to obtain an image 1A. Then, the image 1A is encoded based on the encoding parameter corresponding to the first encoding scale to obtain bitstream data of the first encoding scale. Refer to FIG. 7c (2). For example, the bitstream data of the first encoding scale corresponding to the image 1 is decoded to obtain an image 1a, where the image 1a is a reconstructed image corresponding to the image 1A.

Refer to FIG. 7c (1). For example, for the image 1, the multi-scale encoding module may first perform downsampling on the image 1 based on resolution in the encoding parameter corresponding to a second encoding scale, to obtain an image 1B. Then, upsampling is performed on the image 1A based on the resolution in the encoding parameter corresponding to the second encoding scale, to obtain an image 1B'. Then, a difference image 1B between the image 1B and the image 1B' is determined. Then, the difference image 1B is encoded based on the encoding parameter corresponding to the second encoding scale to obtain bitstream data of the second encoding scale. Refer to FIG. 7c (2). For example, the bitstream data of the second encoding scale corresponding to the image 1 is decoded to obtain a difference image 1b, where the difference image 1b is a reconstructed image corresponding to the difference image 1B.

Refer to FIG. 7c (1). For example, for the image 1, the multi-scale encoding module may first perform upsampling on the image 1A based on resolution in an encoding parameter corresponding to a third encoding scale to obtain an image 1C', and then determine a difference image 1C between the image 1 and the image 1C'. Then, the difference image 1C is encoded based on the encoding parameter corresponding to the third encoding scale to obtain bitstream data of the third encoding scale. Refer to FIG. 7c (2). For example, the bitstream data of the third encoding scale corresponding to the image 1 is decoded to obtain a difference image 1c, where the difference image 1c is a reconstructed image corresponding to the difference image 1C.

Refer to FIG. 7c (2). For example, for the image 1, when the reconstructed image of the first encoding scale is selected for output, the image 1a may be directly output to the image display module for display. When the reconstructed image of the second encoding scale is selected for output, upsampling may be performed on the image 1a based on the resolution in the encoding parameter corresponding to the second encoding scale, to obtain an image 1a'. Resolution of the image 1a' and resolution of the image 1b are the same. Then, the difference image 1b and the image 1a' are superimposed to obtain an image 1b', and the image 1b' is output. When the reconstructed image of the third encoding scale is selected for output, upsampling may be performed on FIG. 1a based on the resolution in the encoding parameter corresponding to the third encoding scale, to obtain an image 1a''. Resolution of the image 1a'' and resolution of the image 1c are the same. Then, the difference image 1c and the image 1a'' are superimposed to obtain an image 1c', and the image 1c' is output.

Refer to FIG. 7c (1). For example, the multi-scale encoding module encodes the image 2 at two encoding scales, to obtain bitstream data at the two encoding scales.

Refer to FIG. 7c (1). For example, for the image 2, the multi-scale encoding module may first perform downsampling on the image 2 based on resolution in the encoding parameter corresponding to the first encoding scale, to obtain an image 2A. Then, the image 2A is encoded based on the encoding parameter corresponding to the first encoding scale to obtain the bitstream data of the first encoding scale. Refer to FIG. 7c (2). For example, the bitstream data of the first encoding scale corresponding to the image 2 is decoded to obtain an image 2a, where the image 2a is a reconstructed image corresponding to the image 2A.

Refer to FIG. 7c (1). For example, for the image 2, the multi-scale encoding module may first perform upsampling on the image 2A based on the resolution in the encoding parameter corresponding to the second encoding scale, to obtain the image 2B, and then determine the difference image 2B between the image 2 and the image 2B. Then, the difference image 2B is encoded based on the encoding parameter corresponding to the second encoding scale to obtain bitstream data of the third encoding scale. Refer to FIG. 7c (2). For example, the bitstream data of the third encoding scale corresponding to the image 2 is decoded to obtain a difference image 2b, where the difference image 2b is a reconstructed image corresponding to the difference image 2B.

Refer to FIG. 7c (2). For example, for the image 2, when the reconstructed image of the first encoding scale is selected for output, the image 2a may be directly output to the image display module for display. When the reconstructed image of the second encoding scale is selected for output, upsampling may be performed on the image 2a based on the resolution in the encoding parameter corresponding to the second encoding scale, to obtain an image 2a'. Resolution of the image 2a' and resolution of the image 2b are the same. Then, the difference image 2b and the image 2a' are superimposed to obtain an image 2b', and the image 2b' is output.

For example, the multi-scale encoding module performs single-scale encoding on the image e to obtain corresponding bitstream data. Then, the bitstream data corresponding to the image e may be decoded to obtain an image e', where the image e' is a reconstructed image corresponding to the image e, and then the image e' may be directly output and displayed.

It should be noted that Table 15 to Table 17 show that when the encoding parameter corresponding to each encoding scale is preset, only one quantization parameter is set for one resolution. It should be understood that when the encoding parameter corresponding to each encoding scale is preset, a plurality of quantization parameters may be set for one resolution. This may be specifically set based on a requirement. This is not limited in this embodiment.

For example, for N=2 in Table 1, encoding parameters corresponding to two encoding scales may be preset, as shown in Table 24.

TABLE 24

| | | Encoding parameter | |
|---|---|---|---|
| Encoding scale type | Resolution | Quantization parameter | |
| N = 2 First encoding scale | Source resolution/4 | QP = 35 | |
| Second encoding scale | Source resolution/4 | QP = 25 | |

Different encoding scales in Table 24 have a same type of resolution, and quantization parameters are different.

For example, for N=3 in Table 1, encoding parameters corresponding to three encoding scales may be preset, as shown in Table 25.

TABLE 25

| | | Encoding parameter | |
|---|---|---|---|
| Encoding scale type | Resolution | Quantization parameter | |
| N = 3  First encoding scale | Source resolution/4 | QP = 35 | |
| Second encoding scale | Source resolution/4 | QP = 30 | |
| Third encoding scale | Source resolution/4 | QP = 25 | |

Different encoding scales in Table 25 have a same type of resolution, and quantization parameters are different.

For example, for N=4 in Table 1, encoding parameters corresponding to four encoding scales may be preset, as shown in Table 26.

TABLE 26

| | | Encoding parameter Quantization parameter | |
|---|---|---|---|
| Encoding scale type | Resolution | | |
| N = 4  First encoding scale | Source resolution/8 | QP = 35 | |
| Second encoding scale | Source resolution/8 | QP = 30 | |
| Third encoding scale | Source resolution/8 | QP = 25 | |
| Fourth encoding scale | Source resolution/8 | QP = 20 | |

Different encoding scales in Table 26 have a same type of resolution, and quantization parameters are different.

It should be noted that Table 18 to Table 23 show that when the encoding parameter corresponding to each encoding scale is determined based on at least two of the N encoding scales, the image complexity of the $m^{th}$ frame of image, the current network transmission capability, and the parameter value range of the encoder, only one quantization parameter is determined for one resolution. However, it should be understood that when the encoding parameter corresponding to each encoding scale is determined based on the at least two of the N encoding scales, the image complexity of the $m^{th}$ frame of image, the current network transmission capability, and the parameter value range of the encoder, a plurality of quantization parameters may also be determined for each resolution.

It should be understood that, for different images belonging to the same video data, when it is determined to perform multi-scale encoding on a frame of image, each group of determined encoding parameters may include a quantization parameter and reference frame information. When it is determined to perform multi-scale encoding on another frame of image, each group of determined encoding parameters may include resolution, a quantization parameter, and reference frame information. In other words, for different images that belong to a same frame of video data and on which multi-scale encoding needs to be performed, types of parameters included in the determined encoding parameters may be the same or different. This is not limited in this embodiment.

Figure 8:
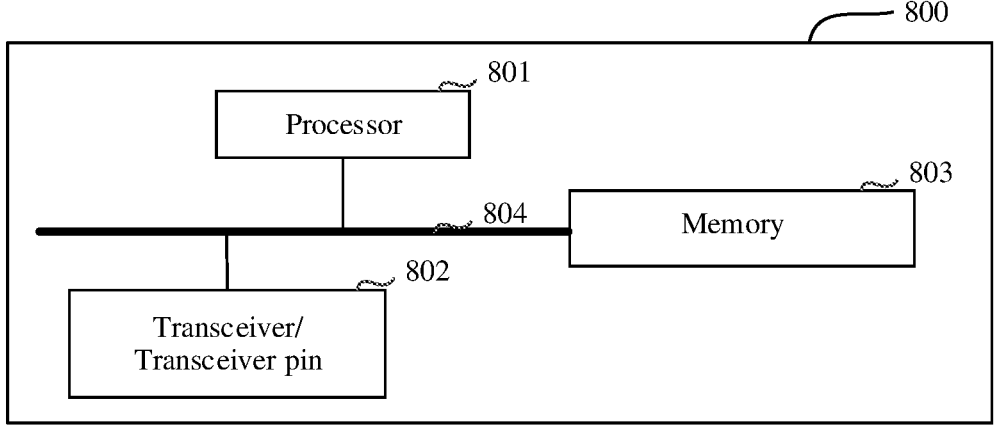
FIG. 8 is a schematic diagram of an example of a structure of an apparatus.

In an example, FIG. 8 is a schematic block diagram of an apparatus 800 according to an embodiment of this application. The apparatus 800 may include a processor 801 and a transceiver/transceiver pin 802, and optionally, further include a memory 803.

Components of the apparatus 800 are coupled together through a bus 804. In addition to a data bus, the bus 804 further includes a power bus, a control bus, and a status signal bus. However, for clarity of description, various buses are referred to as the bus 804 in the figure.

Optionally, the memory 803 may be used for instructions in the foregoing method embodiments. The processor 801 may be configured to execute the instructions in the memory 803, control a receive pin to receive a signal, and control a transmit pin to send a signal.

The apparatus 800 may be the electronic device or the chip of the electronic device in the foregoing method embodiments.

All related content of the steps in the foregoing method embodiments may be cited in function descriptions of the corresponding functional modules.

This embodiment further provides a computer storage medium. The computer storage medium stores computer instructions. When the computer instructions are run on an electronic device, the electronic device performs the foregoing related method steps to implement the method in the foregoing embodiment.

This embodiment further provides a computer program product. When the computer program product runs on a computer, the computer is enabled to perform the related steps, to implement the method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to enable the chip to perform the methods in the foregoing method embodiments.

The electronic device, the computer storage medium, the computer program product, or the chip provided in embodiments is configured to perform the corresponding method provided above. Therefore, for beneficial effects that can be achieved, refer to the beneficial effects of the corresponding method provided above.

Based on descriptions about the foregoing implementations, a person skilled in the art may understand that, for a purpose of convenient and brief description, division into the foregoing function modules is used as an example for illustration. In actual application, the foregoing functions may be allocated to different function modules and implemented according to a requirement. In other words, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist independently physically, or two or more units may be integrated into one unit. The integrated unit may be implemented in a form of hardware, or may be implemented in a form of a software functional unit.

Any content of the embodiments of this application and any content of a same embodiment may be freely combined. Any combination of the foregoing content shall fall within the scope of this application.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, for example, a universal serial bus (USB) flash drive, a removable hard disk, a read-only memory (ROM), a random access memory (RAM), a magnetic disk, or an optical disc.

The foregoing describes embodiments of this application with reference to the accompanying drawings. However, this application is not limited to the foregoing specific implementations. The foregoing specific implementations are merely examples, but are not limitative. Inspired by this application, a person of ordinary skill in the art may further make many modifications without departing from the purposes of this application and the protection scope of the claims, and all the modifications shall fall within the protection scope of this application.

Methods or algorithm steps described in combination with the content disclosed in this embodiment may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an application-specific integrated circuit (ASIC).

A person skilled in the art should be aware that in the foregoing one or more examples, functions described in embodiments of this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communications medium, where the communications medium includes any medium that enables a computer program to be transmitted from one place to another. The storage medium may be any available medium accessible to a general-purpose or a dedicated computer.

The foregoing describes embodiments of this application with reference to the accompanying drawings. However, this application is not limited to the foregoing specific implementations. The foregoing specific implementations are merely examples, but are not limitative. Inspired by this application, a person of ordinary skill in the art may further make many modifications without departing from the purposes of this application and the protection scope of the claims, and all the modifications shall fall within the protection scope of this application.

What is claimed is:

1. An encoding method, comprising:
obtaining an image for encoding;
determining N encoding scales for the image, wherein N is an integer greater than 1;
determining N groups of encoding parameters corresponding to the N encoding scales, wherein each encoding scale, from the N encoding scales, corresponds to one group of encoding parameters from the N groups of encoding parameters; and
obtaining N groups of bitstream data by encoding the image N times by repeatedly using a single-scale encoder based on the N groups of encoding parameters, wherein the single-scale encoder is an encoder that can perform encoding on an image at only one encoding scale and output bitstream data at only one encoding scale, and
wherein the method further comprises:
determining whether to perform multi-scale encoding on the image in association with at least one of: an importance of the image to encoding and decoding of another image in video data to which the image belongs satisfies a first condition, an impact degree of bitstream data corresponding to the image on a network satisfies a second condition, or a predicted image quality of the image satisfies a third condition.

2. The method according to claim 1, wherein the first condition comprises at least one of:
the image is an I frame or an IDR frame;
the image is a scene switching frame;
the image is a reference frame; or
the image is a key frame.

3. The method according to claim 1, wherein the second condition comprises at least one of:
a data amount of bitstream data corresponding to the image is greater than a data amount threshold; and
the data amount of the bitstream data corresponding to the image is greater than a network transmission capability.

4. The method according to claim 1, wherein
the predicted image quality of the image includes a first predicted image quality and a second predicted image quality, the first predicted image quality is of the image that is encoded based on a source resolution of the image, and the second predicted image quality is of the image that is encoded based on a resolution lower than the source resolution; and
the third condition comprises:
the first predicted image quality is lower than or equal to the second predicted image quality.

5. The method according to claim 1, wherein an encoding parameter, from the N groups of encoding parameters, includes at least one of: a resolution, a quantization parameter, reference frame information, or a target bit rate.

6. The method according to claim 1, wherein the N groups of encoding parameters are determined based on the N encoding scales and a parameter value range of the encoder.

7. The method according to claim 1, wherein an encoding parameter, from the N groups of encoding parameters, includes reference frame information, when first feedback information is received, the reference frame information is determined based on the first feedback information, the first feedback information indicates that an encoded frame corresponding to sent bitstream data is successfully received, the encoded frame is acknowledged as a reference frame, and the reference frame information indicates the reference frame.

8. A data encapsulation method, comprising:

obtaining bitstream data by encoding an image using an encoder, wherein the encoder is a single-scale encoder that can perform encoding on an image at only one encoding scale and output bitstream data at only one encoding scale, and wherein the method further comprises determining whether to perform multi-scale encoding on the image in association with at least one of: an importance of the image to encoding and decoding of another image in video data to which the image belongs satisfies a first condition, an impact degree of bitstream data corresponding to the image on a network satisfies a second condition, or a predicted image quality of the image satisfies a third condition;

obtaining description information of the bitstream data;

obtaining encapsulated data by encapsulating the bitstream data and the description information of the bitstream data; and storing or transmitting the encapsulated data.

9. The method according to claim 8, wherein the description information includes scale identification information, and the method further comprises:

when, based on the scale identification information, an encoding scale corresponding to the bitstream data is a lowest encoding scale, determining that a transmission policy of the bitstream data is a first transmission policy; or when, based on the scale identification information, the encoding scale corresponding to the bitstream data is another encoding scale, determining that the transmission policy of the bitstream data is a second transmission policy, wherein the first transmission policy is superior to the second transmission policy.

10. A display method, comprising:

obtaining a plurality of reconstructed images by decoding bitstream data using a decoder, wherein the bitstream data is generated by encoding an image using a single-scale encoder that can perform encoding of an image at only one encoding scale and output bitstream data corresponding to only one encoding scale, and wherein the encoding of the image is performed in association with determining whether to perform multi-scale encoding on the image based on at least one of: an importance of the image to encoding and decoding of another image in video data to which the image belongs satisfies a first condition, an impact degree of bitstream data corresponding to the image on a network satisfies a second condition, or a predicted image quality of the image satisfies a third condition;

obtaining a plurality of groups of description information corresponding to the plurality of reconstructed images, wherein at least one group of description information, in the plurality of groups of description information, includes first frame identification information; and in association with only one of the plurality of groups of description information includes the first frame identification information, selecting and displaying a reconstructed image corresponding to the first frame identification information, or in association with at least two groups of description information, in the plurality of groups of description information, include the first frame identification information, selecting a reconstructed image from at least two reconstructed images corresponding to the first frame identification information, and displaying the selected reconstructed image.

11. The method according to claim 10, wherein the description information, from the plurality of groups of description information, further comprises scale identification information, and selecting the reconstructed image from the at least two reconstructed images corresponding to the first frame identification information comprises:

selecting, based on the scale identification information of the at least two reconstructed images corresponding to the first frame identification information, a reconstructed image with a highest encoding scale.

12. The method according to claim 10, wherein the description information, from the plurality of groups of description information, further comprises scale identification information, and selecting the reconstructed image from the at least two reconstructed images corresponding to the first frame identification information comprises:

selecting, based on the scale identification information of the at least two reconstructed images corresponding to the first frame identification information, a reconstructed image whose scale identification information is closest to scale identification information of a previously displayed reconstructed image.

13. An electronic device, comprising:

a processor; and a memory configured to store program instructions which, when executed by the processor, cause the electronic device to:

obtain an image for encoding;

determine N encoding scales for the image, wherein N is an integer greater than 1;

determine N groups of encoding parameters corresponding to the N encoding scales, wherein each encoding scale, from the N encoding scales, corresponds to one group of encoding parameters from the N groups of encoding parameters; and obtain N groups of bitstream data by encoding the image N times by repeatedly using a single-scale encoder based on the N groups of encoding parameters, wherein the single-scale encoder is an encoder that can perform encoding on an image at only one encoding scale and output bitstream data at only one encoding scale, and wherein the program instructions further cause the electronic device to determine whether to perform multi-scale encoding on the image in association with at least one of: an importance of the image to encoding and decoding of another image in video data to which the image belongs satisfies a first condition, an impact degree of bitstream data corresponding to the image on a network satisfies a second condition, or a predicted image quality of the image satisfies a third condition.

14. The electronic device according to claim 13, wherein the N groups of encoding parameters are determined based on the N encoding scales and a parameter value range of the encoder.

15. The electronic device according to claim 13, wherein an encoding parameter, from the N groups of encoding parameters, includes reference frame information, when first feedback information is received, the reference frame information is determined based on the first feedback information, the first feedback information indicates that an encoded frame corresponding to sent bitstream data is successfully received, the encoded frame is acknowledged as a reference frame, and the reference frame information indicates the reference frame.

16. A chip, comprising:

one or more interface circuits; and one or more processors, wherein the one or more interface circuits are configured to:

receive a signal from a memory of an electronic device, and send the signal to the one or more processors, wherein the signal comprises computer instructions stored in the memory, and when the one or more processors execute the computer instructions, the electronic device is caused to perform the method according to claim 1.

17. A computer-readable storage medium comprising a computer program, and when the computer program is executed on a computer or a processor, the computer or the processor is caused to perform the method according to claim 1.

18. A computer program product comprising a software program, and when the software program is executed by a computer or a processor, the method according to claim 1 is performed.

\* \* \* \* \*